US009425576B2

(12) United States Patent
Abe et al.

(10) Patent No.: US 9,425,576 B2
(45) Date of Patent: Aug. 23, 2016

(54) EXCIMER LASER APPARATUS AND EXCIMER LASER SYSTEM

(71) Applicant: GIGAPHOTON INC., Tochigi (JP)

(72) Inventors: Tooru Abe, Tochigi (JP); Takeshi Ohta, Tochigi (JP); Hiroaki Tsushima, Tochigi (JP); Osamu Wakabayashi, Kanagawa (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/487,796

(22) Filed: Sep. 16, 2014

(65) Prior Publication Data
US 2015/0003485 A1 Jan. 1, 2015

Related U.S. Application Data

(62) Division of application No. 13/656,917, filed on Oct. 22, 2012, now Pat. No. 8,867,583.

(30) Foreign Application Priority Data

Oct. 25, 2011 (JP) ................................. 2011-234057
Jul. 19, 2012 (JP) ................................. 2012-160399

(51) Int. Cl.
*H01S 3/22* (2006.01)
*H01S 3/036* (2006.01)
(Continued)

(52) U.S. Cl.
CPC ........... *H01S 3/036* (2013.01); *H01S 3/09702* (2013.01); *H01S 3/2251* (2013.01);
(Continued)

(58) Field of Classification Search
CPC ...... H01S 3/036; H01S 3/225; H01S 3/2251; H01S 3/2256; H01S 3/2258

USPC .......................................... 372/59, 57, 60, 55
See application file for complete search history.

(56) References Cited

U.S. PATENT DOCUMENTS 4,977,573 A 12/1990 Bittenson et al.
5,642,374 A 6/1997 Wakabayashi et al.
(Continued)

FOREIGN PATENT DOCUMENTS

| JP | H07-335961 A | 12/1995 |
| JP | 2005-123528 A | 5/2005 |
| JP | 2006-303174 A | 11/2006 |

OTHER PUBLICATIONS

An Office Action; Notice of Reasons for Rejection, issued by the Japanese Patent Office on Jan. 26, 2016, which corresponds to Japanese Patent Application No. 2012-160399 and is related to U.S. Appl. No. 14/487,796; with English language partial translation.

*Primary Examiner* — Kinam Park
(74) *Attorney, Agent, or Firm* — Studebaker & Brackett PC

(57) ABSTRACT

An excimer laser apparatus includes a gas supply unit, connected to a first receptacle that holds a first laser gas containing halogen gas and a second receptacle that holds a second laser gas having a lower halogen gas concentration than the first laser gas, that supplies the first laser gas and the second laser gas to the interior of the laser chamber. Gas pressure control in which the gas supply unit supplies the second laser gas to the interior of the laser chamber or a gas exhaust unit partially exhausts gas from within the laser chamber, and partial gas replacement control in which the gas supply unit supplies the first laser gas and the second laser gas to the interior of the laser chamber and the gas exhaust unit partially exhausts gas from within the laser chamber sequentially, may be selectively performed.

22 Claims, 38 Drawing Sheets

(51) Int. Cl.
*H01S 3/225* (2006.01)
*H01S 3/097* (2006.01)
*H01S 3/08* (2006.01)
*H01S 3/134* (2006.01)
*H01S 3/23* (2006.01)

(52) U.S. Cl.
CPC ........... *H01S3/2256* (2013.01); *H01S 3/2258* (2013.01); *H01S 3/08009* (2013.01); *H01S 3/134* (2013.01); *H01S 3/225* (2013.01); *H01S 3/2366* (2013.01)

(56) References Cited

U.S. PATENT DOCUMENTS

| | | |
|---|---|---|
| 5,710,787 A | 1/1998 | Amada et al. |
| 6,028,880 A | 2/2000 | Carlesi et al. |
| 6,151,349 A | 11/2000 | Gong et al. |
| 6,320,892 B1 | 11/2001 | Padmabandu et al. |
| 6,496,527 B1 | 12/2002 | Terashima et al. |
| 7,741,639 B2 | 6/2010 | Besaucele et al. |
| 2004/0252740 A1* | 12/2004 | Albrecht et al. ............... 372/55 |
| 2005/0094698 A1* | 5/2005 | Besaucele et al. ............ 372/57 |
| 2006/0239322 A1* | 10/2006 | Matsunaga et al. ........... 372/58 |

* cited by examiner

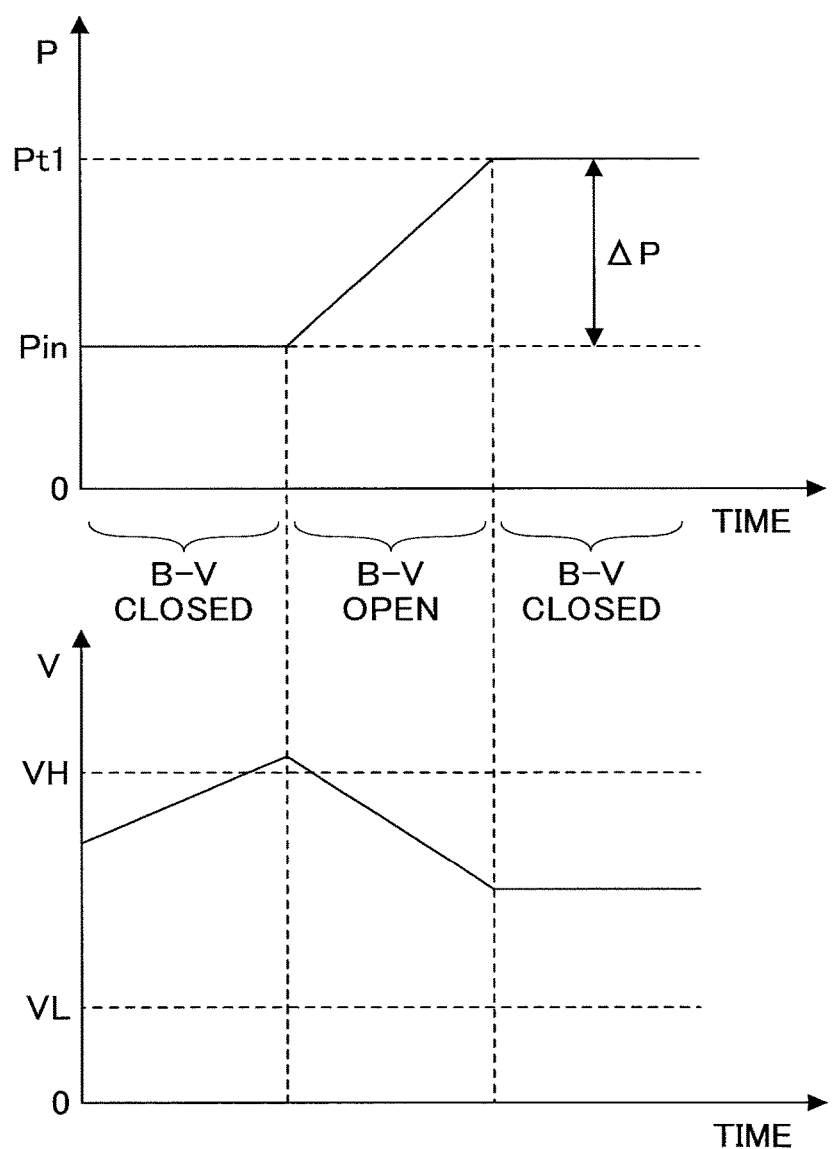

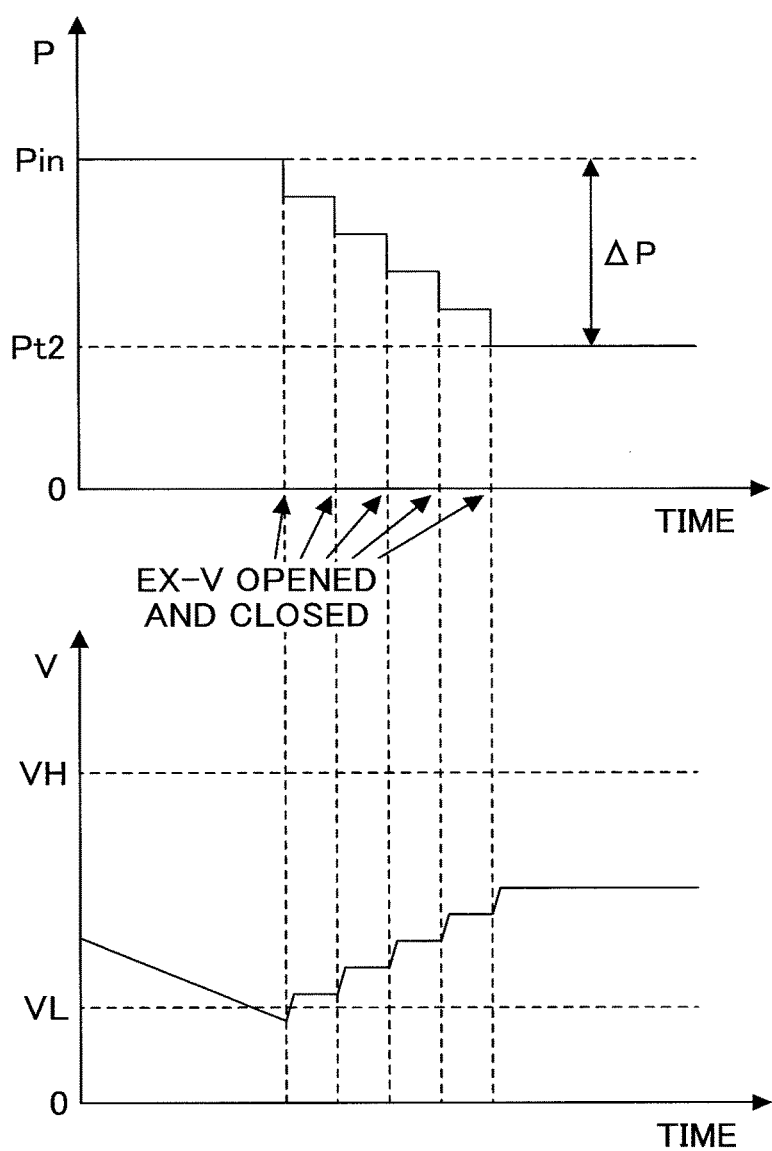

EXCIMER LASER APPARATUS AND EXCIMER LASER SYSTEM

CROSS-REFERENCE TO RELATED APPLICATIONS

The present application is a divisional of and claims priority to U.S. patent application Ser. No. 13/656,917 filed Oct. 22, 2012, which claims priority from Japanese Patent Application No. 2011-234057 filed Oct. 25, 2011, and Japanese Patent Application No. 2012-160399 filed Jul. 19, 2012, the contents of which are all herein incorporated by reference in their entirety.

TECHNICAL FIELD

The present disclosure relates to excimer laser apparatuses and excimer laser systems.

RELATED ART

The recent miniaturization and increased levels of integration of semiconductor integrated circuits has led to a demand for increases in the resolutions of semiconductor exposure devices (called "exposure devices" hereinafter). Accordingly, advances are being made in the reduction of the wavelengths of light emitted from exposure light sources. Typically, gas laser apparatuses are being used as exposure light sources instead of conventional mercury lamps. For example, a KrF excimer laser apparatus that outputs ultraviolet laser light at a wavelength of 248 nm and an ArF excimer laser apparatus that outputs ultraviolet laser light at a wavelength of 193 nm are used as gas laser apparatuses for exposure.

SUMMARY

An excimer laser apparatus according to a first aspect of the present disclosure may include: a laser chamber containing a gas; at least a pair of electrodes disposed within the laser chamber; a power source unit that supplies a voltage between the electrodes; a gas supply unit, connected to a first receptacle that holds a first laser gas containing halogen gas and a second receptacle that holds a second laser gas having a lower halogen gas concentration than the first laser gas, that supplies the first laser gas and the second laser gas to the interior of the laser chamber; a gas exhaust unit that partially exhausts gas from within the laser chamber; and a gas control unit that controls the gas supply unit and the gas exhaust unit. The gas control unit may selectively perform gas pressure control in which the gas supply unit supplies the second laser gas to the interior of the laser chamber or the gas exhaust unit partially exhausts gas from within the laser chamber, and partial gas replacement control in which the gas supply unit supplies the first laser gas and the second laser gas to the interior of the laser chamber and the gas exhaust unit partially exhausts gas from within the laser chamber sequentially.

An excimer laser system according to a second aspect of the present disclosure may include: a first excimer laser apparatus that includes a first laser chamber containing a gas, at least a pair of first electrodes disposed within the first laser chamber, and a first resonator disposed sandwiching the first laser chamber; a second excimer laser apparatus that includes a second laser chamber containing a gas, at least a pair of second electrodes disposed within the second laser chamber, and a second resonator disposed sandwiching the second laser chamber, and that amplifies laser light outputted from the first excimer laser apparatus; at least one power source unit that supplies a voltage between the first electrodes and the second electrodes; a gas supply unit, connected to a first receptacle that holds a first laser gas containing halogen gas and a second receptacle that holds a second laser gas having a lower halogen gas concentration than the first laser gas, that supplies the first laser gas and the second laser gas to the interiors of the first laser chamber and the second laser chamber; a gas exhaust unit that partially exhausts gas from within the first laser chamber and the second laser chamber; and a gas control unit that controls the gas supply unit and the gas exhaust unit. The gas control unit may selectively perform: a first gas pressure control in which the gas supply unit supplies the second laser gas to the interior of the first laser chamber or the gas exhaust unit partially exhausts gas from within the first laser chamber; a second gas pressure control in which the gas supply unit supplies the second laser gas to the interior of the second laser chamber or the gas exhaust unit partially exhausts gas from within the second laser chamber; a first partial gas replacement control in which the gas supply unit supplies the first laser gas and the second laser gas to the interior of the first laser chamber and the gas exhaust unit partially exhausts gas from within the first laser chamber sequentially; and a second partial gas replacement control in which the gas supply unit supplies the first laser gas and the second laser gas to the interior of the second laser chamber and the gas exhaust unit partially exhausts gas from within the second laser chamber sequentially.

An excimer laser apparatus according to a third aspect of the present disclosure may include: a laser chamber containing a gas; at least a pair of electrodes disposed within the laser chamber; a power source unit that supplies a voltage between the electrodes; a gas supply unit, connected to a first receptacle that holds a first laser gas containing halogen gas and a second receptacle that holds a second laser gas having a lower halogen gas concentration than the first laser gas, that supplies the first laser gas and the second laser gas to the interior of the laser chamber; a gas exhaust unit that partially exhausts gas from within the laser chamber; and a gas control unit that controls the gas supply unit and the gas exhaust unit. The gas control unit may selectively perform partial gas replacement control in which the gas supply unit supplies the first laser gas and the second laser gas to the interior of the laser chamber and the gas exhaust unit partially exhausts gas from within the laser chamber sequentially, and halogen gas filling control in which the gas supply unit supplies the first laser gas to the interior of the laser chamber and the gas exhaust unit partially exhausts gas from within the laser chamber sequentially.

BRIEF DESCRIPTION OF THE DRAWINGS

Exemplary embodiments of the present disclosure will be described hereinafter with reference to the appended drawings.

FIG. 11A is a graph illustrating changes in a gas pressure within a laser chamber and a voltage applied between electrodes resulting from the opening/closing of a second laser gas injection valve, indicated in FIG. 9.

FIG. 11B is a graph illustrating changes in a gas pressure within a laser chamber and a voltage applied between electrodes resulting from the opening/closing of an exhaust valve, indicated in FIG. 9.

DETAILED DESCRIPTION

Figure 1:
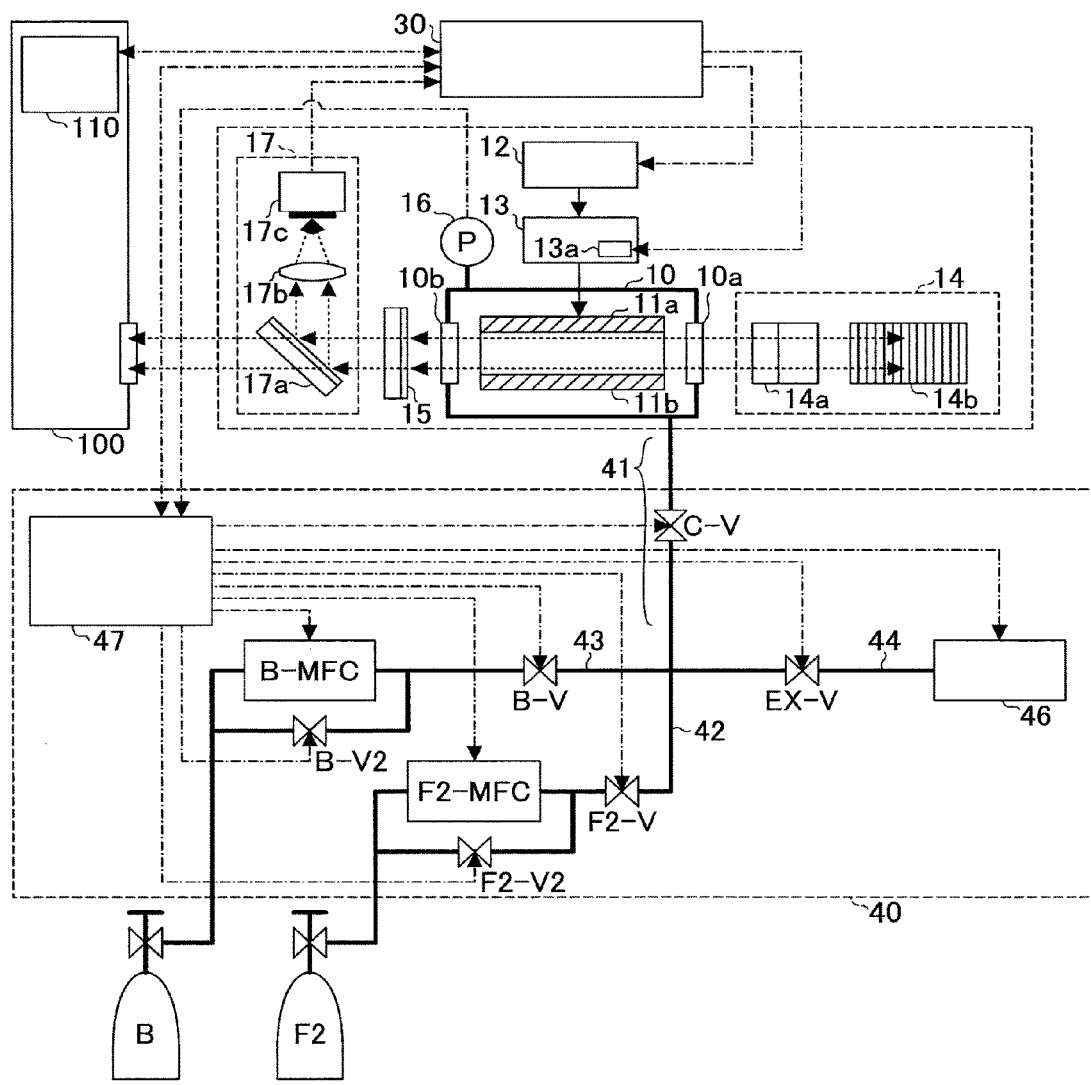
FIG. 1 schematically illustrates the configuration of an excimer laser apparatus according to a first embodiment.

Details
1. Outline
2. Explanation of Terms
3. Overall Description of Excimer Laser Apparatus
   3.1 Laser Chamber
   3.2 Optical Resonator
   3.3 Various Types of Sensors
   3.4 Laser Control Unit
   3.5 Gas Control Device
4. Gas Control in Excimer Laser Apparatus
   4.1 Outline of Gas Control
   4.2 Main Flow
   4.3 Voltage Control by Laser Control Unit
   4.4 Duty Calculation by Laser Control Unit
   4.5 Calculation of Gas Control Interval (Details of S300)
   4.6 Calculation of Halogen Gas Partial Pressure (Details of S400)
   4.7 Calculation of Gas Replacement Amount (Details of S500)
   4.8 Gas Pressure Control (Details of S600)
   4.9 Halogen Gas Filling Control (Details of S700)
   4.10 Partial Gas Replacement Control (Details of S800)

5. Second Embodiment (Integrated Control Including Partial Gas Replacement Control and Halogen Gas Filling Control)
   5.1 Outline of Gas Control
   5.2 Main Flow
   5.3 Calculation of Gas Control Interval (Details of S340)
   5.4 Partial Gas Replacement and Halogen Gas Filling Control (Details of S840)
6. Third Embodiment (MOPO System)
   6.1 Overall Description of MOPO System
   6.2 Gas Control in MOPO System
7. Fourth Embodiment (Integration of Control in MOPO System)
8. Fifth Embodiment (Integration of Chargers in MOPO System)
9. Sixth Embodiment (MOPO System Including Ring Resonator)

Embodiments of the present disclosure will be described in detail hereinafter with reference to the drawings. The embodiments described hereinafter indicate several examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted.

1. Outline

The output of desired pulsed laser light that is stable over a long period of time can be desired in an excimer laser apparatus for an exposure device. When laser oscillation is performed over a long period of time in an excimer laser apparatus, impurities are produced within a laser chamber; when those impurities absorb laser light, worsen a discharge state, or the like, it is possible that the excimer laser apparatus will be unable to output the desired pulsed laser light. In such a case, it can be necessary to stop the laser oscillation, exhaust almost all of the gas from within the laser chamber, and newly inject a gas that will serve as a laser medium. This process is called "complete gas replacement". However, it is possible that the exposure device is unable to perform exposure while the laser oscillation is stopped.

According to one aspect of the present disclosure, gas pressure control, halogen gas filling control, and partial gas replacement control may be carried out selectively in a laser chamber during laser oscillation. Through this, a worsening of the environment within the laser chamber can be suppressed, and the number of complete gas replacements can be suppressed.

2. Explanation of Terms

Several terms used in the present application will be described hereinafter.

A "first laser gas" may be a laser gas that contains a halogen gas.

A "second laser gas" may be a laser gas that has a lower concentration of halogen gas than the first laser gas.

"Gas pressure control" may be control that either supplies the second laser gas to the interior of a laser chamber or partially exhausts gas from within the laser chamber.

"Halogen gas filling control" may be control that sequentially supplies the first laser gas to the interior of a laser chamber and then partially exhausts gas from within the laser chamber.

"Partial gas replacement control" may be control that sequentially supplies the first laser gas and the second laser gas to the interior of a laser chamber and then partially exhausts gas from within the laser chamber.

3. Overall Description of Excimer Laser Apparatus

FIG. 1 schematically illustrates the configuration of an excimer laser apparatus according to a first embodiment. The excimer laser apparatus shown in FIG. 1 may include: a laser chamber 10; a pair of electrodes 11a and 11b; a charger 12; a pulse power module (PPM) 13; a line narrow module 14; an output coupling mirror 15; a pressure sensor 16; an optical sensor module 17; a laser control unit 30; and a gas control device 40. The excimer laser apparatus shown in FIG. 1 may be connected to an exposure device 100 that carries out exposure using laser light outputted from the excimer laser apparatus.

3.1 Laser Chamber

The laser chamber 10 may be a chamber containing a laser gas serving as a laser medium, that contains, for example, argon, neon, fluorine, and the like. The pair of electrodes 11a and 11b can be disposed within the laser chamber 10 as electrodes for pumping the laser medium through a discharge. The charger 12 may be configured of, for example, a capacitor connected to a power source device, and can hold electrical energy for applying a high voltage between the pair of electrodes 11a and 11b. The pulse power module 13 may include a switch 13a that is controlled by the laser control unit 30. When the switch 13a changes from OFF to ON, the pulse power module 13 may generate a pulse-form high voltage with the electrical energy held in the charger 12, and may apply that high voltage between the pair of electrodes 11a and 11b.

When the high voltage is applied between the pair of electrodes 11a and 11b, a discharge can occur between the pair of electrodes 11a and 11b. The laser medium within the laser chamber 10 can be pumped by the energy of the discharge and can transition to a high-energy level. When the pumped laser medium then transitions to a low-energy level, light can be emitted based on the difference between the energy levels.

Windows 10a and 10b may be provided at both ends of the laser chamber 10. The light produced within the laser chamber 10 can be emitted to the exterior of the laser chamber 10 via the windows 10a and 10b.

3.2 Optical Resonator

The line narrow module 14 may include a prism 14a and a grating 14b. The prism 14a can expand the beam width of the light emitted from the laser chamber 10, and can allow that light to pass through to the grating 14b. In addition, the prism 14a can reduce the beam width of light reflected from the grating 14b, and can allow that light to pass through to the laser chamber 10. In addition, the prism 14a can, when allowing light to pass therethrough, refract the light to a different angle in accordance with the wavelength of the light. Accordingly, the prism 14a can function as a wavelength dispersion element.

The grating 14b is configured of a highly-reflective material, and can be a wavelength dispersion element in which many grooves are formed in the surface thereof at predetermined intervals. Each groove may, for example, be a triangular groove. The light that enters into the grating 14b from the prism 14a can reflect in multiple directions that are vertical relative to the directions of the respective grooves (the vertical direction, in FIG. 1) at the sloped surfaces of those respective grooves. When the reflected light reflected at a given groove overlaps with the reflected light reflected at another given groove, the difference in the optical path lengths between those instances of reflected light depends on the angle of reflection of those instances of reflected light.

When the light is of a wavelength that corresponds to the difference in the optical path lengths, the phases of the instances of reflected light can match and reinforce each other, whereas when the light is of a wavelength that does not correspond to the optical path length, the phases of the instances of reflected light do not match and can weaken each other. Due to this interference effect, light in the vicinity of a specific wavelength based on the angle of reflection can be extracted, and light that contains a large amount of that light of the specific wavelength can be returned to the laser chamber 10 via the prism 14a.

In this manner, the line narrow module 14, which reduces the spectral width of laser light, can be configured by the prism 14a and the grating 14b extracting light of a specific wavelength and returning that light to the laser chamber 10.

The surface of the output coupling mirror 15 may be coated with a partially-reflective film. Accordingly, the output coupling mirror 15 may allow some of the light outputted from the laser chamber 10 to pass through, thus outputting that light, and may reflect the remainder of the light and return the reflected light to the interior of the laser chamber 10.

The distance between the output coupling mirror 15 and the grating 14b can be set to a distance at which light of a predetermined wavelength outputted from the laser chamber 10 forms a standing wave. Accordingly, an optical resonator can be configured from the line narrow module 14 and the output coupling mirror 15. The light emitted from the laser chamber 10 can travel back and forth between the line narrow module 14 and the output coupling mirror 15, and can be amplified each time it passes between the electrode 11a and the electrode 11b (a laser gain space) within the laser chamber 10. Some of the amplified light can then be outputted as output laser light via the output coupling mirror 15.

3.3 Various Types of Sensors

The pressure sensor 16 may detect a gas pressure within the laser chamber 10 and output that gas pressure to the gas control device 40. The optical sensor module 17 may include a beam splitter 17a, a focusing optical system 17b, and an optical sensor 17c. The beam splitter 17a may allow the output laser light that has passed through the output coupling mirror 15 to pass through toward the exposure device 100 at a high level of transmissibility, and may reflect some of the output laser light toward the focusing optical system 17b. The focusing optical system 17b may focus the light reflected by the beam splitter 17a on to a photosensitive surface of the optical sensor 17c. The optical sensor 17c may detect a value regarding a pulse energy of the laser light focused on the photosensitive surface, and may output, to the laser control unit 30, data based on the detected value regarding the pulse energy.

3.4 Laser Control Unit

The laser control unit 30 may exchange various types of signals with an exposure device controller 110 provided in the exposure device 100. For example, a laser light output start signal may be received from the exposure device controller 110. In addition, the laser control unit 30 may send a charging voltage setting signal to the charger 12, an instruction signal for turning a switch on or off to the pulse power module 13, or the like.

The laser control unit 30 may receive data based on the pulse energy from the optical sensor module 17, and may control the charging voltage of the charger 12 by referring to that data based on the pulse energy. The voltage applied between the pair of electrodes 11a and 11b may be controlled by controlling the charging voltage of the charger 12.

In addition, the laser control unit 30 may count the number of oscillation pulses in the excimer laser apparatus based on data received from the optical sensor module 17. In addition, the laser control unit 30 may exchange various types of signals with a gas control unit 47 provided in the gas control device 40. For example, the laser control unit 30 may send, to the gas control device 40, data of the number of oscillation pulses in the excimer laser apparatus.

3.5 Gas Control Device

The gas control device 40 may be connected to a first receptacle F2 that contains the first laser gas, which contains a halogen gas such as fluorine gas ($F_2$), and to a second receptacle B that contains the second laser gas, which contains a buffer gas. A mixed gas that is a mixture of argon, neon, and fluorine may be used as the first laser gas. A mixed gas that is a mixture of argon and neon may be used as the second laser gas. Although valves may be provided at the gas extraction nozzles of the first receptacle F2 and the second receptacle B, it is preferable for these valves to be open at least while the excimer laser apparatus is operational.

The gas control device 40 may include an exhaust pump 46, the gas control unit 47, and various types of valves and a mass flow controller, which will be described below. One end of a first pipe 41 may be connected to the laser chamber 10, and a control valve C-V may be provided in the first pipe 41. The other end of the first pipe 41 may be connected to a second pipe 42 that is connected to the first receptacle F2, a third pipe 43 that is connected to the second receptacle B, and a fourth pipe 44 that is connected to the exhaust pump 46.

A first laser gas injection valve F2-V that controls the supply of the first laser gas may be provided in the second pipe 42. The second pipe 42 may branch in two ways, with a mass flow controller F2-MFC provided in one branch and a bypass valve F2-V2 provided in the other branch. The bypass valve F2-V2 may be opened only when laser oscillation is stopped and complete gas replacement is being carried out, and always closed during laser oscillation. When the first laser gas is supplied to the interior of the laser chamber 10 during laser oscillation, the control valve C-V and the first laser gas injection valve F2-V may be opened, and the flow rate of the first laser gas supplied to the interior of the laser chamber 10 may be controlled by the mass flow controller F2-MFC.

A second laser gas injection valve B-V that controls the supply of the second laser gas may be provided in the third pipe 43. The third pipe 43 may branch in two ways, with a mass flow controller B-MFC provided in one branch and a bypass valve B-V2 provided in the other branch. The bypass valve B-V2 may be opened only when laser oscillation is stopped and complete gas replacement is being carried out, and always closed during laser oscillation. When the second laser gas is supplied to the interior of the laser chamber 10 during laser oscillation, the control valve C-V and the second laser gas injection valve B-V may be opened, and the flow rate of the second laser gas supplied to the interior of the laser chamber 10 may be controlled by the mass flow controller B-MFC.

An exhaust valve EX-V that controls the exhaust of gas from within the laser chamber 10 may be provided in the fourth pipe 44. When controlling the exhaust of gas from within the laser chamber 10, the exhaust pump 46 may be driven and the exhaust valve EX-V and the control valve C-V may be opened.

The gas control unit 47 may exchange various types of signals with the laser control unit 30, and may furthermore receive data of a gas pressure within the laser chamber 10 from the pressure sensor 16. The gas control unit 47 may control the control valve C-V, the first laser gas injection valve F2-V, the mass flow controller F2-MFC, the second laser gas injection valve B-V, the mass flow controller B-MFC, the bypass valve F2-V2, the bypass valve B-V2, the exhaust valve EX-V, the exhaust pump 46, and so on.

4. Gas Control in Excimer Laser Apparatus 4.1 Outline of Gas Control

Figure 2:
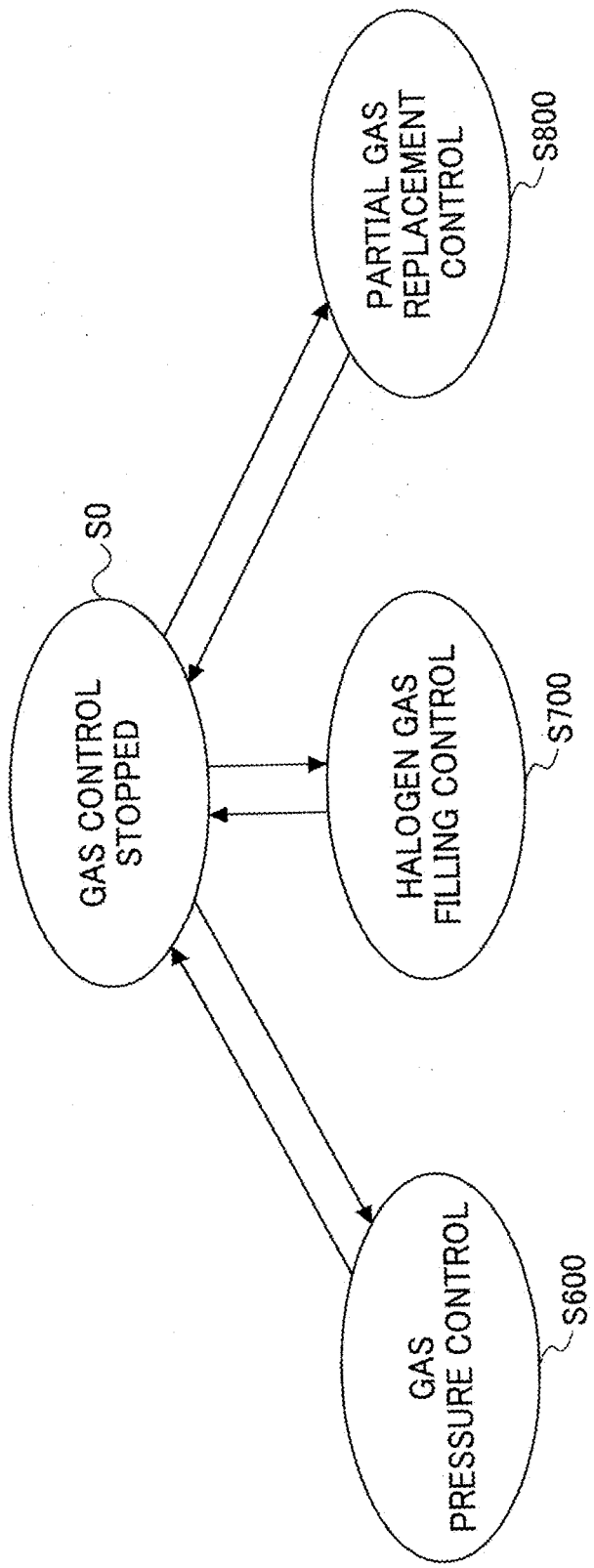
FIG. 2 is a state transition diagram illustrating gas control according to the first embodiment.

FIG. 2 is a state transition diagram illustrating gas control according to the first embodiment. As shown in FIG. 2, the gas control according to the first embodiment may include gas pressure control (S600), halogen gas filling control (S700), and partial gas replacement control (S800). A gas control stopped state (S0) may be included as well. These gas controls may be carried out by the gas control unit 47 (FIG. 1).

The gas pressure control (S600) may be gas control for controlling the output of laser light by controlling the gas pressure within the laser chamber 10. In an excimer laser apparatus, the charging voltage of the charger 12 can be controlled (that is, the voltage applied between the pair of electrodes 11a and 11b may be controlled) based on data obtained from the optical sensor module 17, in order to hold the laser light pulse energy at a desired value. For example, the voltage applied between the pair of electrodes 11a and 11b can be increased in the case where the laser light pulse energy tends to drop due to the influence of impurities within the laser chamber 10 or other operational conditions. However, increasing or reducing the voltage too much can cause unstable discharges, which in turn can lead to the excimer laser apparatus operating in an unstable manner.

Accordingly, in the gas pressure control, a desired laser light output may be obtained by controlling the gas pressure within the laser chamber 10, thus making it possible to avoid increasing or reducing the voltage too much. Specifically, in the case where a voltage V applied between the pair of electrodes 11a and 11b is higher than a first threshold VH, the gas pressure may be increased by supplying the second laser gas to the laser chamber 10. Likewise, in the case where the voltage V applied between the pair of electrodes 11a and 11b is lower than a second threshold VL that is itself lower than the first threshold VH, the gas pressure may be reduced by partially exhausting the gas from within the laser chamber 10.

The halogen gas filling control (S700) may be gas control for restoring the halogen gas partial pressure that has dropped within the laser chamber 10 to a predetermined value. The inert gas of which the laser gas within the laser chamber 10 is configured is chemically stable, but the halogen gas, such as fluorine, that configures the laser gas is highly reactive with other matter, and easily results in impurities upon reacting with, for example, electrode materials. Accordingly, if laser light is outputted for a long period of time, the halogen gas within the laser chamber 10 can progressively decrease (that is, the halogen gas partial pressure can decrease).

Accordingly, in the halogen gas filling control, the first laser gas may be injected into the laser chamber 10 each time a predetermined amount of time passes, and the same amount (volume) as that injection amount may be exhausted from the laser chamber 10.

The partial gas replacement control (S800) may be gas control for exhausting impurities from the laser chamber 10. In an excimer laser apparatus, the concentration of impurities within the laser chamber 10 may rise progressively when laser light is outputted over a long period of time, and it is possible that the desired pulsed laser light cannot be outputted.

Accordingly, in the partial gas replacement control, the first laser gas and the second laser gas may be injected into the laser chamber 10 each time a predetermined amount of time passes, and the same amount (volume) as the total injection amount may be exhausted from the laser chamber 10. In addition, the injection amount of the first laser gas and the injection amount of the second laser gas may be calculated so that the halogen gas partial pressure in the laser chamber 10 does not change between before and after the partial gas replacement control.

In the case where the conditions for gas pressure control (S600) are in place, the gas control unit 47 (FIG. 1) may transit from the gas control stopped state (S0) to the gas pressure control, and in the case where the gas pressure control has ended, may transit from the gas pressure control to the gas control stopped state.

In the case where the conditions for the halogen gas filling control (S700) are in place, the gas control unit 47 may transit from the gas control stopped state (S0) to the halogen gas filling control, and in the case where the halogen gas filling control has ended, may transit from the halogen gas filling control to the gas control stopped state.

In the case where the conditions for the partial gas replacement control (S800) are in place, the gas control unit 47 may transit from the gas control stopped state (S0) to the partial gas replacement control, and in the case where the partial gas replacement control has ended, may transit from the partial gas replacement control to the gas control stopped state.

4.2 Main Flow

Figure 3:
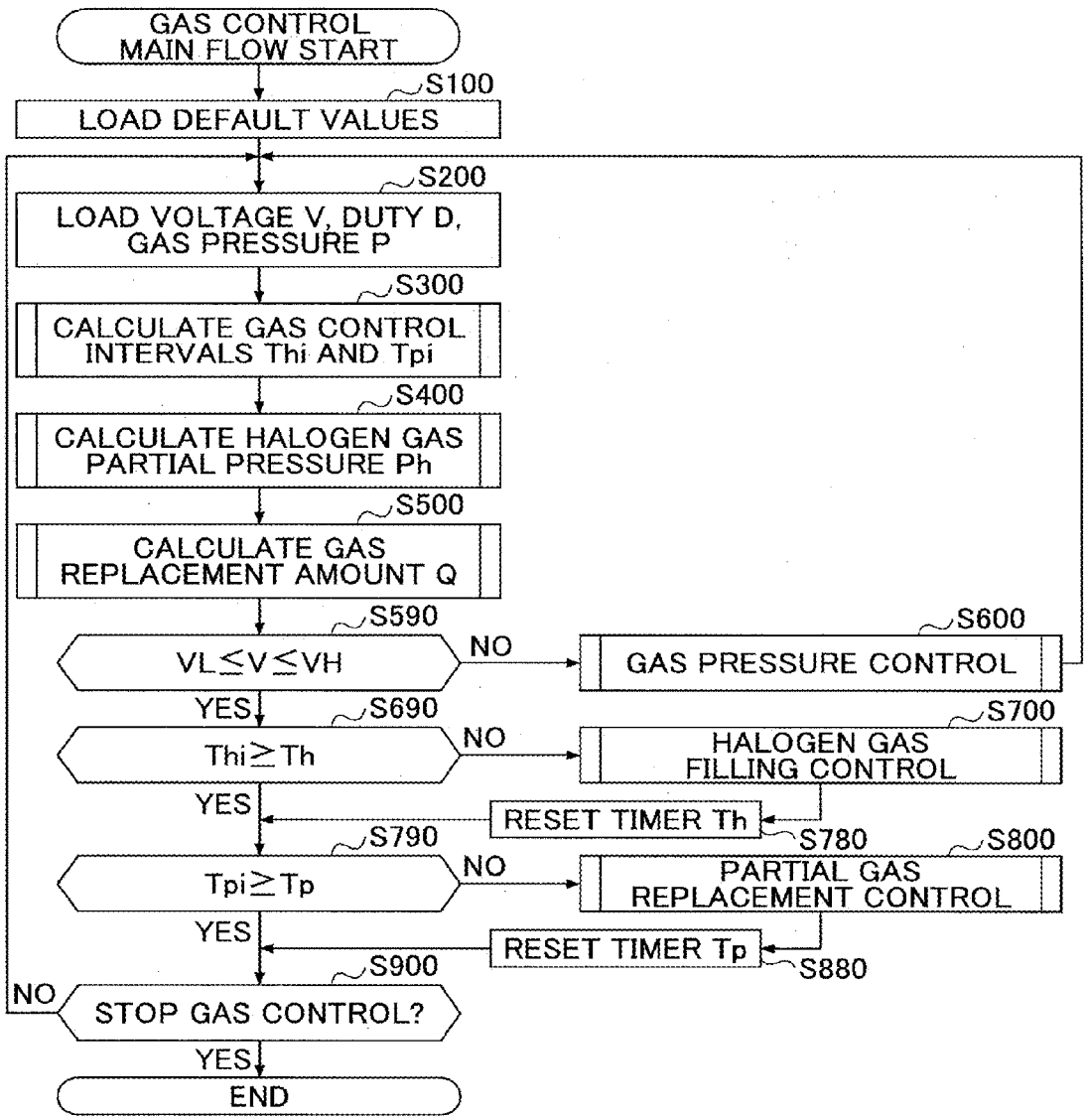
FIG. 3 is a flowchart illustrating gas control according to the first embodiment.

FIG. 3 is a flowchart illustrating the gas control according to the first embodiment. The processes shown in FIG. 3 may be carried out by the gas control unit 47 (FIG. 1). The processes shown in FIG. 3 can include the gas pressure control (S600), the halogen gas filling control (S700), and the partial gas replacement control (S800).

First, the gas control unit 47 may load default values required for the gas control (S100). These default values may include, for example, various types of proportionality constants, thresholds used for control, and so on. The proportionality constants may, for example, be a, b, c, g, h, k, and so on as mentioned later, and the thresholds may be the first threshold VH, the second threshold VL, and so on, also mentioned later. Time measurement performed by timers Th and Tp may be started as well.

Next, the gas control unit 47 may load the voltage V, a duty D, and a gas pressure P (S200). The voltage V may be a voltage supplied between the pair of electrodes 11a and 11b, and may be received from the laser control unit 30. The duty D may be a ratio of a maximum value of a repetition rate of laser light relative to the overall cycle (that is, a duty), and may be received from the laser control unit 30. The gas pressure P may be the gas pressure within the laser chamber 10, and may be received from the pressure sensor 16.

Next, the gas control unit 47 may calculate a time interval Thi for the halogen gas filling control and a time interval Tpi for the partial gas replacement control (S300). Details of these calculation processes will be provided later.

Next, the gas control unit 47 may calculate a halogen gas partial pressure Ph within the laser chamber 10 (S400). Details of this calculation process will be provided later.

Next, the gas control unit 47 may calculate a gas replacement amount Q used in the partial gas replacement control (S500). Details of this calculation process will be provided later.

Next, the gas control unit 47 may compare the voltage V supplied between the pair of electrodes 11a and 11b with the first threshold VH and the second threshold VL (S590). In the case where the voltage V is not within the range from the first threshold VH to the second threshold VL (V<VL or VH<V), it may be determined that the conditions for gas pressure control are in place, and the gas control unit 47 may then carry out the gas pressure control (S600). Details of the gas pressure control will be given later. When the gas pressure control has ended, the process may return to the aforementioned S200, and various types of parameters may be loaded. As will be discussed later, there are cases, in the gas pressure control, where the halogen gas partial pressure Ph drops during control for reducing the gas pressure; therefore, by returning to the aforementioned S200, the halogen gas partial pressure Ph can be recalculated and the halogen gas filling control and the like can be carried out properly.

In the case where the voltage V is within the range from the first threshold VH to the second threshold VL (VL≤V≤VH), the gas control unit 47 may compare the timer Th with the time interval Thi of the halogen gas filling control (S690) In the case where the timer Th has reached the time interval Thi of the halogen gas filling control (Thi<Th), it may be determined that the conditions for halogen gas filling control are in place, and the gas control unit 47 may carry out the halogen gas filling control (S700). Details of the halogen gas filling control will be given later. When the halogen gas filling control has ended, the timer Th may be reset (S780).

In the case where the timer Th has not reached the time interval Thi of the halogen gas filling control (Thi≤Th), or after the timer Th has been reset (S780), the gas control unit 47 may compare the timer Tp with the time interval Tpi of the partial gas replacement control (S790). In the case where the timer Tp has reached the time interval Tpi of the partial gas replacement control (Tpi<Tp), it may be determined that the conditions for the partial gas replacement control are in place, and the gas control unit 47 may carry out the partial gas replacement control (S800). Details of the partial gas replacement control will be given later. When the partial gas replacement control has ended, the timer Tp may be reset (S880).

In the case where the timer Tp has not reached the time interval Tpi of the partial gas replacement control (Tpi≤Tp), or after the timer Tp has been reset (S880), the gas control unit 47 may determine whether or not to stop the gas control (S900). The determination as to whether or not to stop the gas control may be carried out based on whether or not a stop signal has been received from the laser control unit 30. In the case where the gas control is to be stopped (S900: YES), the process illustrated in this flowchart may end. However, in the case where the gas control is not to be stopped (S900: NO), the process may return to the aforementioned S200, and various types of parameters may be loaded.

4.3 Voltage Control by Laser Control Unit

Figure 4:
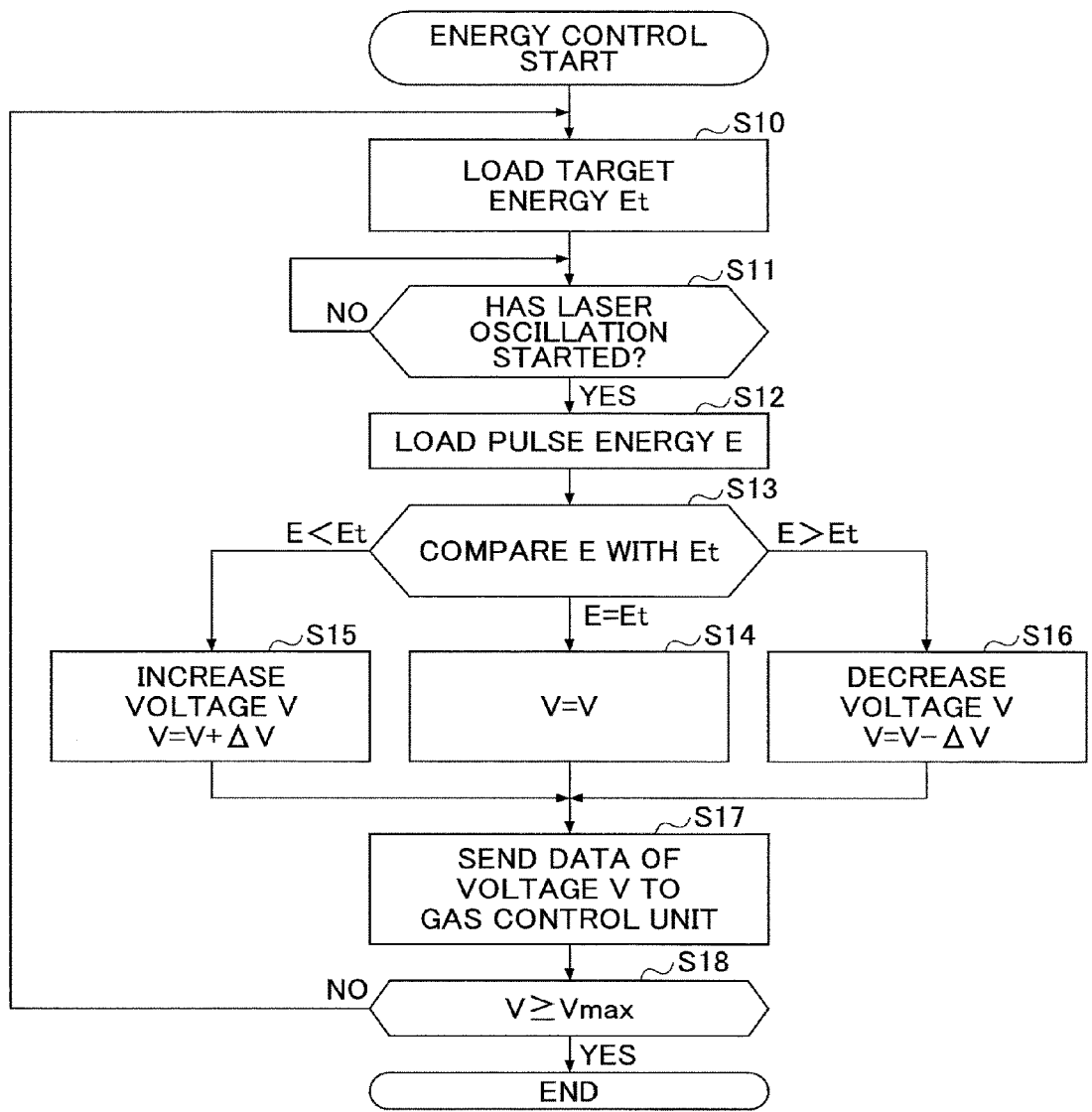
FIG. 4 is a flowchart illustrating control of a voltage applied between electrodes according to the first embodiment.

FIG. 4 is a flowchart illustrating control of a voltage applied between electrodes according to the first embodiment. The processes shown in FIG. 4 may be carried out by the laser control unit 30 (FIG. 1) independent from the gas control shown in FIG. 3. In the processing shown in FIG. 4, the charging voltage of the charger 12 may be controlled (that is, the voltage applied between the pair of electrodes 11a and 11b may be controlled), based on data obtained from the optical sensor module 17, in order to hold the laser light pulse energy at a desired value. Although the processes shown in FIG. 4 are carried out separately from the gas control shown in FIG. 3, the following descriptions assume that the gas control can be a prerequisite.

First, the laser control unit 30 may load the value of a target pulse energy Et for the laser light (S10). The value of the target pulse energy Et may, for example, be a value required by the configuration of the exposure device 100.

Next, the laser control unit 30 may determine whether or not laser oscillation has been started (S11). Whether or not the laser oscillation has been started may be determined based on whether or not the laser control unit 30 has sent various types of signals for laser oscillation to the charger 12 and the pulse power module 13. Alternatively, whether or not the laser oscillation has been started may be determined based on whether or not data of a pulse energy E has been received from the optical sensor module 17.

Next, the laser control unit 30 may load the value of the pulse energy E for the laser light (S12). The value of the pulse energy E may be a value received from the optical sensor module 17.

Next, the laser control unit 30 may compare the value of the pulse energy E for the laser light with the value of the target pulse energy Et of the laser light (S13).

In the case where the value of the pulse energy E is equal to the value of the target pulse energy Et (E=Et), the laser control unit 30 may hold the voltage V applied between the pair of electrodes 11a and 11b at a present value V (S14: V=V).

However, in the case where the value of the pulse energy E is less than the value of the target pulse energy Et (E<Et), the laser control unit 30 may increase the voltage V applied between the pair of electrodes 11a and 11b to a value in which a predetermined fluctuation amount ΔV has been added to the present value V (S15: V=V+ΔV). Through this, the pulse energy E can be raised and brought closer to the target pulse energy Et.

Meanwhile, in the case where the value of the pulse energy E is greater than the value of the target pulse energy Et (E>Et), the laser control unit 30 may reduce the voltage V applied between the pair of electrodes 11a and 11b to a value in which the predetermined fluctuation amount ΔV has been subtracted from the present value V (S16: V=V−ΔV). Through this, the pulse energy E can be reduced and brought closer to the target pulse energy Et.

When the control of the voltage V (one of S14 through S16) has ended, the laser control unit 30 may send data of the voltage V to the gas control unit 47 (S17). Through this, the gas control unit 47 can determine (S590) whether or not the conditions for the gas pressure control (S600) shown in FIG. 3 are in place.

Next, the laser control unit 30 may determine whether or not the voltage V is greater than or equal to an upper limit value Vmax (S18). In the case where the voltage V is greater than or equal to the upper limit value Vmax (V≥Vmax), the laser light luminous efficiency is poor and it is necessary to stop the laser oscillation and perform maintenance (for example, complete gas replacement or the like), and thus the processing of this flowchart may be ended. However, in the case where the voltage V is not greater than or equal to the upper limit value Vmax (V<Vmax), the process may return to S10, where the pulse energy E is stabilized by controlling the voltage V and the data of the voltage V is sent to the gas control unit 47.

4.4 Duty Calculation by Laser Control Unit

Figure 5:
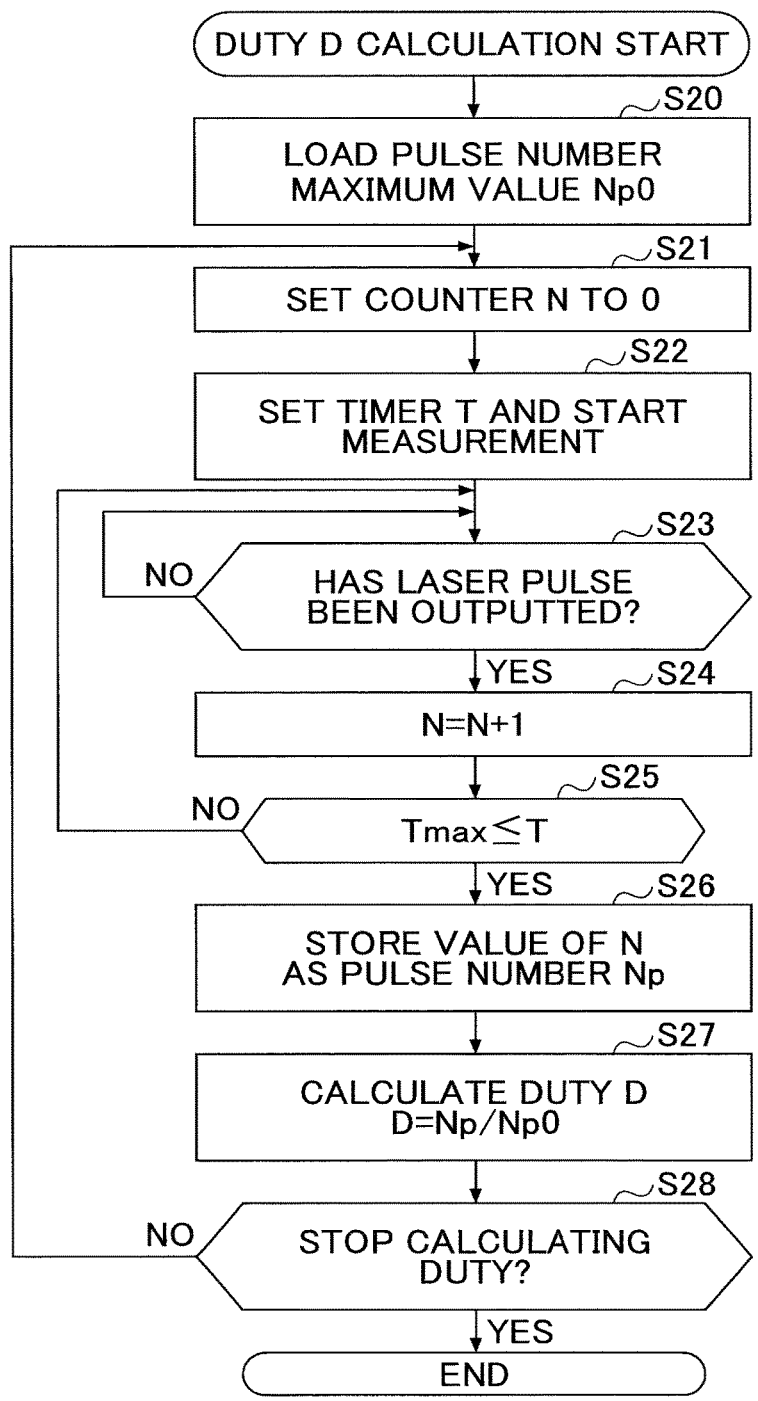
FIG. 5 is a flowchart illustrating the calculation of an excimer laser apparatus duty according to the first embodiment.

FIG. 5 is a flowchart illustrating the calculation of an excimer laser apparatus duty according to the first embodiment. The processes shown in FIG. 5 may be carried out by the laser control unit 30 (FIG. 1) independent from the gas control shown in FIG. 3. In the processing shown in FIG. 5, a ratio of a maximum repetition rate of the excimer laser apparatus relative to the overall repetition rate during laser oscillation may be calculated as the duty D. Although the processes shown in FIG. 5 are carried out separately from the gas control shown in FIG. 3, the following descriptions assume that the gas control can be a prerequisite.

First, the laser control unit 30 may load a pulse number Np0 in a set amount of time Tmax for the case where the excimer laser apparatus oscillates at the maximum repetition rate (S20).

Next, the laser control unit 30 may set a counter N for counting a laser light pulse number to 0 (S21).

Next, the laser control unit 30 may set a timer T for measuring the laser light pulse number in a set amount of time and start the measurement (S22).

Next, the laser control unit 30 may determine whether or not a laser pulse has been outputted (S23). The laser pulse may be a single pulse of laser light. The determination as to whether or not a laser pulse has been outputted may, for example, be determined based on whether or not data of the pulse energy E has been received from the optical sensor module 17. In the case where the laser pulse has not been outputted (S23: NO), the determination may be repeated until the laser pulse is outputted.

In the case where the laser pulse has been outputted (S23: YES), the laser control unit 30 may add 1 to the counter N (S24).

Next, the laser control unit 30 may determine whether or not the timer T has reached the set amount of time Tmax (S25). In the case where the set amount of time Tmax has not been reached (Tmax>T), the process may return to the aforementioned S23, and the pulse number may be measured by the counter N until the set amount of time Tmax has been reached.

In the case where the set amount of time Tmax has been reached (Tmax≤T), the laser control unit 30 may store the value of the counter N in a storage device as a pulse number Np for the set amount of time Tmax (S26).

Next, the laser control unit 30 may calculate the value of (Np/Np0) as the duty D (S27). In the case where the value of the duty D is the maximum value of 1, this can indicate that the excimer laser apparatus is oscillating at the maximum repetition rate. The value of the duty D may be sent from the laser control unit 30 to the gas control unit 47.

Next, the laser control unit 30 may determine whether or not to stop the calculation of the duty D (S28). In the case where the calculation is to be stopped, the process illustrated in this flowchart may end. However, in the case where the calculation is not to be stopped, the process may return to the aforementioned S21.

4.5 Calculation of Gas Control Interval (Details of S300)

Figure 6A:
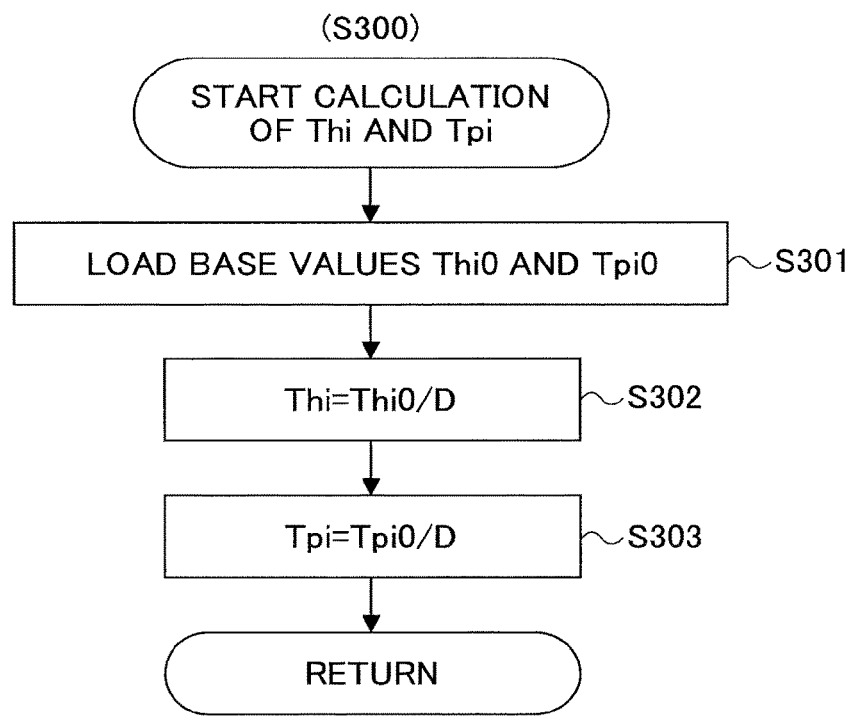
FIG. 6A is a flowchart illustrating a first example of a process that calculates a gas control interval, indicated in FIG. 3.

FIG. 6A is a flowchart illustrating a first example of a process that calculates a gas control interval, indicated in FIG. 3. The processes shown in FIG. 6A may be carried out by the gas control unit 47 as a subroutine of S300, shown in FIG. 3.

As described above, if laser light is outputted for a long period of time, the halogen gas within the laser chamber 10 can progressively decrease; accordingly, the halogen gas filling control may be carried out each time a predetermined amount of time has elapsed. Furthermore, if laser light is outputted for a long period of time, the concentration of impurities within the laser chamber 10 can progressively increase; accordingly, the partial gas replacement control may be carried out each time a predetermined amount of time has elapsed.

However, the decrease in halogen gas and increase in the concentration of impurities can also be influenced by the repetition rate of the laser light or the duty D (FIG. 5), in addition to the output time of the laser light. Accordingly, the gas control unit 47 may perform a correction computation for the predetermined amount of time, through the following process.

First, the gas control unit 47 may load a base value Thi0 of a time interval for halogen gas filling control and a base value Tpi0 of a time interval for partial gas replacement control (S301).

The gas control unit 47 may then calculate the time interval Thi of the halogen gas filling control, based on the base value Thi0 of the time interval for halogen gas filling control and the duty D of the excimer laser apparatus, as Thi0/D (S302). The duty D may be a value sent from the laser control unit 30.

In addition, the gas control unit 47 may calculate the time interval Tpi of the partial gas replacement control, based on the base value Tpi0 of the time interval for partial gas replacement control and the duty D of the excimer laser apparatus, as Tpi0/D (S303). The duty D may be a value sent from the laser control unit 30.

Figure 6B:
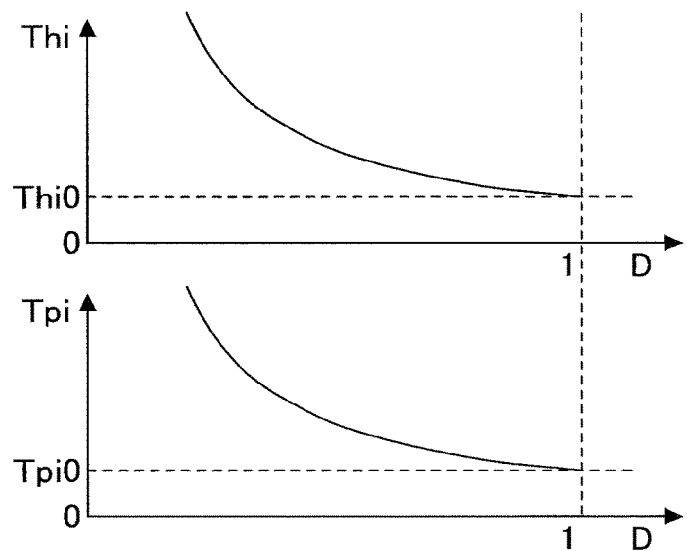
FIG. 6B is a graph illustrating a relationship between a duty of an excimer laser apparatus and the gas control interval calculated as shown in FIG. 6A.

FIG. 6B is a graph illustrating a relationship between the duty of the excimer laser apparatus and the gas control interval calculated as shown in FIG. 6A. The time interval Thi of the halogen gas filling control calculated as shown in FIG. 6A may be shortest when the duty D is 1 (that is, when oscillating at the maximum repetition rate), and may be a minimum value Thi0. In the case where the duty D is less than 1, the time interval Thi of the halogen gas filling control may be a value that is greater than the base value Thi0.

Likewise, the time interval Tpi of the partial gas replacement control calculated as shown in FIG. 6A may be shortest when the duty D is 1 (that is, when oscillating at the maximum repetition rate), and may be a minimum value Tpi0. In the case where the duty D is less than 1, the time interval Tpi for the partial gas replacement control may be a value that is greater than the base value Tpi0.

Through this, the halogen gas filling control and the partial gas replacement control can be carried out at an appropriate timing in accordance with the duty of the excimer laser apparatus.

Figure 6C:
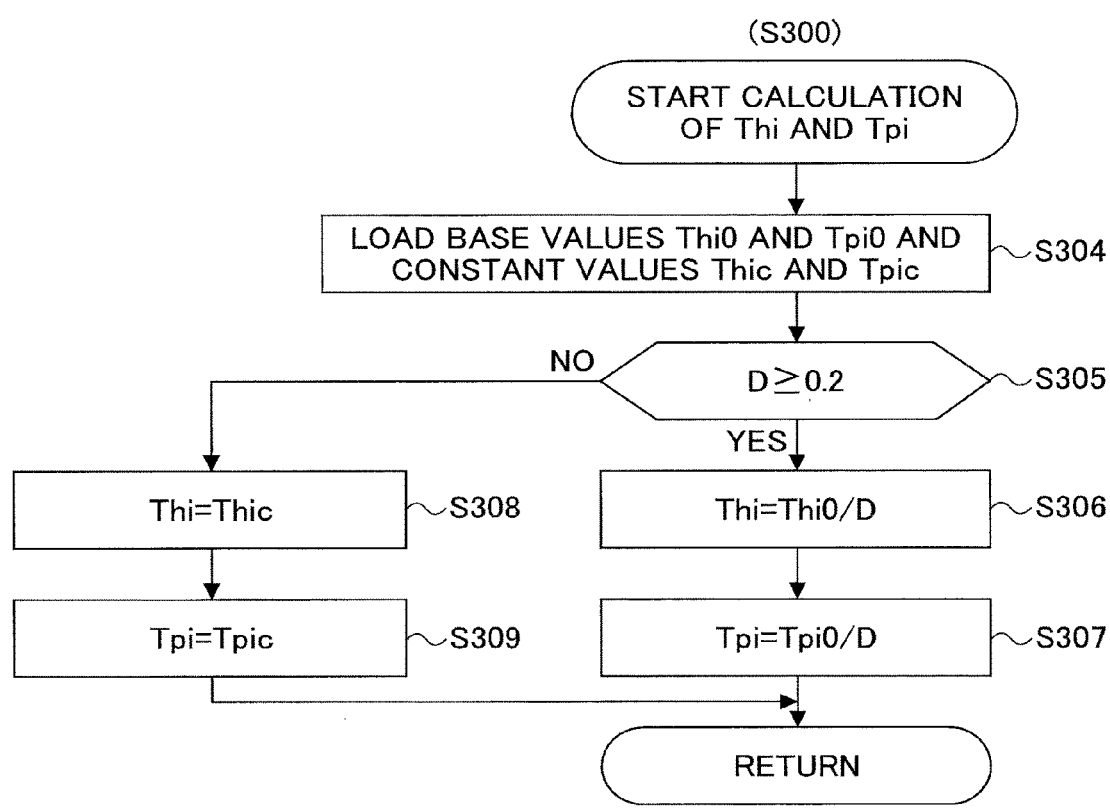
FIG. 6C is a flowchart illustrating a second example of a process that calculates a gas control interval, indicated in FIG. 3.

FIG. 6C is a flowchart illustrating a second example of a process that calculates a gas control interval, indicated in FIG. 3. The processes shown in FIG. 6C may be carried out by the gas control unit 47 as a subroutine of S300, shown in FIG. 3.

As described with reference to FIG. 6A, the decrease in halogen gas and increase in the concentration of impurities can be influenced by the repetition rate of the laser light or the duty D (FIG. 5). However, a decrease in the halogen gas and an increase in the concentration of impurities can also occur even if the laser light is not oscillating. Accordingly, by providing an upper limit value for the gas control interval, the gas control interval may be prevented from exceeding the upper limit value in the case where the laser light repetition rate is low.

First, the gas control unit 47 may load the base value Thi0 and a constant value Thic serving as an upper limit for the time interval for halogen gas filling control, and the base value Tpi0 and a constant value Tpic serving as an upper limit for the time interval for partial gas replacement control (S304).

Next, the gas control unit 47 may load the duty D of the excimer laser apparatus, and may determine whether or not the duty D is greater than or equal to a constant value (for example, 0.2) (S305).

In the case where the duty D is greater than or equal to the constant value (S305: YES), the gas control unit 47 may calculate the time interval Thi for the halogen gas filling control as Thi0/D, in the same manner as shown in FIG. 6A (S306). In addition, the gas control unit 47 may calculate the time interval Tpi for the partial gas replacement control as Tpi0/D (S307).

However, in the case where the duty D is not greater than or equal to the constant value (S305: NO), the gas control unit 47 may take the time interval Thi for the halogen gas filling control as the constant value Thic (S308). In addition, the gas control unit 47 may take the time interval Tpi for the partial gas replacement control as the constant value Tpic (S309).

Figure 6D:
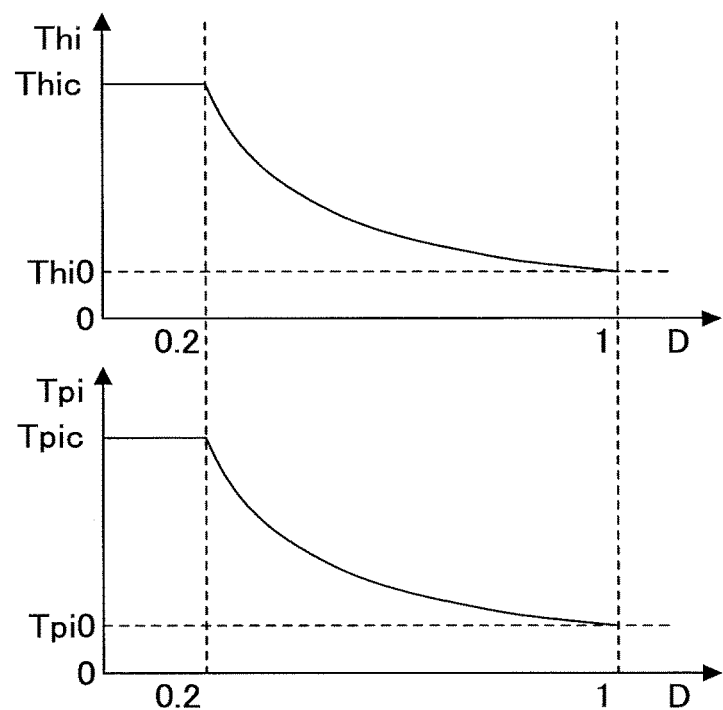
FIG. 6D is a graph illustrating a relationship between a duty of an excimer laser apparatus and the gas control interval calculated as shown in FIG. 6C.

FIG. 6D is a graph illustrating a relationship between the duty of the excimer laser apparatus and the gas control interval calculated as shown in FIG. 6C. The time interval Thi of the halogen gas filling control calculated as shown in FIG. 6C may be shortest when the duty D is 1, and may be the minimum value Thi0. In the case where the duty D is less than a constant value (for example, 0.2), the time interval Thi of the halogen gas filling control may be the constant value Thic.

Likewise, the time interval Tpi of the partial gas replacement control calculated as shown in FIG. 6C may be shortest when the duty D is 1, and may be the minimum value Tpi0. In the case where the duty D is less than a constant value (for example, 0.2), the time interval Tpi of the partial gas replacement control may be the constant value Tpic.

Through this, the halogen gas filling control and the partial gas replacement control can be carried out at an appropriate timing even in the case where the laser light oscillates with an extremely long oscillation interval, the case where the laser light is oscillating with a low duty D, and so on.

Figure 6E:
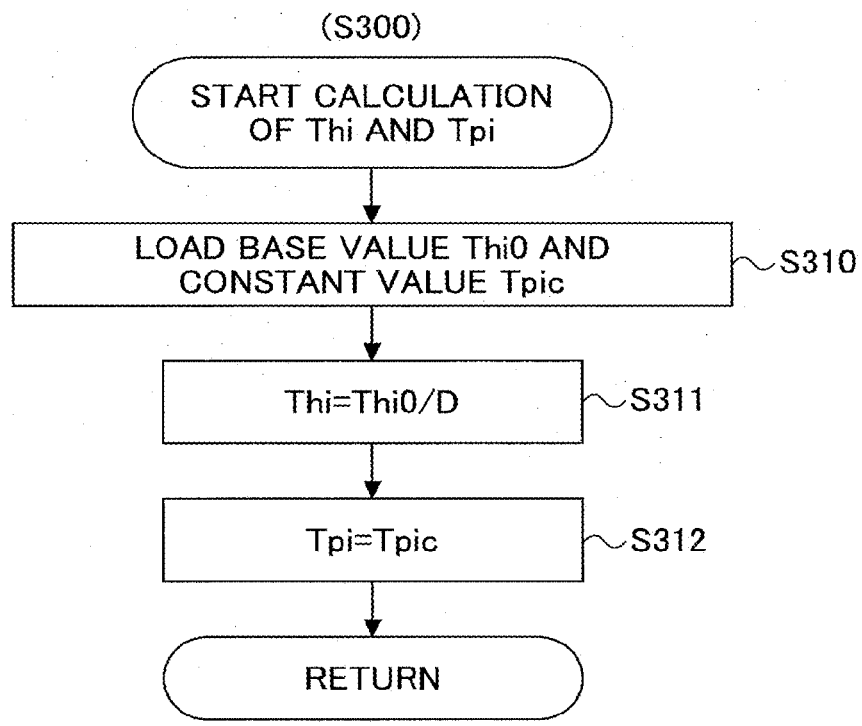
FIG. 6E is a flowchart illustrating a third example of a process that calculates a gas control interval, indicated in FIG. 3.

FIG. 6E is a flowchart illustrating a third example of a process that calculates a gas control interval, indicated in FIG. 3. The processes shown in FIG. 6E may be carried out by the gas control unit 47 as a subroutine of S300, shown in FIG. 3.

First, the gas control unit 47 may load the base value Thi0 of the time interval for halogen gas filling control and the constant value Tpic of the time interval for partial gas replacement control (S310).

The gas control unit 47 may calculate the time interval Thi of the halogen gas filling control as Thi0/D, in the same manner as shown in FIG. 6A (S311).

However, the gas control unit 47 may take the time interval Tpi for the partial gas replacement control as the constant value Tpic (S312).

Figure 6F:
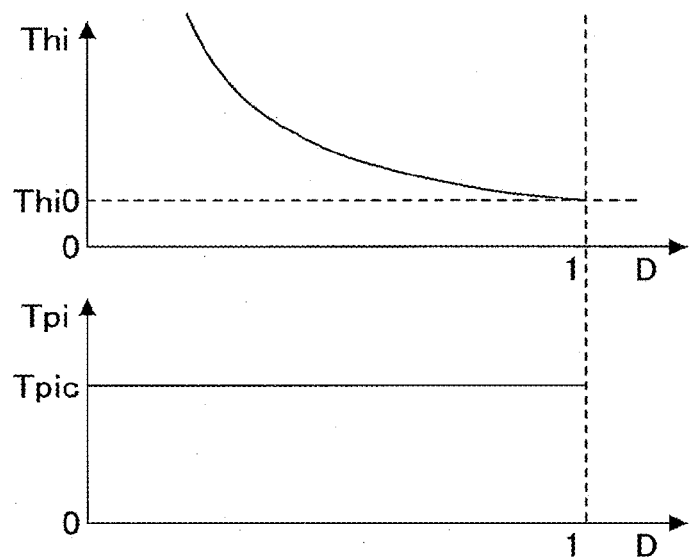
FIG. 6F is a graph illustrating a relationship between a duty of an excimer laser apparatus and the gas control interval calculated as shown in FIG. 6E.

FIG. 6F is a graph illustrating a relationship between the duty of the excimer laser apparatus and the gas control interval calculated as shown in FIG. 6E. As shown in FIG. 6F, the partial gas replacement control may be performed in a constant time interval, with the time interval Thi of the halogen gas filling control being dependent on the duty D and the time interval Tpi of the partial gas replacement control being the constant value Tpic that is not dependent on the duty D.

4.6 Calculation of Halogen Gas Partial Pressure (Details of S400)

Figure 7A:
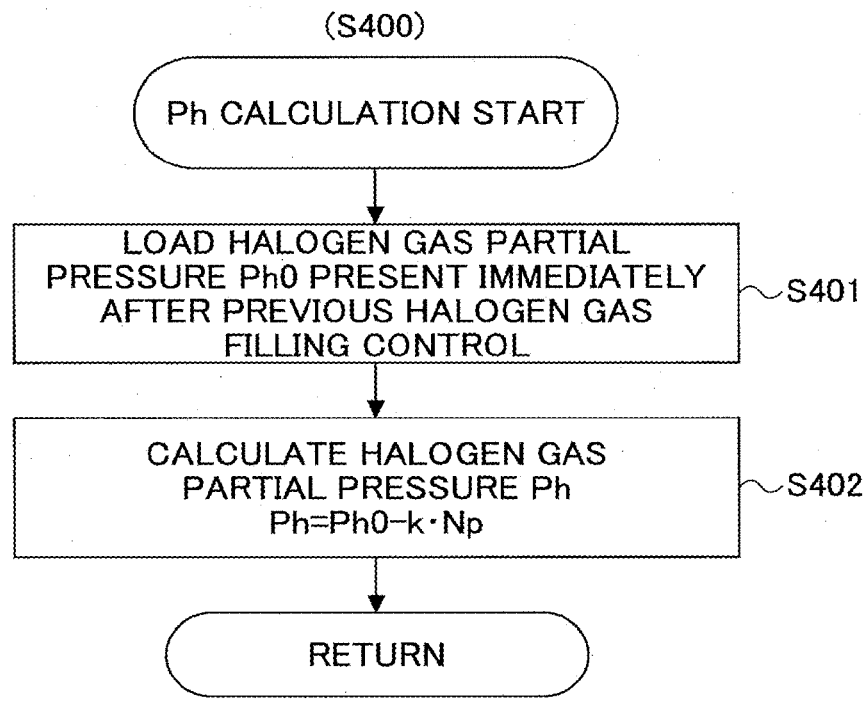
FIG. 7A is a flowchart illustrating a first example of a process that calculates a halogen gas partial pressure, indicated in FIG. 3.

FIG. 7A is a flowchart illustrating a first example of a process that calculates a halogen gas partial pressure, indicated in FIG. 3. The processes shown in FIG. 7A may be carried out by the gas control unit 47 as a subroutine of S400, shown in FIG. 3.

As described above, a decrease in the halogen gas within the laser chamber 10 can be influenced by the laser light repetition rate or the duty D (FIG. 5). Accordingly, the halogen gas partial pressure may be calculated as follows in order to fill the laser chamber 10 with a proper amount of halogen gas during the halogen gas filling control, or in order to supply the laser chamber 10 with a laser gas having a proper halogen gas concentration during the partial gas replacement control.

First, the gas control unit 47 may load a halogen gas partial pressure Ph0 present in the laser chamber 10 immediately following the previous halogen gas filling control (S401). In the process of S401, there are cases where data of the halogen gas partial pressure Ph0 does not exist for the previous halogen gas filling control, such as immediately after the excimer laser apparatus has been installed. In such a case, the halogen gas partial pressure may be calculated at the soonest complete gas replacement based on pressures and exhaust amounts occurring before and after first and second laser gas supplies, and the calculated halogen gas partial pressure may be substituted for Ph0.

Next, the gas control unit 47 may calculate the halogen gas partial pressure Ph as Ph0−k·Np, based on the halogen gas partial pressure Ph0 present immediately following the previous halogen gas filling control, the oscillation pulse number Np during a set amount of time (FIG. 5), and a proportionality constant k (S402).

Figure 7B:
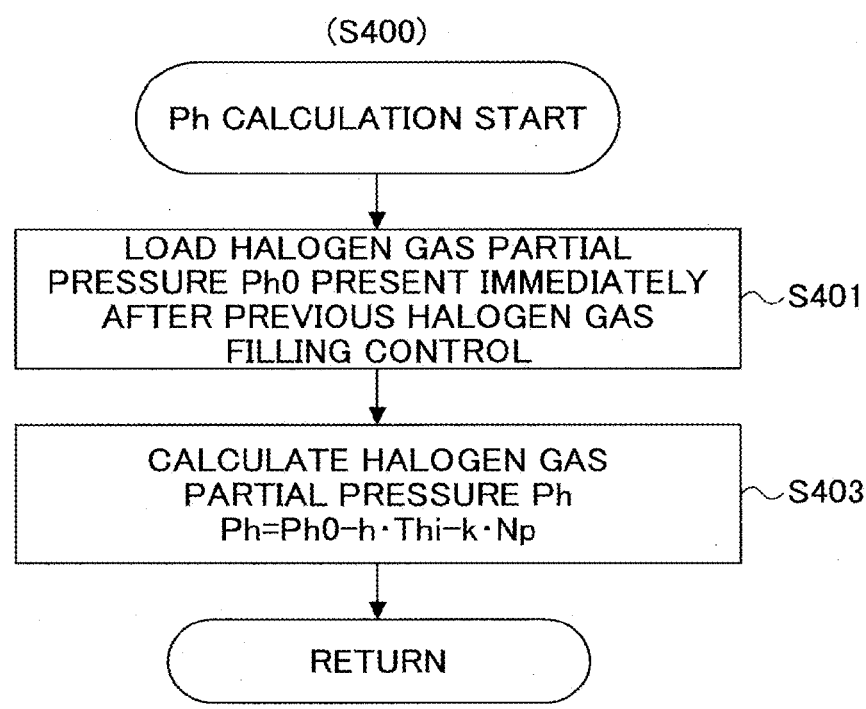
FIG. 7B is a flowchart illustrating a second example of a process that calculates a halogen gas partial pressure, indicated in FIG. 3.

FIG. 7B is a flowchart illustrating a second example of a process that calculates the halogen gas partial pressure, indicated in FIG. 3. The processes shown in FIG. 7B may be carried out by the gas control unit 47 as a subroutine of S400, shown in FIG. 3.

A decrease in the halogen gas within the laser chamber 10 can also be influenced by the time interval Thi of the halogen gas filling control, in addition to the laser light repetition rate or the duty D. Accordingly, the halogen gas partial pressure may be calculated as follows in order to fill a proper amount of halogen gas during the halogen gas filling control, or in order to supply a laser gas having a proper halogen gas concentration during the partial gas replacement control.

First, the gas control unit 47 may load a halogen gas partial pressure Ph0 present in the laser chamber 10 immediately following the previous halogen gas filling control (S401).

Next, the gas control unit 47 may calculate the halogen gas partial pressure Ph as Ph0−h·Thi−k·Np, based on the halogen gas partial pressure Ph0 present immediately following the previous halogen gas filling control, the oscillation pulse number Np during a set amount of time, the time interval Thi of the halogen gas filling control, and proportionality constants h and k (S403).

Figure 7C:
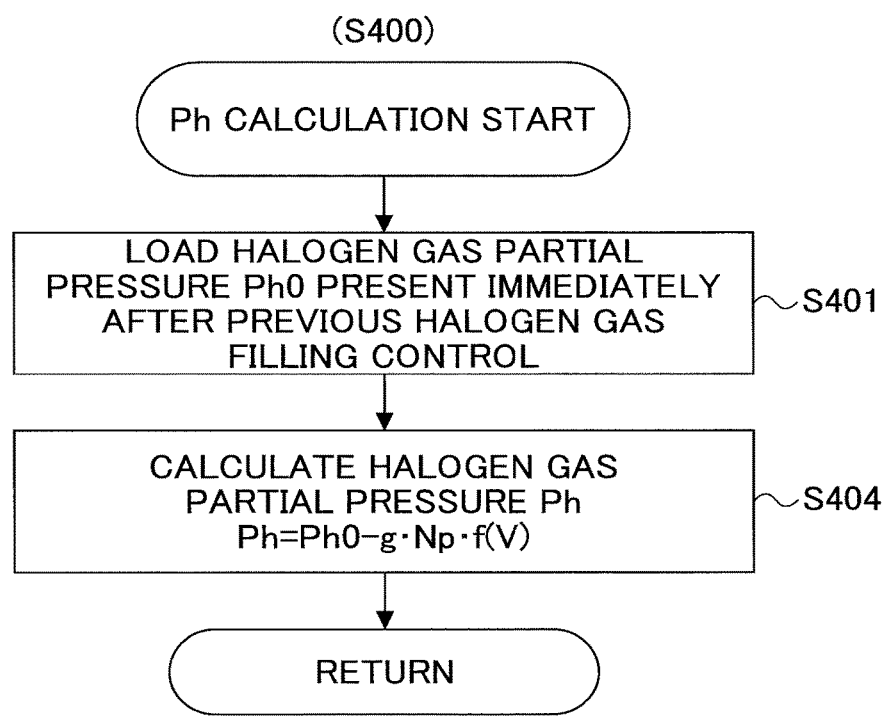
FIG. 7C is a flowchart illustrating a third example of a process that calculates a halogen gas partial pressure, indicated in FIG. 3.

FIG. 7C is a flowchart illustrating a third example of a process that calculates the halogen gas partial pressure, indicated in FIG. 3. The processes shown in FIG. 7C may be carried out by the gas control unit 47 as a subroutine of S400, shown in FIG. 3.

A decrease in the halogen gas within the laser chamber 10 can also be influenced by the voltage V applied between the pair of electrodes 11a and 11b, in addition to the laser light repetition rate or the duty D. Accordingly, the halogen gas partial pressure may be calculated as follows in order to fill a proper amount of halogen gas during the halogen gas filling control, or in order to supply a laser gas having a proper halogen gas concentration during the partial gas replacement control.

First, the gas control unit 47 may load a halogen gas partial pressure Ph0 present in the laser chamber 10 immediately following the previous halogen gas filling control (S401).

Next, the gas control unit 47 may calculate the halogen gas partial pressure Ph as Ph0−g·Np·f(V), based on the halogen gas partial pressure PhD present immediately following the previous halogen gas filling control, the oscillation pulse number Np during a set amount of time, the voltage V applied between the pair of electrodes 11a and 11b, and a proportionality constant g (S404). Here, f(V) may be (c·V$^2$), or may be (a·V+b). In addition, a, b, and c may be constants. Alternatively, a, b, and c may be functions based on data obtained through experimentation.

4.7 Calculation of Gas Replacement Amount (Details of S500)

Figure 8A:
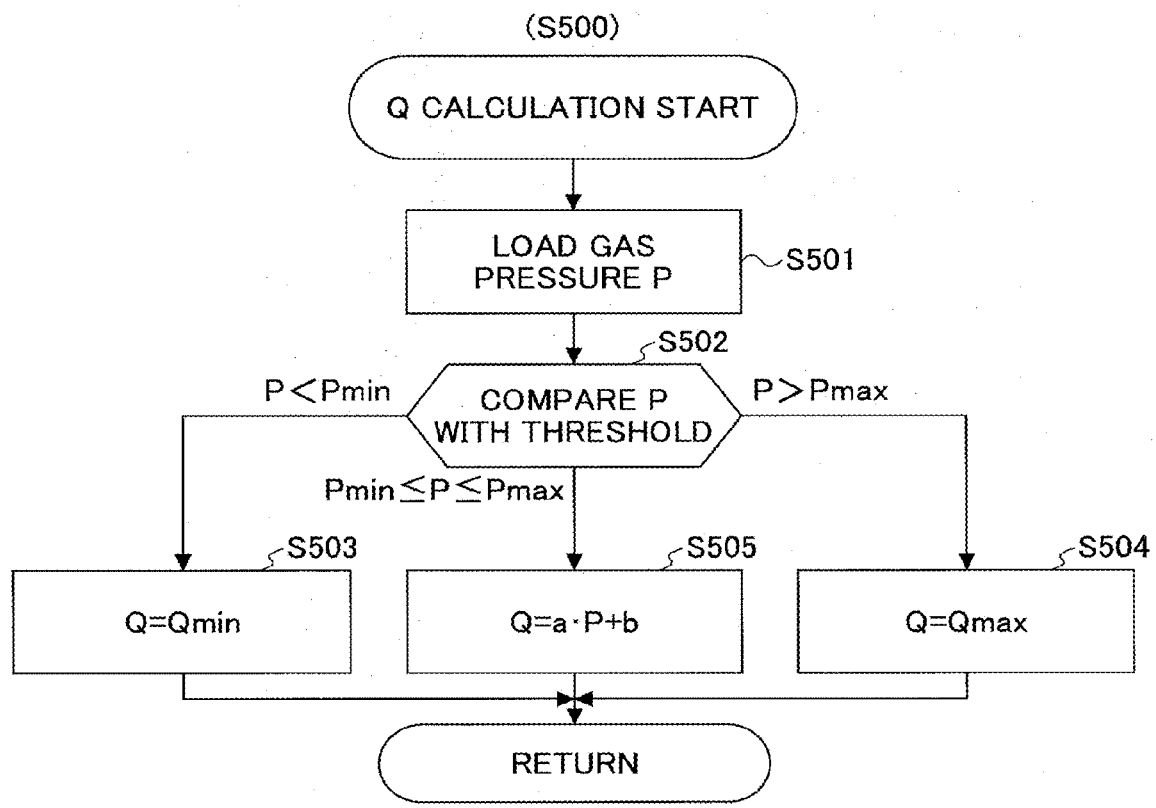
FIG. 8A is a flowchart illustrating a first example of a process that calculates a gas replacement amount, indicated in FIG. 3.

FIG. 8A is a flowchart illustrating a first example of a process that calculates a gas replacement amount, indicated in FIG. 3. The processes shown in FIG. 8A may be carried out by the gas control unit 47 as a subroutine of S500, shown in FIG. 3. The gas replacement amount may be calculated as follows in order to replace an appropriate amount of gas during the partial gas replacement control.

First, the gas control unit 47 may load the gas pressure P present within the laser chamber 10 as received from the pressure sensor 16 (S501).

Next, the gas control unit 47 may compare the gas pressure P present within the laser chamber 10 with a first threshold Pmin and a second threshold Pmax (S502). The first threshold Pmin and the second threshold Pmax may be held in the gas control unit 47 in advance.

In the case where the gas pressure P is lower than the first threshold Pmin (P<Pmin), the gas control unit 47 may set the gas replacement amount Q to a minimum value Qmin (S503).

In the case where the gas pressure P is greater than the second threshold Pmax, which is itself greater than the first threshold (Pmin<Pmax<P), the gas control unit 47 may set the gas replacement amount Q to a maximum value Qmax (S504).

However, in the case where the gas pressure P is a value that is between the first threshold Pmin and the second threshold Pmax (Pmin≤P≤Pmax), the gas control unit 47 may set the gas replacement amount Q to a value that continuously changes between the minimum value Qmin and the maximum value Qmax in accordance with the gas pressure P. For example, the gas replacement amount Q may be a value expressed by a·P+b, where a and b are constants (S505).

Figure 8B:
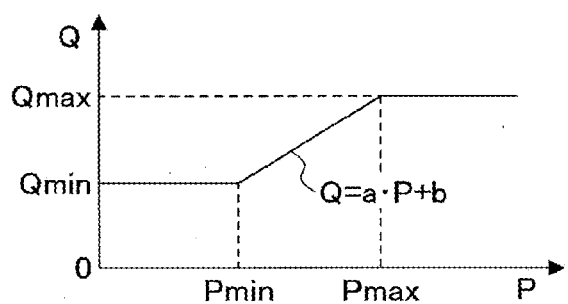
FIG. 8B is a graph illustrating a relationship between a gas pressure in a laser chamber and the gas replacement amount calculated as shown in FIG. 8A.

FIG. 8B is a graph illustrating a relationship between the gas pressure in a laser chamber and the gas replacement amount calculated as shown in FIG. 8A. The gas pressure P within the laser chamber 10 can, as described above, increase in the case where the gas pressure has been raised through the gas pressure control (S600) when the voltage V applied between the pair of electrodes 11a and 11b is high. In other words, the gas pressure P within the laser chamber 10 can rise in the case where impurities have increased within the laser chamber 10 and the luminous efficiency of the laser light has dropped.

Accordingly, as shown in FIG. 8B, impurities within the laser chamber 10 can be reduced by increasing the gas replacement amount Q in the case where the gas pressure P within the laser chamber 10 is high. Conversely, the gas replacement amount Q can be reduced in the case where the gas pressure P within the laser chamber 10 is low.

Figure 8C:
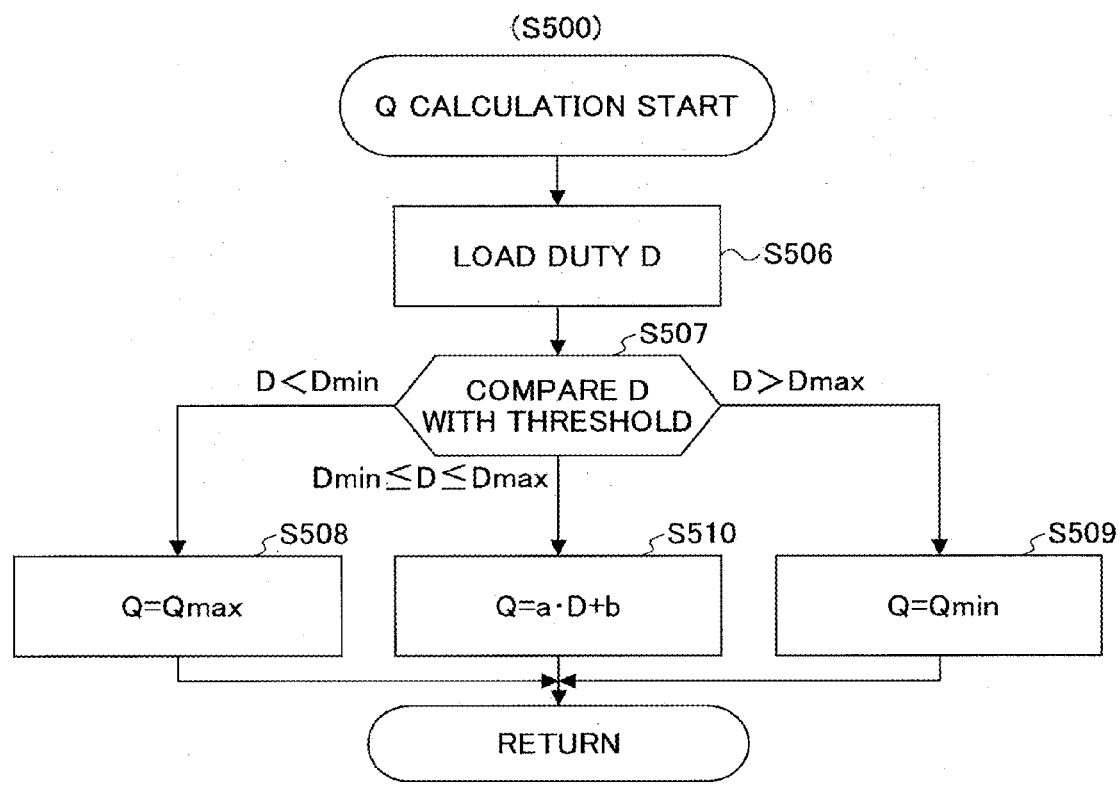
FIG. 8C is a flowchart illustrating a second example of a process that calculates a gas replacement amount, indicated in FIG. 3.

FIG. 8C is a flowchart illustrating a second example of a process that calculates a gas replacement amount, indicated in FIG. 3. The processes shown in FIG. 8C may be carried out by the gas control unit 47 as a subroutine of S500, shown in FIG. 3. The gas replacement amount may be calculated as follows in order to replace a correct amount of gas during the partial gas replacement control.

First, the gas control unit 47 may load the duty D of the excimer laser apparatus received from the laser control unit 30 (S506).

Next, the gas control unit 47 may compare the duty D of the excimer laser apparatus with a first threshold Dmin and a second threshold Dmax (S507). The first threshold Dmin and the second threshold Dmax may be held in the gas control unit 47 in advance.

In the case where the duty D is lower than the first threshold Dmin (D<Dmin), the gas control unit 47 may set the gas replacement amount Q to the maximum value Qmax (S508).

However, in the case where the duty D is greater than the second threshold Dmax, which is itself greater than the first threshold (Dmin<Dmax<D), the gas control unit 47 may set the gas replacement amount Q to the minimum value Qmin (S509).

In the case where the duty D is a value that is between the first threshold Dmin and the second threshold Dmax (Dmin≤D≤Dmax), the gas control unit 47 may set the gas replacement amount Q to a value that continuously changes between the minimum value Qmin and the maximum value Qmax in accordance with the duty D. For example, the gas replacement amount Q may be a value expressed by a·D+b, where a and b are constants (S510).

Figure 8D:
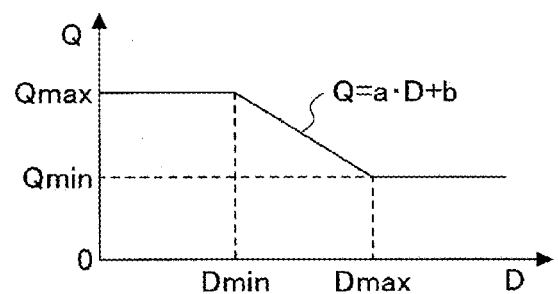
FIG. 8D is a graph illustrating a relationship between a duty of an excimer laser apparatus and the gas replacement amount calculated as shown in FIG. 8C.

FIG. 8D is a graph illustrating an example of a relationship between the duty of the excimer laser apparatus and the gas replacement amount calculated as shown in FIG. 8C. In this manner, the gas replacement amount Q may be set based on the duty D of the excimer laser apparatus.

4.8 Gas Pressure Control (Details of S600)

Figure 9:
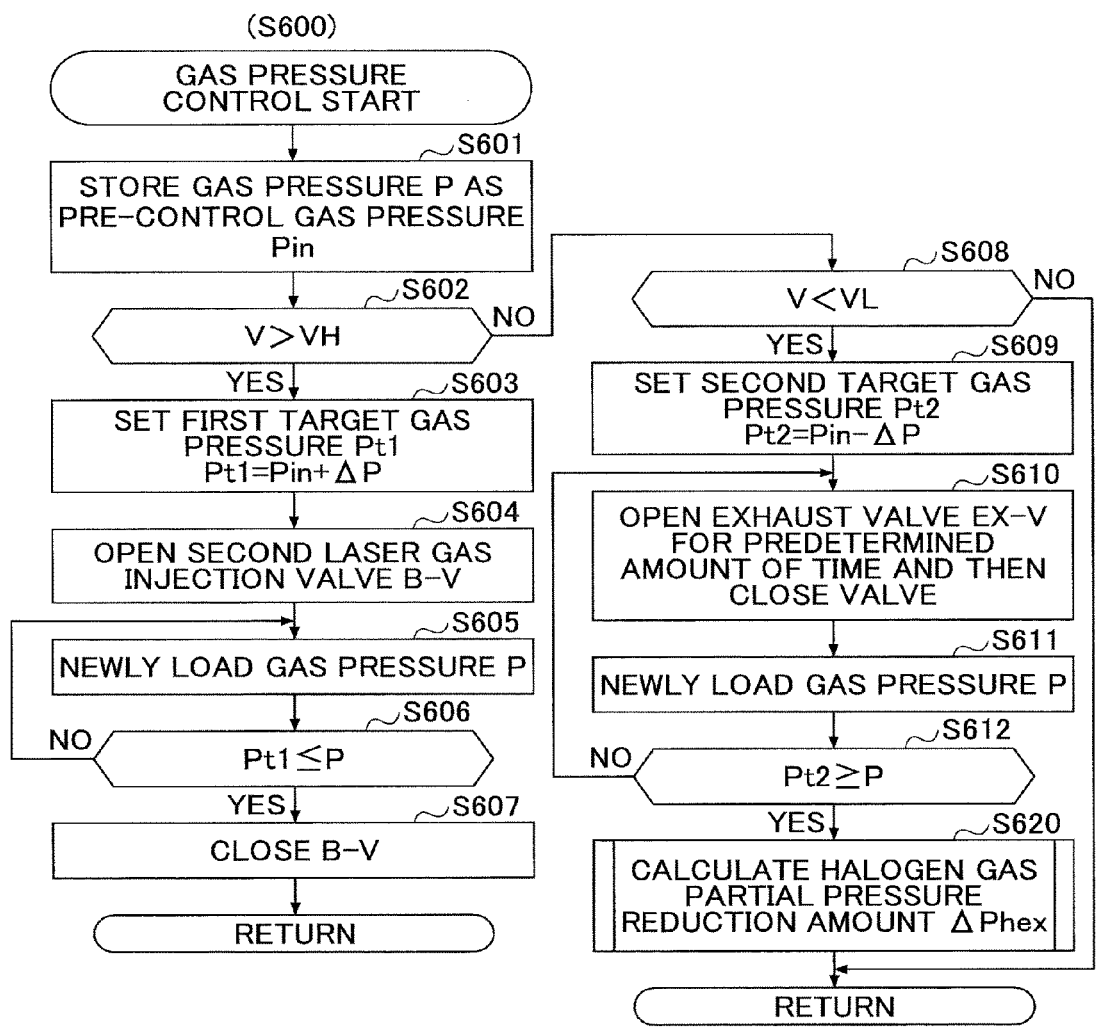
FIG. 9 is a flowchart illustrating gas pressure control indicated in FIG. 3.

FIG. 9 is a flowchart illustrating the gas pressure control indicated in FIG. 3. The processes shown in FIG. 9 may be carried out by the gas control unit 47 as a subroutine of S600, shown in FIG. 3.

First, the gas control unit 47 may store the gas pressure P within the laser chamber 10 as a pre-control gas pressure Pin in the storage device (S601). The gas pressure P may be received from the pressure sensor 16.

Next, the gas control unit 47 may determine whether or not the voltage V supplied between the pair of electrodes 11a and 11b is greater than the first threshold VH (S602). In the case where the voltage V is greater than the first threshold VH (S602: YES), the gas control unit 47 may carry out the control from S603 to S607, for supplying the second laser gas to the laser chamber 10. In the case where the voltage V is not greater than the first threshold VH (S602: NO), the process may transit to S608.

In the case where the voltage V is greater than the first threshold VH (S602: YES), the gas control unit 47 may set a value obtained by adding a gas pressure fluctuation amount ΔP to the pre-control gas pressure Pin (Pin+ΔP) as a first target gas pressure Pt1 (S603).

Next, the gas control unit 47 may supply the second laser gas to the interior of the laser chamber 10 by opening the second laser gas injection valve B-V and the control valve C-V (S604). The flow rate of the second laser gas may be controlled by the mass flow controller B-MFC. As described above, a mixed gas that is a mixture of argon and neon may be used as the second laser gas. By supplying the second laser gas, which does not contain halogen gas, to the interior of the laser chamber 10, it is possible to suppress a fluctuation in the halogen gas pressure within the laser chamber 10. In other words, aside from raising the gas pressure P within the laser chamber 10, fluctuations in the oscillation conditions of the laser light can be suppressed, which makes it possible to ensure the stability of the performance of the excimer laser apparatus.

Next, the gas control unit 47 may newly load the gas pressure P within the laser chamber 10 (S605). Next, the gas control unit 47 may determine whether or not the newly-loaded gas pressure P has reached the first target gas pressure Pt1 (S606). In the case where the gas pressure P has not reached the first target gas pressure Pt1 (Pt1>P), the process may return to the aforementioned S605 with the second laser gas injection valve B-V remaining open, and may stand by until the first target gas pressure Pt1 is reached. In the case where the gas pressure P has reached the first target gas pressure Pt1 (Pt1≤P), the gas control unit 47 may close the control valve C-V and the second laser gas injection valve B-V (S607).

In the case where the voltage V supplied between the pair of electrodes 11a and 11b is not greater than the first threshold VH (S602: NO), the gas control unit 47 may determine whether or not the voltage V is lower than the second threshold VL (S608). Here, based on the results of the determinations in S590 of the main flow and S602 of the present subroutine, V<VL may already hold true at the point in time where the process has moved to S608. In this case, the determination of YES in S608 may be omitted. In the case where the voltage V is lower than the second threshold VL (S608: YES), the gas control unit 47 may partially exhaust the gas from within the laser chamber 10 in S609 through S620. In the case where the voltage V is not lower than the second threshold VL (S608: NO), the control of S609 through S620 need not be carried out. In other words, in the case where the voltage V supplied between the pair of electrodes 11a and 11b is within the range from the first threshold VH to the second threshold VL, the gas pressure control need not be started.

In the case where the voltage V is less than the second threshold VL (S608: YES), the gas control unit 47 may set a value obtained by subtracting the gas pressure fluctuation amount ΔP from the pre-control gas pressure Pin (Pin−ΔP) as a second target gas pressure Pt2 (S609). At this time, the gas control unit 47 may simultaneously start the exhaust pump 46 and open the control valve C-V.

Next, the gas control unit 47 may partially exhaust the gas from within the laser chamber 10 by opening the exhaust valve EX-V for a predetermined amount of time and then closing the exhaust valve EX-V (S610).

Next, the gas control unit 47 may newly load the gas pressure P within the laser chamber 10 (S611). Next, the gas control unit 47 may determine whether or not the newly-loaded gas pressure P has reached the second target gas pressure Pt2 (S612). In the case where the gas pressure P has not reached the second target gas pressure Pt2 (Pt2<P), the process may return to the aforementioned S610, and the partial exhaust of the gas from within the laser chamber 10 may be repeated until the second target gas pressure Pt2 is reached. In the case where the gas pressure P has reached the second target gas pressure Pt2 (Pt2≥P), the gas control unit 47 may calculate a reduction amount ΔPhex for the halogen gas partial pressure resulting from the gas exhaust (S620). At this time, the gas control unit 47 may simultaneously close the control valve C-V and stop the exhaust pump 46.

Figure 10:
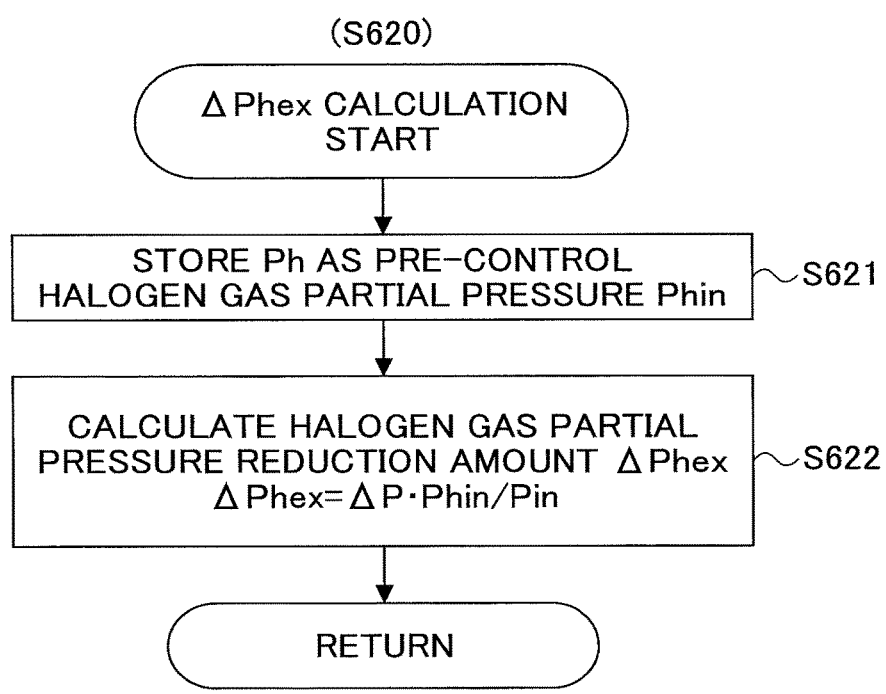
FIG. 10 is a flowchart illustrating a process for calculating a reduction amount for a halogen gas partial pressure indicated in FIG. 9.

FIG. 10 is a flowchart illustrating a process for calculating the reduction amount for the halogen gas partial pressure indicated in FIG. 9. When the gas pressure is reduced through the control carried out in S609 through S612 of FIG. 9, the halogen gas partial pressure within the laser chamber 10 can decrease. Accordingly, the gas control unit 47 may, through the following processing, calculate the reduction amount ΔPhex of the halogen gas partial pressure.

First, the gas control unit 47 may load the halogen gas partial pressure Ph calculated in the aforementioned S400 (FIG. 3), and may store the halogen gas partial pressure Ph in the storage device as a pre-control halogen gas partial pressure Phin (S621).

Next, the gas control unit 47 may calculate the reduction amount ΔPhex of the halogen gas partial pressure as ΔP·Phin/Pin, using the gas pressure fluctuation amount ΔP resulting from the gas pressure control, the pre-control halogen gas partial pressure Phin, and the pre-control gas pressure Pin (S622).

Note that after the process of S620 shown in FIG. 10 ends, the processing may return to S200 in FIG. 3, and the halogen gas partial pressure Ph may be recalculated in S400. At this time, the halogen gas partial pressure Ph may be recalculated by subtracting the reduction amount ΔPhex from the halogen gas partial pressure calculated in FIG. 10. The halogen gas filling control (S700) may be carried out using the halogen gas partial pressure Ph found in this manner.

FIG. 11A is a graph illustrating changes in the gas pressure within the laser chamber and a voltage applied between the electrodes resulting from the opening/closing of a second laser gas injection valve, as indicated in FIG. 9.

In the case where the voltage V supplied between the pair of electrodes 11a and 11b is within the range from the first threshold VH to the second threshold VL, the gas pressure control is not started; however, as shown in FIG. 11A, the gas pressure control can start if the voltage V exceeds the first threshold VH. In the case where the voltage V has exceeded the first threshold VH, the second laser gas injection valve B-V is opened as a result of the gas pressure control, and the gas pressure P within the laser chamber 10 can increase gradually from the pre-control gas pressure Pin. The output of the excimer laser apparatus also tends to increase when the gas pressure P within the laser chamber 10 increases, and thus the voltage V can be decreased through the processing shown in FIG. 4 in order to make the output of the excimer laser apparatus constant. The second laser gas injection valve B-V is closed when the gas pressure P within the laser chamber 10 reaches the first target gas pressure Pt1; the increase in the gas pressure P thus stops, which in turn can also stop the decrease in the voltage V.

In this manner, an excessive increase in the voltage V supplied between the pair of electrodes 11a and 11b can be suppressed by increasing the gas pressure P within the laser chamber 10.

FIG. 11B is a graph illustrating changes in the gas pressure within the laser chamber and the voltage applied between electrodes resulting from the opening/closing of the exhaust valve, indicated in FIG. 9.

In the case where the voltage V supplied between the pair of electrodes 11a and 11b is within the range from the first threshold VH to the second threshold VL, the gas pressure control is not started; however, as shown in FIG. 11B, the gas pressure control can start if the voltage V is less than the second threshold VL. In the case where the voltage V has become less than the second threshold VL, the exhaust valve EX-V is opened for a predetermined amount of time and is then closed as a result of the gas pressure control, and thus the gas pressure P within the laser chamber 10 can decrease slightly from the pre-control gas pressure Pin. The output of the excimer laser apparatus also tends to decrease when the gas pressure P within the laser chamber 10 decreases, and thus the voltage V can be increased through the processing shown in FIG. 4 in order to make the output of the excimer laser apparatus constant.

The opening/closing operations of the exhaust valve EX-V are repeated until the gas pressure P within the laser chamber 10 reaches the second target gas pressure Pt2, and with each repetition, the gas pressure P within the laser chamber 10 can decrease slightly, and the voltage V can increase slightly. The opening/closing operations of the exhaust valve EX-V is ended when the gas pressure P within the laser chamber 10 reaches the second target gas pressure Pt2; the decrease in the gas pressure P thus stops, which in turn can also stop the increase in the voltage V.

In this manner, an excessive decrease in the voltage V supplied between the pair of electrodes 11a and 11b can be suppressed by decreasing the gas pressure P within the laser chamber 10.

4.9 Halogen Gas Filling Control (Details of S700)

Figure 12:
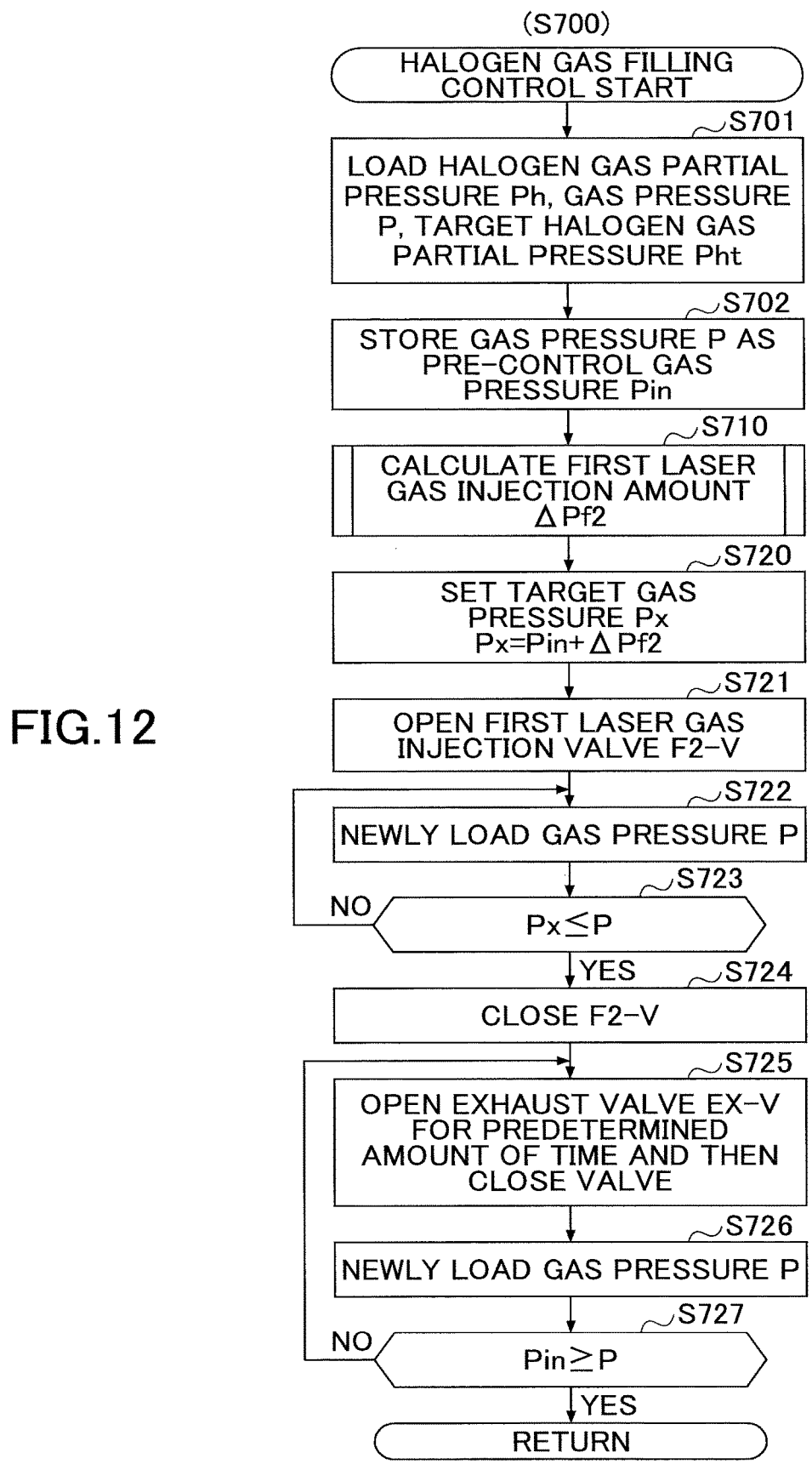
FIG. 12 is a flowchart illustrating halogen gas filling control indicated in FIG. 3.

FIG. 12 is a flowchart illustrating the halogen gas filling control indicated in FIG. 3. The processes shown in FIG. 12 may be carried out by the gas control unit 47 as a subroutine of S700, shown in FIG. 3.

First, the gas control unit 47 may load the halogen gas partial pressure Ph, the gas pressure P, and a target halogen gas partial pressure Pht (S701). The halogen gas partial pressure Ph may be that which was calculated in the aforementioned S400 (FIG. 3). The gas pressure P may be received from the pressure sensor 16. The target halogen gas partial pressure Pht may be a value that is set in accordance with operational conditions of the excimer laser apparatus.

Next, the gas control unit 47 may store the gas pressure P as the pre-control gas pressure Pin in the storage device (S702). Next, the gas control unit 47 may calculate a first laser gas injection amount ΔPf2 for controlling the halogen gas partial pressure within the laser chamber 10 to the target halogen gas partial pressure Pht (S710). Details of this calculation process will be provided later.

Next, the gas control unit 47 may set a value obtained by adding the first laser gas injection amount ΔPf2 to the pre-control gas pressure Pin (Pin+ΔPf2) as a target gas pressure Px present following the first laser gas injection (prior to exhaust) (S720). Next, the gas control unit 47 may supply the first laser gas to the interior of the laser chamber 10 by opening the first laser gas injection valve F2-V and the control valve C-V (S721). The flow rate of the first laser gas may be controlled by the mass flow controller F2-MFC. As described above, a mixed gas that is a mixture of argon, neon, and fluorine may be used as the first laser gas. The halogen gas partial pressure within the laser chamber 10 can be increased by supplying the first laser gas, which includes fluorine gas, to the interior of the laser chamber 10.

Next, the gas control unit 47 may newly load the gas pressure P within the laser chamber 10 (S722). Next, the gas control unit 47 may determine whether or not the newly-loaded gas pressure P has reached the target gas pressure Px present following the first laser gas injection (S723). In the case where the gas pressure P has not reached the target gas pressure Px (Px>P), the process may return to the aforementioned S722 with the first laser gas injection valve F2-V remaining open, and may stand by until the target gas pressure Px is reached. In the case where the gas pressure P has reached the target gas pressure Px (Px≤P), the gas control unit 47 may close the control valve C-V and the first laser gas injection valve F2-V (S724). After this, the gas control unit 47 may start the exhaust pump 46 and open the control valve C-V. At this time, the exhaust valve EX-V may be closed.

Next, the gas control unit 47 may partially exhaust the gas from within the laser chamber 10 by opening the exhaust valve EX-V for a predetermined amount of time and then closing the exhaust valve EX-V (S725).

Next, the gas control unit 47 may newly load the gas pressure P within the laser chamber 10 (S726). Next, the gas control unit 47 may determine whether or not the newly-loaded gas pressure P has returned to the pre-control gas pressure Pin (S727). In the case where the gas pressure P has not returned to the pre-control gas pressure Pin (Pin<P), the process may return to the aforementioned S725, and the partial exhaust of gas from within the laser chamber 10 may be repeated until the gas pressure P returns to the pre-control gas pressure Pin. During this period, the exhaust pump 46 may be running, and the control valve C-V may be in an open state. In the case where the gas pressure P has returned to the pre-control gas pressure Pin (Pin≥P), the gas control unit 47 may close the control valve C-V and stop the exhaust pump 46. The processing of this flowchart may then end.

Figure 13:
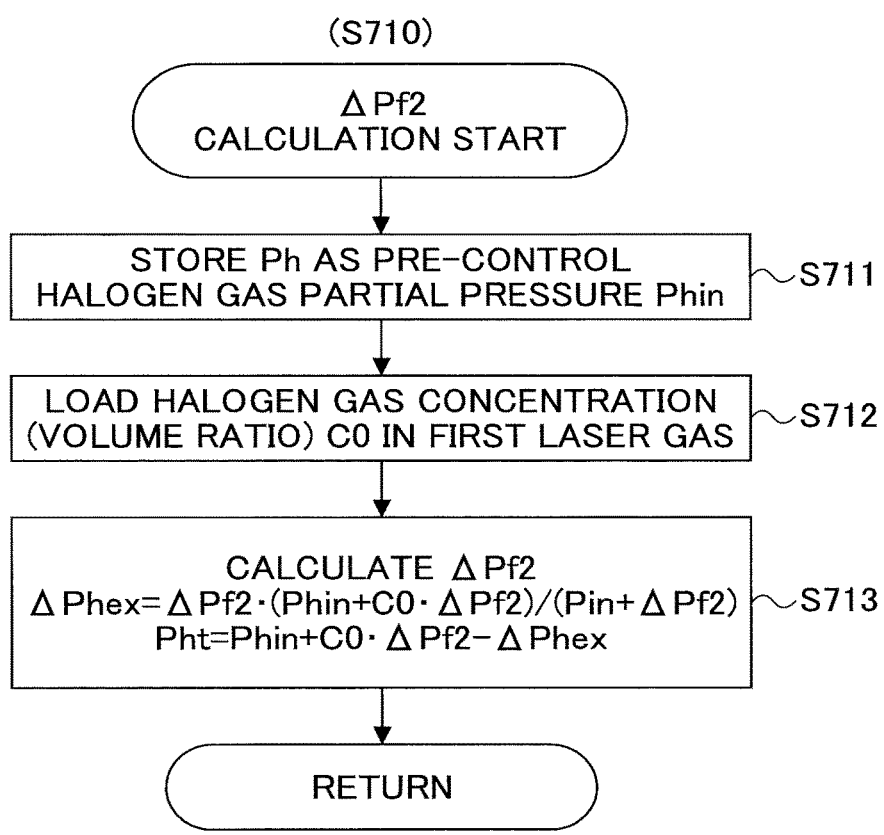
FIG. 13 is a flowchart illustrating a process for calculating a first laser gas injection amount indicated in FIG. 12.

FIG. 13 is a flowchart illustrating a process for calculating the first laser gas injection amount indicated in S710 of FIG. 12. The gas control unit 47 may, through the following processing, calculate the first laser gas injection amount ΔPf2.

First, the gas control unit 47 may store the halogen gas partial pressure Ph calculated in the aforementioned S400 (FIG. 3) in the storage device as the pre-control halogen gas partial pressure Phin (S711).

Next, the gas control unit 47 may load a halogen gas concentration (volume ratio) C0 in the first laser gas (S712). The halogen gas concentration in the first laser gas may be a halogen gas concentration (volume ratio) in the first receptacle F2, or may be inputted into the gas control unit 47 in advance and held so as to be capable of being referred to by the gas control unit 47.

A halogen gas partial pressure increase amount ΔPh in the case where the first laser gas is injected into the laser chamber 10 (by the injection amount ΔPf2) can be expressed by the following equation.

$$\Delta Ph = C0 \cdot \Delta Pf2$$

The halogen gas partial pressure that has decreased due to exhausting to the pre-control gas pressure Pin (an exhaust amount equivalent to the injection amount ΔPf2) after the first laser gas has been injected into the laser chamber 10 (that is, a reduction amount ΔPhex) can be expressed by the following equation.

$$\Delta Phex = \Delta Pf2 \cdot (Phin + C0 \cdot \Delta Pf2)/(Pin + \Delta Pf2) \qquad \text{Formula 1}$$

Meanwhile, the target halogen gas partial pressure Pht can be expressed by the following equation.

$$Pht = Phin + C0 \cdot \Delta Pf2 - \Delta Phex \qquad \text{Formula 2}$$

Accordingly, the gas control unit 47 may calculate a ΔPf2 that fulfills Formulas 1 and 2 as the first laser gas injection amount ΔPf2 (S713). Alternatively, the gas control unit 47 may hold a table or the like in advance, and may determine the first laser gas injection amount ΔPf2 by referring to this table. The table may hold values for the first laser gas injection amount ΔPf2 that correspond to, for example, the gas pressure P, the halogen gas partial pressure Ph, the target halogen gas partial pressure Pht, or the like.

Figure 14:
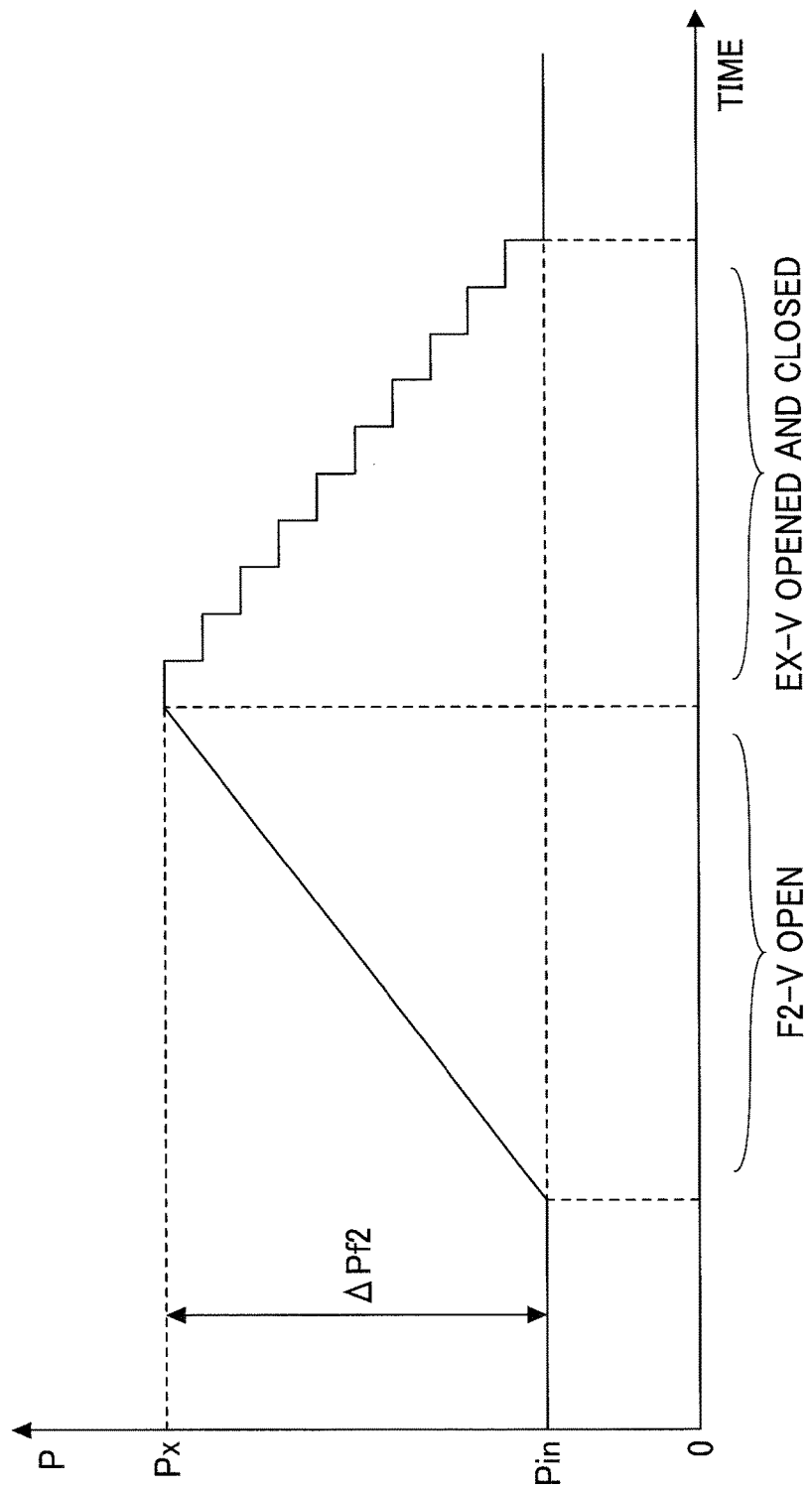
FIG. 14 is a graph illustrating changes in a gas pressure within a laser chamber resulting from the halogen gas filling control indicated in FIG. 12.

FIG. 14 is a graph illustrating changes in the gas pressure within the laser chamber resulting from the halogen gas filling control indicated in FIG. 12. The gas control unit 47 may start the halogen gas filling control each time the time interval Thi of the halogen gas filling control passes. When the halogen gas filling control is started, the first laser gas injection valve F2-V and the control valve C-V are opened, and the gas pressure P within the laser chamber 10 can increase gradually from the pre-control gas pressure Pin. When the gas pressure P within the laser chamber 10 reaches the target gas pressure Px, the control valve C-V and the first laser gas injection valve F2-V are closed, and thus the increase in the gas pressure P can be stopped.

Next, the exhaust pump 46 is started, and after the control valve C-V is opened, the exhaust valve EX-V is opened for a predetermined amount of time and then closed; as a result, the gas pressure P within the laser chamber 10 can decrease slightly from the target gas pressure Px. The opening/closing operations of the exhaust valve EX-V are repeated until the gas pressure P within the laser chamber 10 reaches the pre-control gas pressure Pin, and with each repetition, the gas pressure P within the laser chamber 10 can decrease slightly. The opening/closing operations of the exhaust valve EX-V end when the gas pressure P within the laser chamber 10 reaches the pre-control gas pressure Pin; thus the decrease in the gas pressure P can stop. Thereafter, the control valve C-V may be closed and the exhaust pump 46 may be stopped.

In this manner, the halogen gas may be supplied to the interior of the laser chamber 10, and the gas pressure P within the laser chamber 10 may then be returned to a value that is close to the pre-control gas pressure Pin. Accordingly, in the halogen gas filling control, fluctuations in the oscillation conditions of the laser light can be suppressed, which makes it possible to ensure the stability of the performance of the excimer laser apparatus, even while the halogen gas partial pressure within the laser chamber 10 is increased.

4.10 Partial Gas Replacement Control (Details of S800)

Figure 15:
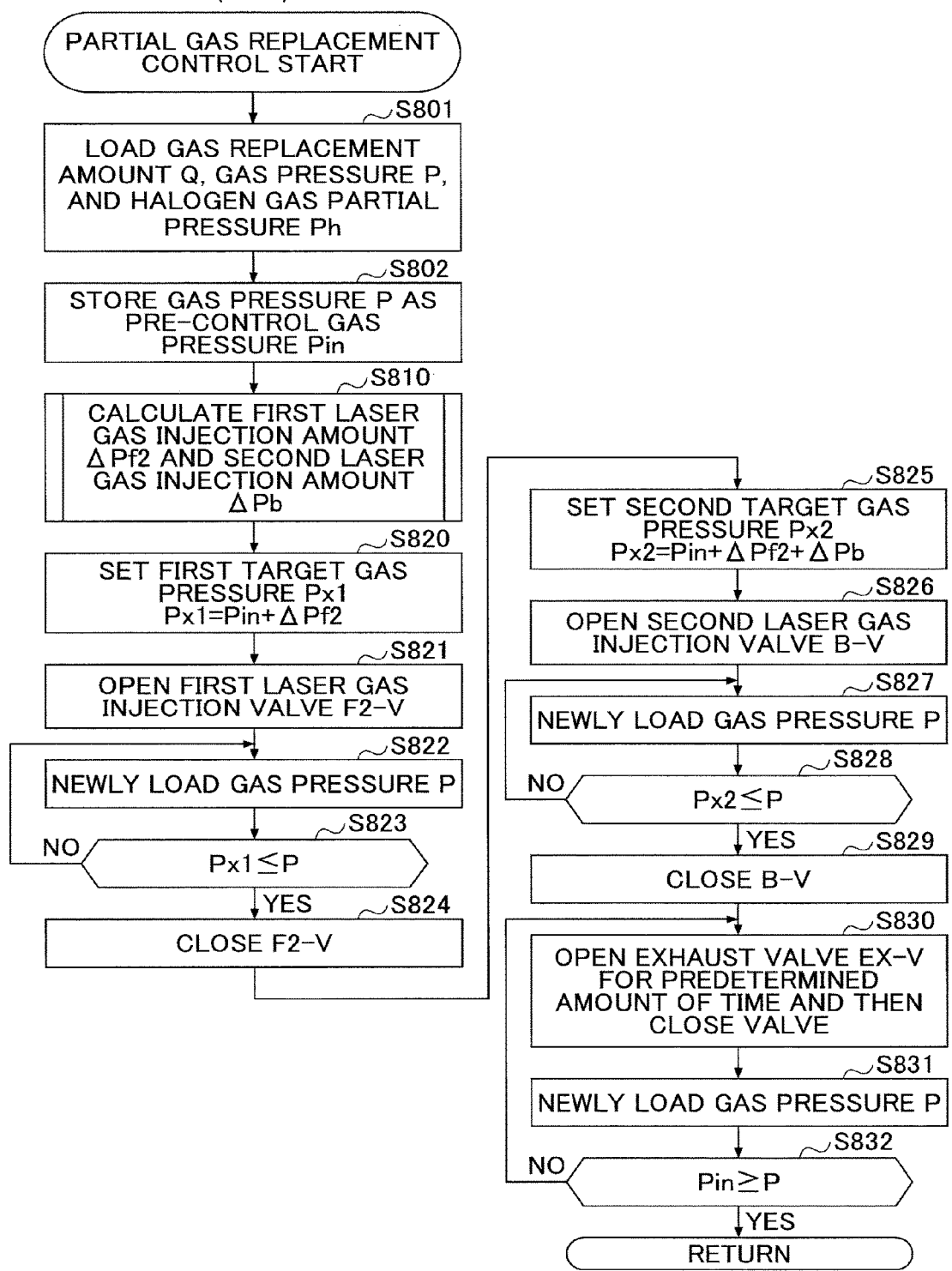
FIG. 15 is a flowchart illustrating partial gas replacement control indicated in FIG. 3.

FIG. 15 is a flowchart illustrating the partial gas replacement control indicated in FIG. 3. The processes shown in FIG. 15 may be carried out by the gas control unit 47 as a subroutine of S800, shown in FIG. 3.

First, the gas control unit 47 may load the gas replacement amount Q, the gas pressure P, and the halogen gas partial pressure Ph (S801). The gas replacement amount Q may be that calculated in the aforementioned S500 (FIG. 3). The gas pressure P may be received from the pressure sensor 16. The halogen gas partial pressure Ph may be calculated in the aforementioned S400 (FIG. 3).

Next, the gas control unit 47 may store the gas pressure P as the pre-control gas pressure Pin in the storage device (S802). Next, the gas control unit 47 may calculate the first laser gas injection amount ΔPf2 and a second laser gas injection amount ΔPb for the partial gas replacement control (S810). Details of this calculation process will be provided later.

Next, the gas control unit 47 may set a value obtained by adding the first laser gas injection amount ΔPf2 to the pre-control gas pressure Pin (Pin+ΔPf2) as a first target gas pressure Px1 present following the first laser gas injection (S820). Next, the gas control unit 47 may supply the first laser gas to the interior of the laser chamber 10 by opening the first laser gas injection valve F2-V and the control valve C-V (S821). The flow rate of the first laser gas may be controlled by the mass flow controller F2-MFC. As described above, a mixed gas that is a mixture of argon, neon, and fluorine may be used as the first laser gas. Through this, the first laser gas, which contains fluorine gas, can be supplied to the interior of the laser chamber 10.

Next, the gas control unit 47 may newly load the gas pressure P within the laser chamber 10 (S822). Next, the gas control unit 47 may determine whether or not the newly-loaded gas pressure P has reached the first target gas pressure Px1 present following the first laser gas injection (S823). In the case where the gas pressure P has not reached the first target gas pressure Px1 (Px1>P), the process may return to the aforementioned S822 with the first laser gas injection valve F2-V remaining open, and may stand by until the first target gas pressure Px1 is reached. In the case where the gas pressure P has reached the first target gas pressure Px1 (Px1≤P), the gas control unit 47 may close the control valve C-V and the first laser gas injection valve F2-V (S824).

Next, the gas control unit 47 may set a value obtained by adding the first laser gas injection amount ΔPf2 and the second laser gas injection amount ΔPb to the pre-control gas pressure Pin (Pin+ΔPf2+ΔPb) as a second target gas pressure Px2 present following the second laser gas injection (S825). Next, the gas control unit 47 may supply the second laser gas to the interior of the laser chamber 10 by opening the second laser gas injection valve B-V and the control valve C-V (S826). The flow rate of the second laser gas may be controlled by the mass flow controller B-MFC. As described above, a mixed gas that is a mixture of argon and neon may be used as the second laser gas. By properly calculating the first laser gas injection amount ΔPf2 and the second laser gas injection amount ΔPb (S810), the halogen gas partial pressure within the laser chamber 10 may be prevented from fluctuating between before and after the partial gas replacement control is carried out.

Next, the gas control unit 47 may newly load the gas pressure P within the laser chamber 10 (S827). Next, the gas control unit 47 may determine whether or not the newly-loaded gas pressure P has reached the second target gas pressure Px2 present following the second laser gas injection (S828). In the case where the gas pressure P has not reached the second target gas pressure Px2 (Px2>P), the process may return to the aforementioned S827 with the second laser gas injection valve B-V remaining open, and may stand by until the second target gas pressure Px2 is reached. In the case where the gas pressure P has reached the second target gas pressure Px2 (Px2≤P), the gas control unit 47 may close the control valve C-V and the second laser gas injection valve B-V (S829). After this, the gas control unit 47 may start the exhaust pump 46 and open the control valve C-V. At this time, the exhaust valve EX-V may be closed.

Next, the gas control unit 47 may partially exhaust the gas from within the laser chamber 10 by opening the exhaust valve EX-V for a predetermined amount of time and then closing the exhaust valve EX-V (S830).

Next, the gas control unit 47 may newly load the gas pressure P within the laser chamber 10 (S831). Next, the gas control unit 47 may determine whether or not the newly-loaded gas pressure P has returned to the pre-control gas pressure Pin (S832). In the case where the gas pressure P has not returned to the pre-control gas pressure Pin (Pin<P), the process may return to the aforementioned S830, and the partial exhaust of gas from within the laser chamber 10 may be repeated until the gas pressure P returns to the pre-control gas pressure Pin. During this period, the exhaust pump 46 may be running, and the control valve C-V may be in an open state. In the case where the gas pressure P has returned to the pre-control gas pressure Pin (Pin≥P), the gas control unit 47 may close the control valve C-V and stop the exhaust pump 46. The processing of this flowchart may then end.

Figure 16:
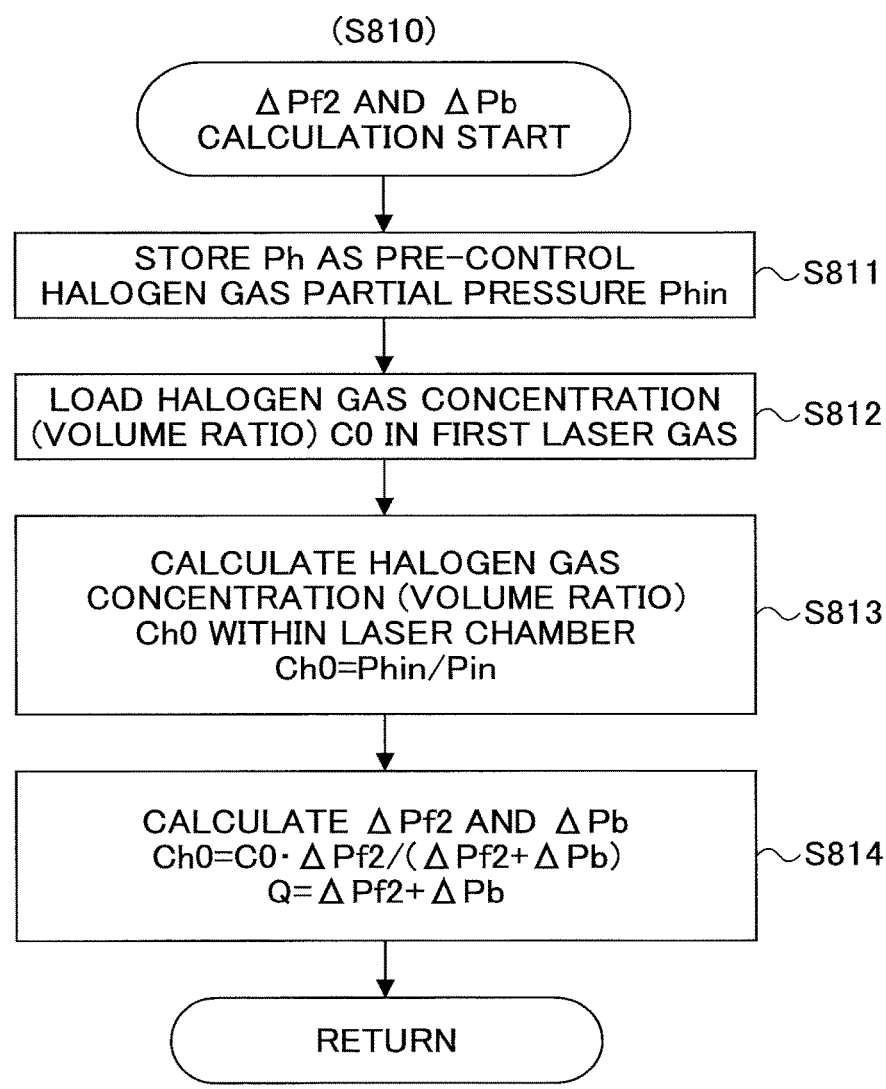
FIG. 16 is a flowchart illustrating a process for calculating a first laser gas injection amount and a second laser gas injection amount indicated in FIG. 15.

FIG. 16 is a flowchart illustrating processes for calculating the first laser gas injection amount and the second laser gas injection amount indicated in FIG. 15. The gas control unit 47 may, through the following processing, calculate the first laser gas injection amount ΔPf2 and the second laser gas injection amount ΔPb.

First, the gas control unit 47 may store the halogen gas partial pressure Ph calculated in the aforementioned S400 (FIG. 3) in the storage device as the pre-control halogen gas partial pressure Phin (S811). Next, the gas control unit 47 may load a halogen gas concentration (volume ratio) C0 in the first laser gas (S812). The halogen gas concentration in the first laser gas may be inputted into the gas control unit 47 in advance and held so as to be capable of being referred to by the gas control unit 47.

The gas control unit 47 may calculate a halogen gas concentration (volume ratio) Ch0 within the laser chamber 10 through the following equation (S813).

$$Ch0=Phin/Pin$$

In the case where the halogen gas concentration (volume ratio) in the injected gas containing both the first laser gas (injection amount ΔPf2, halogen gas concentration C0) and the second laser gas (injection amount ΔPb) is equal to the pre-control halogen gas concentration (volume ratio) Ch0, the following equation can hold true.

$$Ch0=C0\cdot \Delta Pf2/(\Delta Pf2+\Delta Pb) \qquad \text{Formula 3}$$

Meanwhile, the gas replacement amount Q can be expressed through the following equation.

$$Q=\Delta Pf2+\Delta Pb \qquad \text{Formula 4}$$

Accordingly, the gas control unit 47 may calculate a ΔPf2 and a ΔPb that fulfill Formulas 3 and 4 as the first laser gas injection amount ΔPf2 and the second laser gas injection amount ΔPb (S814).

Figure 17:
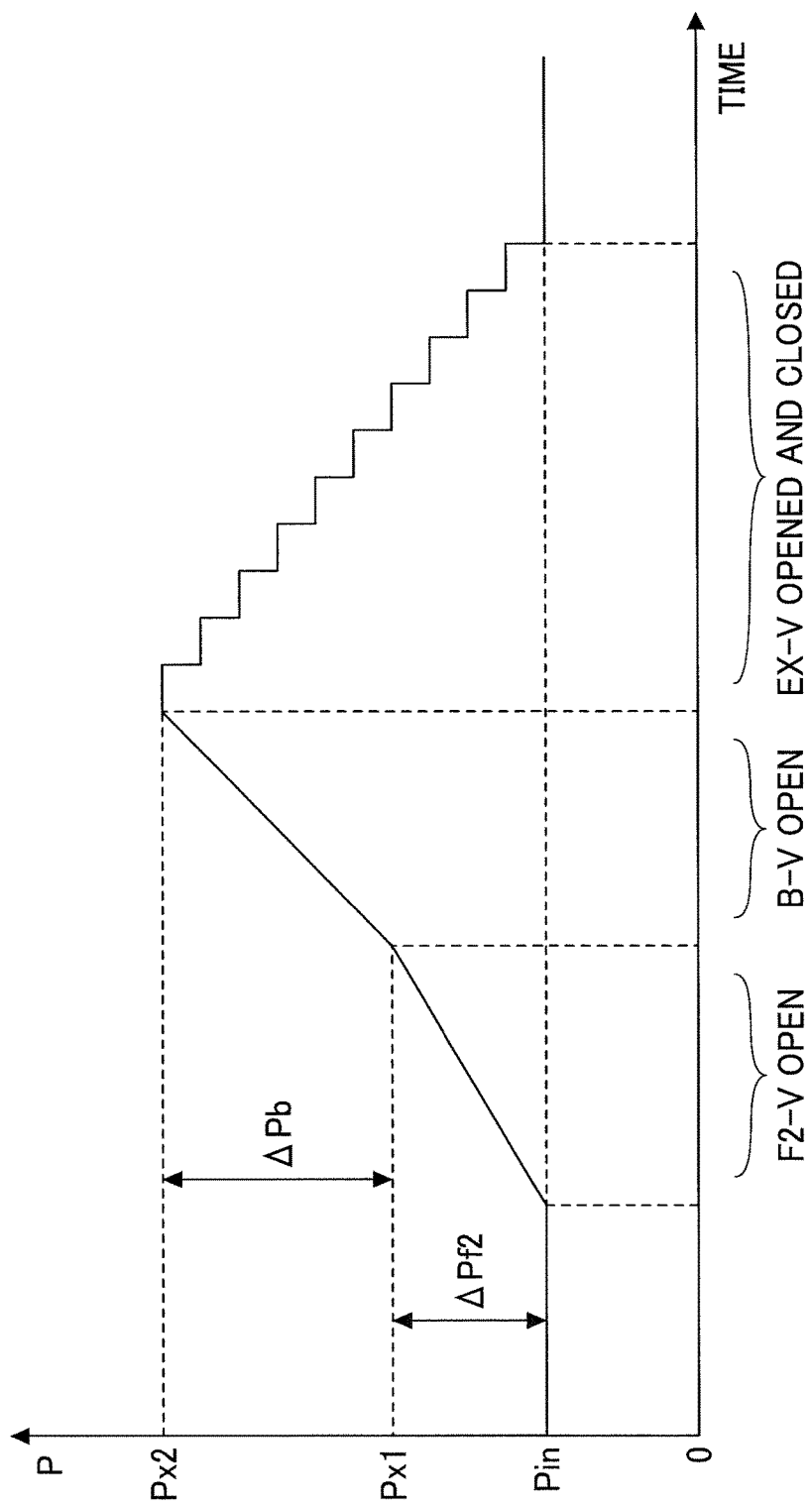
FIG. 17 is a graph illustrating changes in a gas pressure within a laser chamber resulting from the partial gas replacement control indicated in FIG. 15.

FIG. 17 is a graph illustrating changes in the gas pressure within the laser chamber resulting from the partial gas replacement control indicated in FIG. 15. The gas control unit 47 may start the partial gas replacement control each time the time interval Tpi of the partial gas replacement control passes. When the partial gas replacement control is started, the first laser gas injection valve F2-V and the control valve C-V are opened, and the gas pressure P within the laser chamber 10 can increase gradually from the pre-control gas pressure Pin. When the gas pressure P within the laser chamber 10 reaches the first target gas pressure Px1, the control valve C-V and the first laser gas injection valve F2-V are closed. Next, the second laser gas injection valve B-V and the control valve C-V are opened, and thus the gas pressure P within the laser chamber 10 can further increase from the first target gas pressure Px1. When the gas pressure P within the laser chamber 10 reaches the second target gas pressure Px2, the control valve C-V and the second laser gas injection valve B-V are closed, and thus the increase in the gas pressure P can be stopped.

Next, the exhaust pump 46 is started, and after the control valve C-V is opened, the exhaust valve EX-V is opened for a predetermined amount of time and then closed; as a result, the gas pressure P within the laser chamber 10 can decrease slightly from the second target gas pressure Px2. The opening/closing operations of the exhaust valve EX-V are repeated until the gas pressure P within the laser chamber 10 reaches the pre-control gas pressure Pin, and with each repetition, the gas pressure P within the laser chamber 10 can decrease slightly. The opening/closing operations of the exhaust valve EX-V end when the gas pressure P within the laser chamber 10 reaches the pre-control gas pressure Pin; thus the decrease in the gas pressure P can stop. Thereafter, the control valve C-V may be closed and the exhaust pump 46 may be stopped.

As described thus far, the first laser gas injection amount ΔPf2 and the second laser gas injection amount ΔPb may be calculated so that the halogen gas partial pressure does not change between before and after the partial gas replacement control. Furthermore, the gas pressure within the laser chamber 10 may be almost entirely prevented from changing between before and after the partial gas replacement control by exhausting essentially the same amount as the total injection amounts of the first laser gas and the second laser gas. Accordingly, fluctuations in the oscillation conditions of the laser light can be suppressed, which makes it possible to ensure the stability of the performance of the excimer laser apparatus, while at the same time reducing the concentration of impurities.

In addition, because the second laser gas is supplied to the interior of the laser chamber 10 after the first laser gas has been supplied to the interior of the laser chamber 10, halogen gas that remains in the first pipe 41, which is a shared pipe, can be pushed into the laser chamber 10 by the second laser gas. Accordingly, the halogen gas partial pressure within the laser chamber 10 can be precisely controlled.

5. Second Embodiment (Integrated Control Including Partial Gas Replacement Control and Halogen Gas Filling Control)

5.1 Outline of Gas Control

Figure 18:
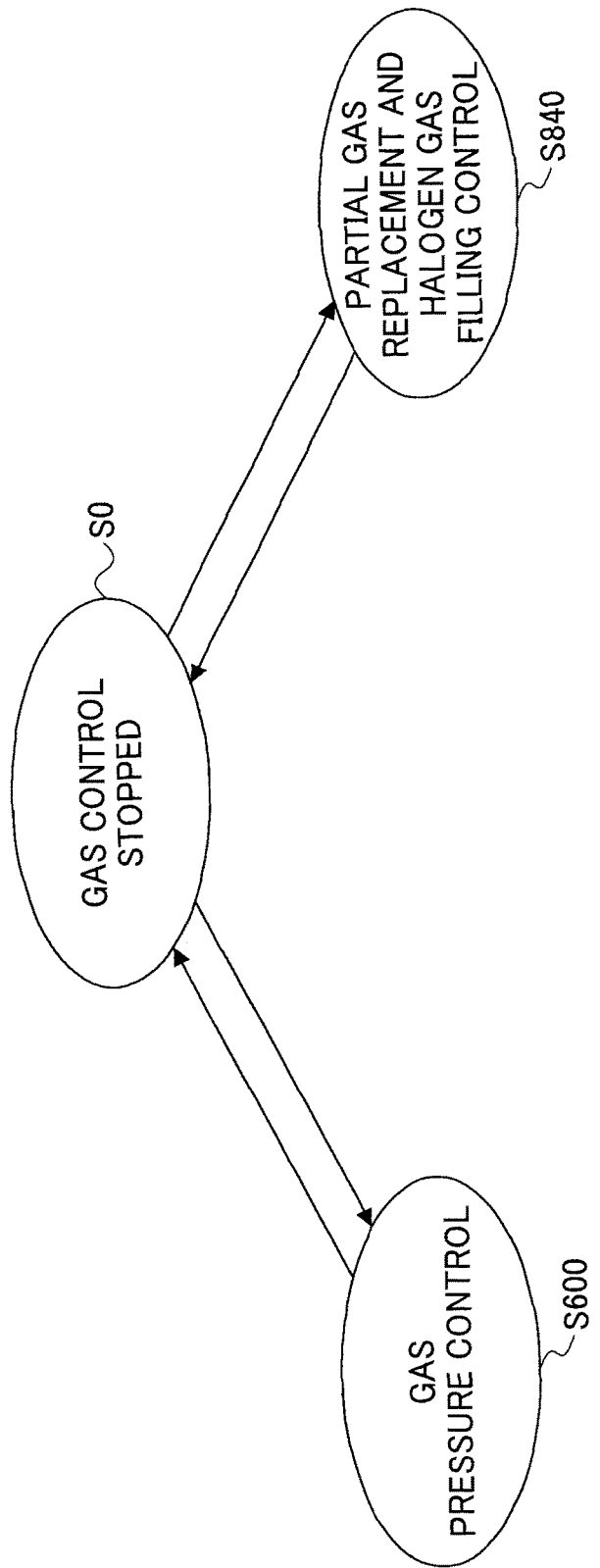
FIG. 18 is a state transition diagram illustrating gas control according to a second embodiment.

FIG. 18 is a state transition diagram illustrating gas control according to the second embodiment. As shown in FIG. 18, the gas control according to the second embodiment may include the gas pressure control (S600) and partial gas replacement and halogen gas filling control (S840). A gas control stopped state (S0) may be included as well. The configuration of the excimer laser apparatus may be the same as in the first embodiment.

The partial gas replacement and halogen gas filling control (S840) may, like the partial gas replacement control according to the first embodiment, inject the first laser gas and the second laser gas into the laser chamber 10 and exhaust an amount of gas equivalent to the total injection amounts of those gases from the laser chamber 10. However, in the partial gas replacement and halogen gas filling control according to the second embodiment, the first laser gas injection amount and the second laser gas injection amount may be calculated so that the halogen gas partial pressure, which has decreased due to laser light output over a long period of time, is restored to a predetermined value.

5.2 Main Flow

Figure 19:
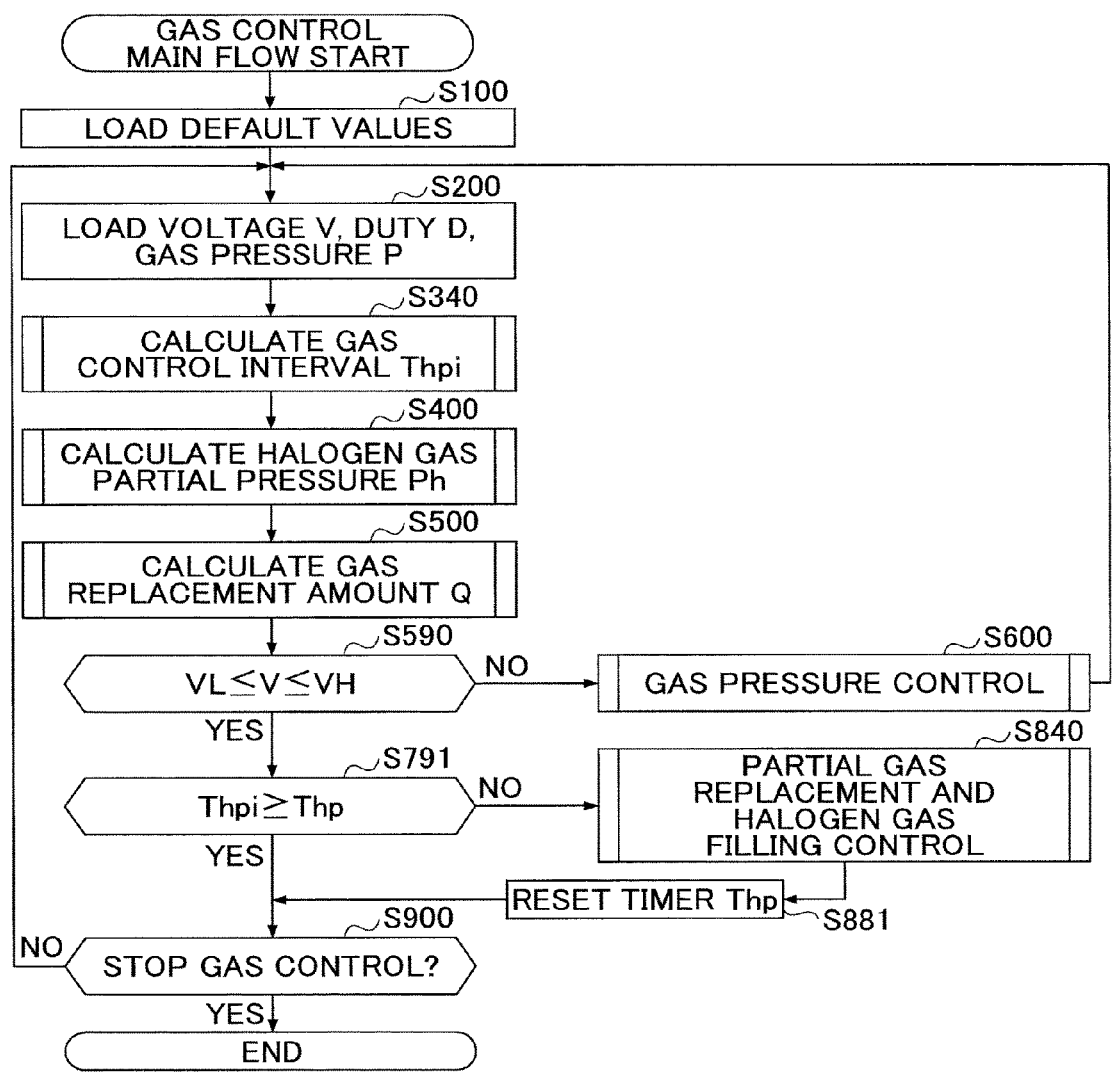
FIG. 19 is a flowchart illustrating gas control according to the second embodiment.

FIG. 19 is a flowchart illustrating the gas control according to the second embodiment. The processes shown in FIG. 19 may be carried out by the gas control unit 47 (FIG. 1). The processing shown in FIG. 19 may, in S100, start measuring time using a timer Thp instead of the timers Th and Tp described in the first embodiment. In addition, a gas control interval Thpi may be calculated instead of the gas control intervals Thi and Tpi described in the first embodiment (S340). The calculation of the gas control interval Thpi will be described later.

In addition, the processing illustrated in FIG. 19 differs from that described in the first embodiment in that the partial gas replacement and halogen gas filling control (S840) can be included as a single state, instead of the halogen gas filling control and the partial gas replacement control being included as individual states as in the first embodiment.

In the second embodiment, in the case where the conditions for gas pressure control are not in place (S590: YES), the gas control unit 47 may compare the timer Thp with the time interval Thpi for the partial gas replacement and halogen gas filling control (S791).

In the case where the timer Thp has reached the time interval Thpi of the partial gas replacement and halogen gas filling control (Thpi<Thp), the gas control unit 47 may carry out the partial gas replacement and halogen gas filling control (S840). The details of the partial gas replacement and halogen gas filling control will be described later. When the partial gas replacement and halogen gas filling control has ended, the timer Thp may be reset (S881). The other processes may be the same as those described in the first embodiment.

5.3 Calculation of Gas Control Interval (Details of S340)

Figure 20A:
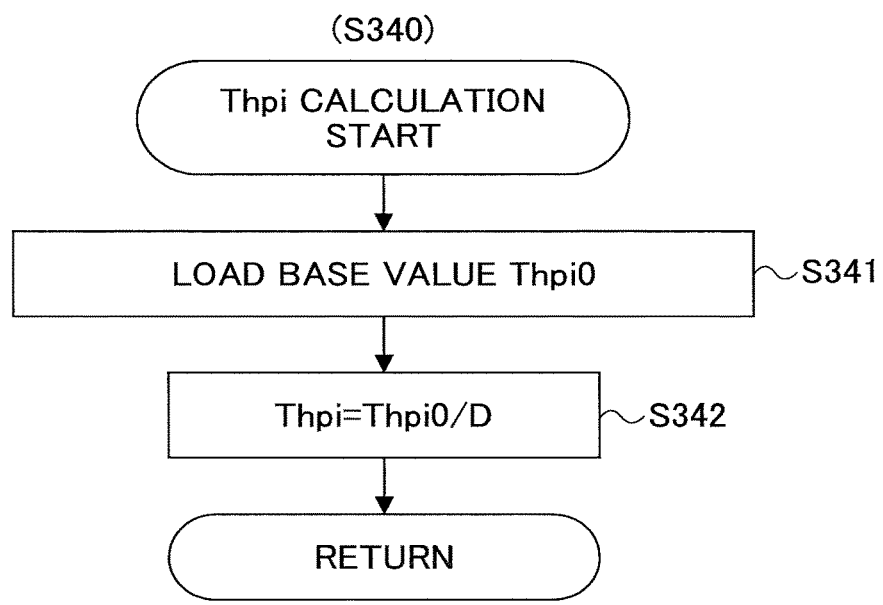
FIG. 20A is a flowchart illustrating a first example of a process that calculates a gas control interval, indicated in FIG. 19.
Figure 20B:
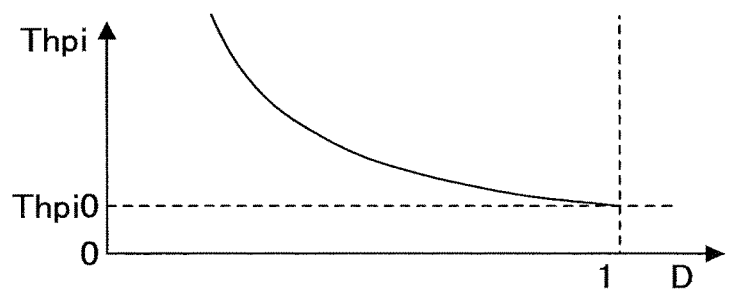
FIG. 20B is a graph illustrating a relationship between a duty of an excimer laser apparatus and the gas control interval calculated as shown in FIG. 20A.

FIG. 20A is a flowchart illustrating a first example of a process that calculates the gas control interval, indicated in FIG. 19. FIG. 20B is a graph illustrating a relationship between the duty of the excimer laser apparatus and the gas control interval calculated as shown in FIG. 20A.

First, the gas control unit 47 may load a base value Thpi0 of a time interval for the partial gas replacement and halogen gas filling control (S341).

Next, the gas control unit 47 may calculate the time interval Thpi for the partial gas replacement and halogen gas filling control as Thpi0/D, based on the loaded base value Thpi0 and the duty D of the excimer laser apparatus (S342).

Figure 20C:
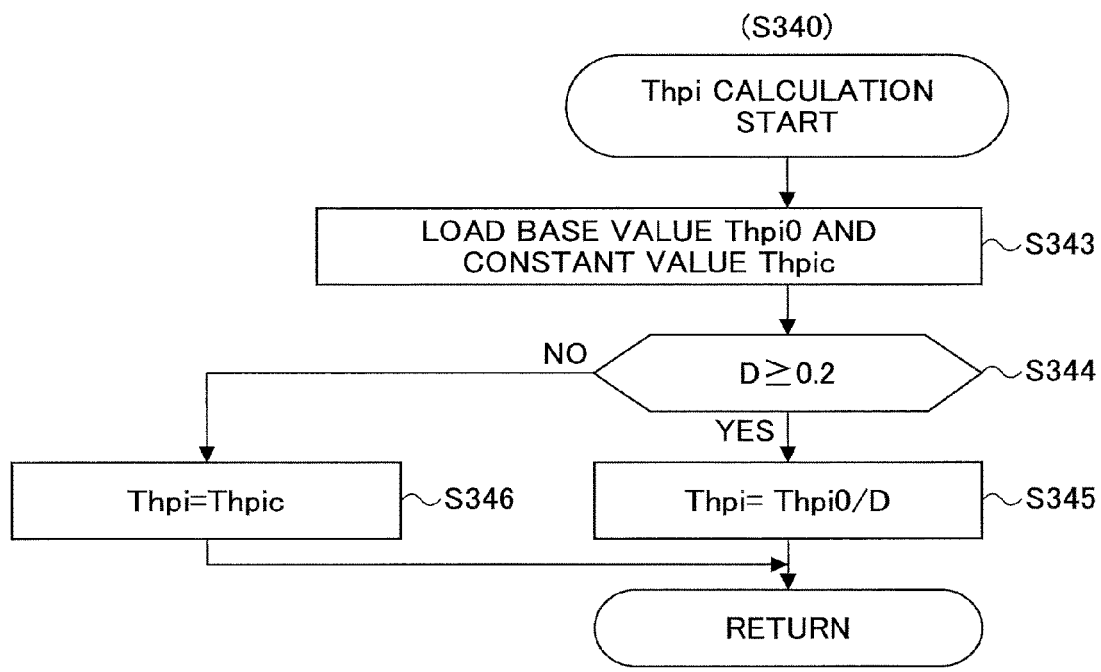
FIG. 20C is a flowchart illustrating a second example of a process that calculates a gas control interval, indicated in FIG. 19.
Figure 20D:
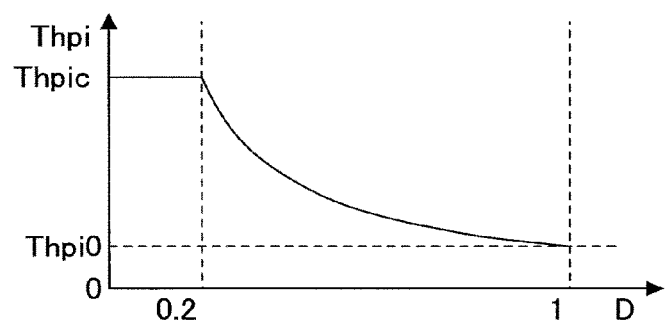
FIG. 20D is a graph illustrating a relationship between a duty of an excimer laser apparatus and the gas control interval calculated as shown in FIG. 20C.

FIG. 20C is a flowchart illustrating a second example of a process that calculates the gas control interval, indicated in FIG. 19. FIG. 20D is a graph illustrating a relationship between the duty of the excimer laser apparatus and the gas control interval calculated as shown in FIG. 20C.

First, the gas control unit 47 may load the base value Thpi0 of the time interval for the partial gas replacement and halogen gas filling control and a constant value Thpic serving as an upper limit (S343).

Next, the gas control unit 47 may load the duty D of the excimer laser apparatus, and may determine whether or not the duty D is greater than or equal to a constant value (for example, 0.2) (S344).

In the case where the duty D is greater than or equal to the constant value (S344: YES), the gas control unit 47 may calculate the time interval Thpi for the partial gas replacement and halogen gas filling control as Thpi0/D, in the same manner as shown in FIG. 20A (S345).

However, in the case where the duty D is not greater than or equal to the constant value (S344: NO), the gas control unit 47 may take the time interval Thpi for the partial gas replacement and halogen gas filling control as the constant value Thpic (S346).

5.4 Partial Gas Replacement and Halogen Gas Filling Control (Details of S840)

Figure 21:
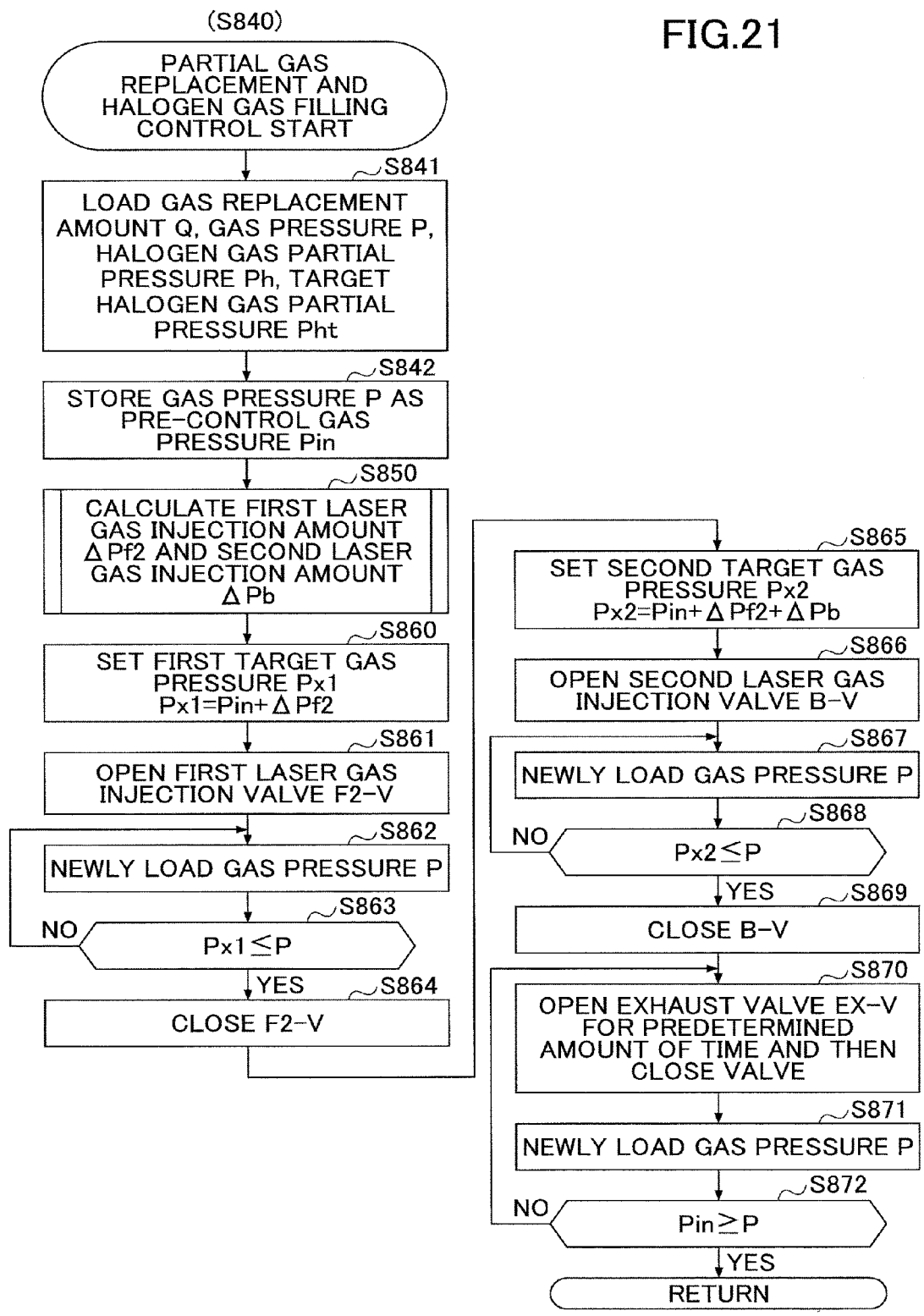
FIG. 21 is a flowchart illustrating partial gas replacement and halogen gas filling control indicated in FIG. 19.

FIG. 21 is a flowchart illustrating partial gas replacement and halogen gas filling control indicated in FIG. 19. In the partial gas replacement and halogen gas filling control, the first laser gas and the second laser gas may be injected into the laser chamber 10 and an amount of gas equivalent to the total injection amounts of those gases may be exhausted from the laser chamber 10, in the same manner as the partial gas replacement control according to the first embodiment. However, in the partial gas replacement and halogen gas filling control according to the second embodiment, the injection amounts of the first laser gas and the second laser gas may be different from those used in the partial gas replacement control according to the first embodiment.

The gas control unit 47 may load the gas replacement amount Q, the gas pressure P, the halogen gas partial pressure Ph, and the target halogen gas partial pressure Pht (S841). Next, the gas control unit 47 may store the gas pressure P as the pre-control gas pressure Pin in the storage device (S842).

Furthermore, the gas control unit 47 may calculate the first laser gas injection amount $\Delta Pf2$ and the second laser gas injection amount $\Delta Pb$ for controlling the halogen gas partial pressure within the laser chamber 10 to the target halogen gas partial pressure Pht (S850) The other processes may be the same as those in the partial gas replacement control according to the first embodiment (FIG. 15).

Figure 22:
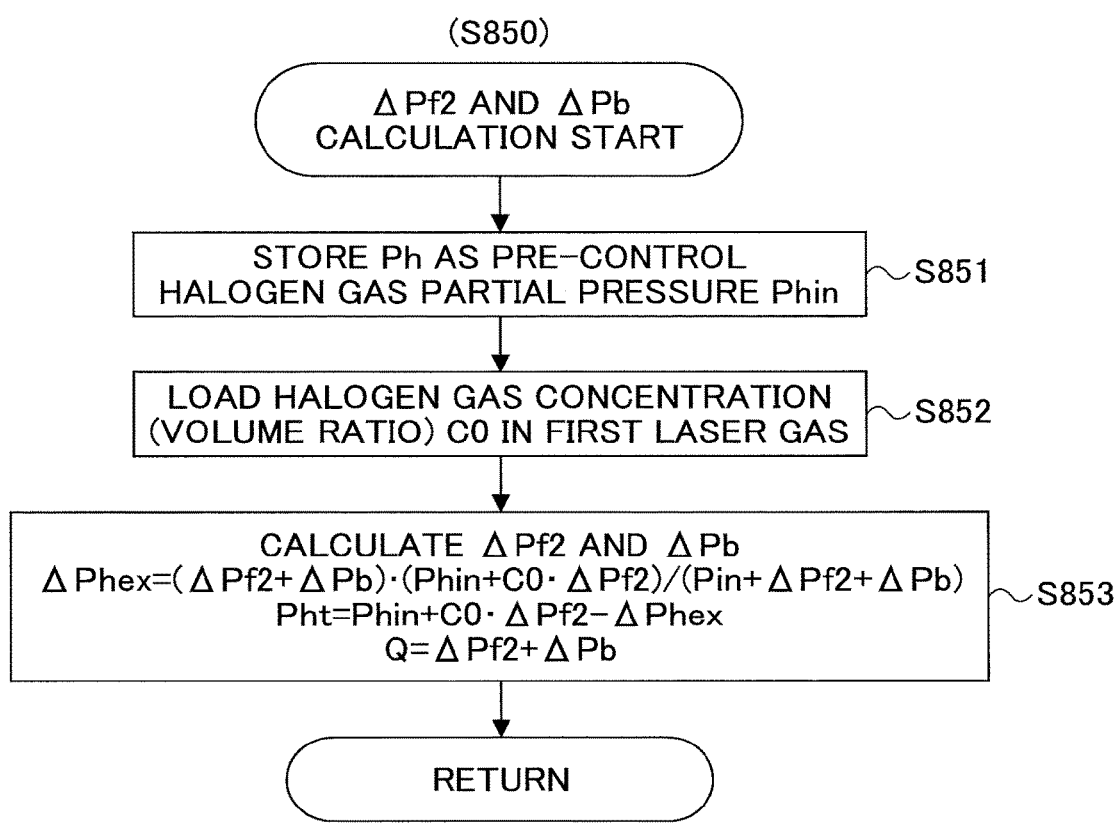
FIG. 22 is a flowchart illustrating a process for calculating a first laser gas injection amount and a second laser gas injection amount indicated in FIG. 21.

FIG. 22 is a flowchart illustrating processes for calculating the first laser gas injection amount and the second laser gas injection amount indicated in FIG. 21. The gas control unit 47 may, through the following processing, calculate the first laser gas injection amount $\Delta Pf2$ and the second laser gas injection amount $\Delta Pb$.

First, the gas control unit 47 may store the halogen gas partial pressure Ph in the storage device as the pre-control halogen gas partial pressure Phin (S851).

Next, the gas control unit 47 may load the halogen gas concentration C0 in the first laser gas (a volume ratio of the halogen component of the first laser gas) (S852). The halogen gas concentration in the first laser gas may be a halogen gas concentration (volume ratio) in the first receptacle F2, or may be inputted into the gas control unit 47 in advance and held so as to be capable of being referred to by the gas control unit 47.

The halogen gas partial pressure increase amount $\Delta Ph$ in the case where the first laser gas (injection amount $\Delta Pf2$) and the second laser gas (injection amount $\Delta Pb$) are injected into the laser chamber 10 can be expressed by the following equation.

$$\Delta Ph = C0 \cdot \Delta Pf2$$

The halogen gas partial pressure that decreases due to exhausting to the pre-control gas pressure Pin (an exhaust amount equivalent to the injection amount $\Delta Pf2 + \Delta Pb$) after the first laser gas and the second laser gas have been injected into the laser chamber 10 (that is, the reduction amount $\Delta Phex$) can be expressed by the following equation.

$$\Delta Phex = (\Delta Pf2 + \Delta Pb) \cdot (Phin + C0 \cdot \Delta Pf2)/(Pin + \Delta Pf2 + \Delta Pb) \qquad \text{Formula 5}$$

Meanwhile, the target halogen gas partial pressure Pht can be expressed by the following equation. Note that the target halogen gas partial pressure Pht may, as in the first embodiment, be a value that is set in accordance with operational conditions of the excimer laser apparatus.

$$Pht = Phin + C0 \cdot \Delta Pf2 - \Delta Phex \qquad \text{Formula 6}$$

Furthermore, the gas replacement amount Q can be expressed through the following equation.

$$Q = \Delta Pf2 + \Delta Pb \qquad \text{Formula 7}$$

Accordingly, the gas control unit 47 may calculate a $\Delta Pf2$ and a $\Delta Pb$ that fulfill Formulas 5 through 7 as the first laser gas injection amount $\Delta Pf2$ and the second laser gas injection amount $\Delta Pb$ (S853). Alternatively, the gas control unit 47 may hold a table or the like in advance, and may determine the first laser gas injection amount $\Delta Pf2$ and the second laser gas injection amount $\Delta Pb$ by referring to this table. The table may hold values for the first laser gas injection amount $\Delta Pf2$ and the second laser gas injection amount $\Delta Pb$ that correspond to, for example, the gas replacement amount Q, the gas pressure P, the halogen gas partial pressure Ph, the target halogen gas partial pressure Pht, or the like.

According to the second embodiment, impurities within the laser chamber 10 can be reduced and the halogen gas partial pressure can be restored through a single process by carrying out the partial gas replacement control and the halogen gas filling control as an integrated process.

6. Third Embodiment (MOPO System)

6.1 Overall Description of MOPO System

Figure 23:
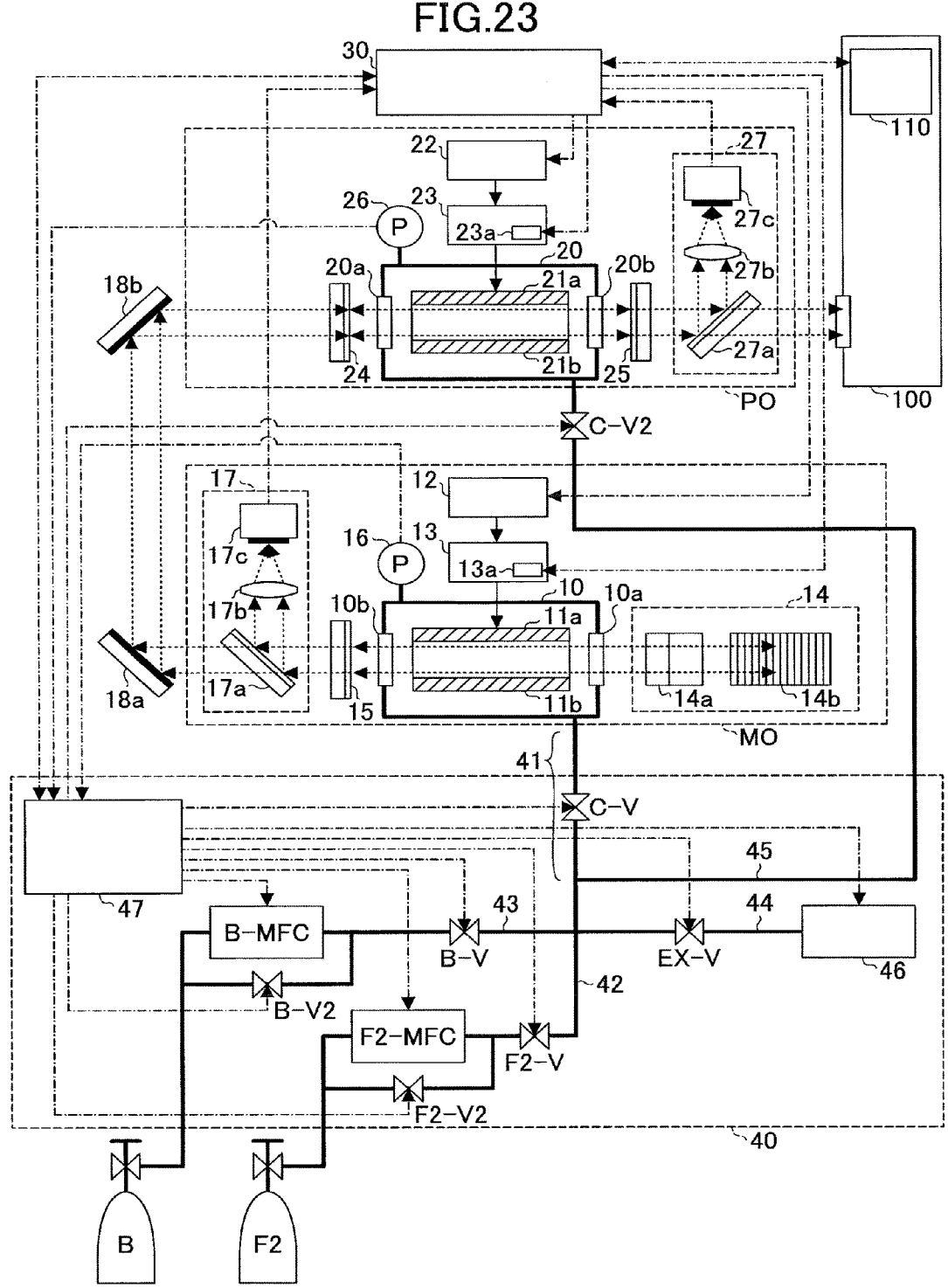
FIG. 23 schematically illustrates the configuration of an excimer laser system according to a third embodiment.

FIG. 23 schematically illustrates the configuration of an excimer laser system according to a third embodiment. The excimer laser system may include, in addition to the excimer laser apparatus according to the first embodiment: high-reflecting mirrors 18a and 18b; a laser chamber 20; a pair of electrodes 21a and 21b; a charger 22; a pulse power module (PPM) 23; a partially-reflecting mirror 24; an output coupling mirror 25; a pressure sensor 26; and an optical sensor module 27.

The laser chamber 10, the pair of electrodes 11a and 11b, the charger 12, the pulse power module (PPM) 13, the line narrow module 14, and the output coupling mirror 15 described in the first embodiment may configure a master oscillator MO. The laser chamber 20, the pair of electrodes 21a and 21b, the charger 22, the pulse power module (PPM) 23, the partially-reflecting mirror 24, and the output coupling mirror 25 may configure a power oscillator PO. A MOPO-type excimer laser system may be configured by the master oscillator MO and the power oscillator PO.

Pulsed laser light outputted by the master oscillator MO may enter into the partially-reflecting mirror 24 of the power oscillator PO via the high-reflecting mirrors 18a and 18b. The pulsed laser light that has entered into the partially-reflecting mirror 24 can pass through the interior of the laser chamber 20 and be amplified while traveling back and forth between the partially-reflecting mirror 24 and the output coupling mirror 25. Some of the amplified pulsed laser light can then pass through the output coupling mirror 25 and be outputted as output laser light, and can then be outputted to the exposure device 100 via the optical sensor module 27.

The configurations and functions of the charger 22, the pulse power module (PPM) 23, the pressure sensor 26, the optical sensor module 27, and so on may be the same as the corresponding elements described in the first embodiment.

In the gas control device 40, the first pipe 41 that is connected to the laser chamber 10 is connected to the second through fourth pipes 42 through 44. In addition to this, a fifth pipe 45 that is connected to the laser chamber 20 may also be connected. Accordingly, the laser chamber 20 may be connected to each of the first receptacle F2, the second receptacle B, and the exhaust pump 46. A control valve C-V2 may be provided in the fifth pipe 45.

6.2 Gas Control in MOPO System

Figure 24:
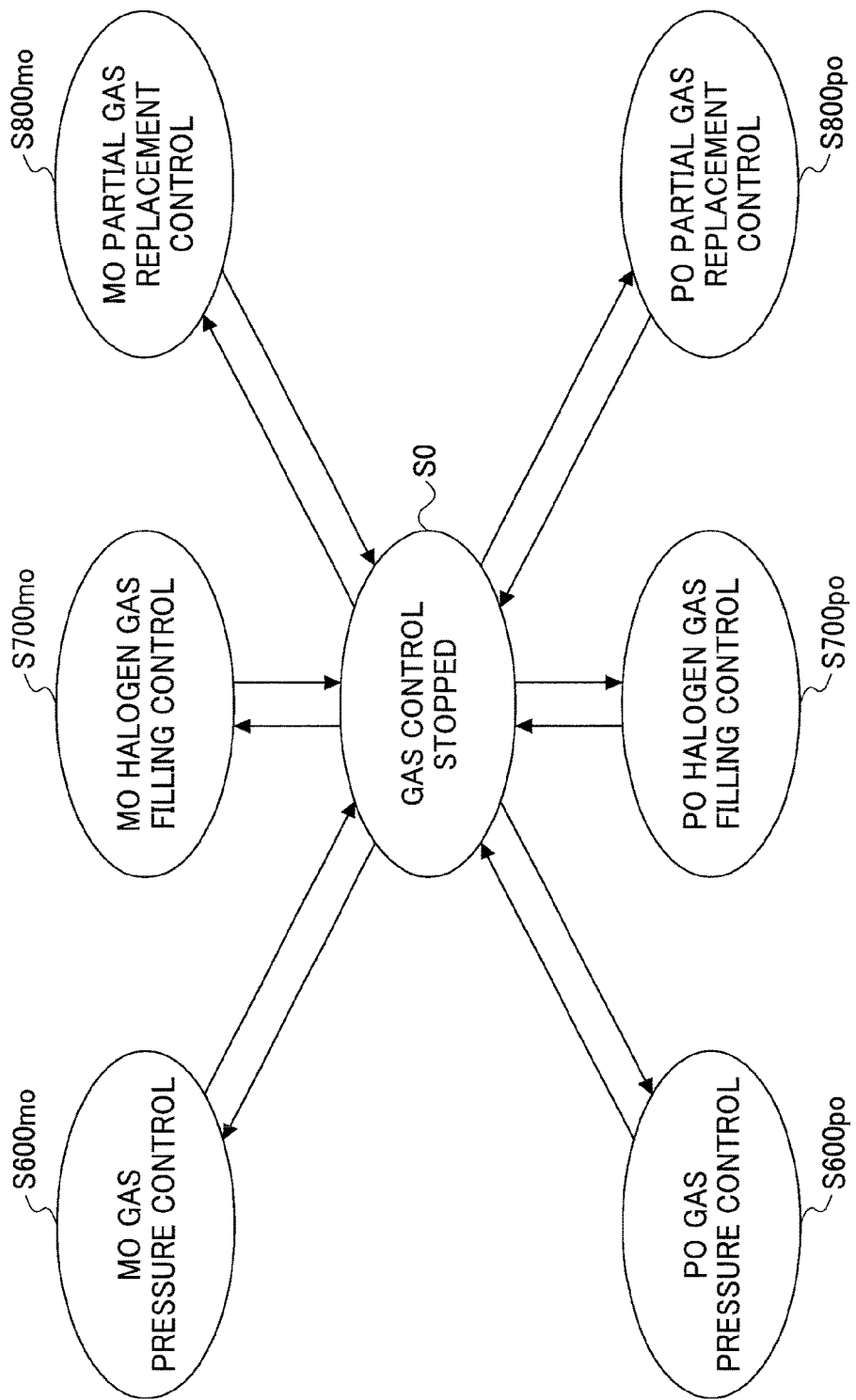
FIG. 24 is a state transition diagram illustrating gas control according to the third embodiment.

FIG. 24 is a state transition diagram illustrating gas control according to the third embodiment. As shown in FIG. 24, the gas control according to the third embodiment may include gas pressure control (S600po), halogen gas filling control (S700po), and partial gas replacement control (S800po) in the power oscillator PO, in addition to gas pressure control (S600mo), halogen gas filling control (S700mo), and partial gas replacement control (S800mo) in the master oscillator MO.

It is possible for the timing of the rise of a laser pulse waveform and so on to fluctuate if operational conditions of the excimer laser apparatus, such as the halogen gas partial pressure, are changed. However, a MOPO system is advantageous in that, for example, the energy of the pulsed laser light outputted from the power oscillator PO does not easily fluctuate, even if the timing of the rise of the laser pulse waveform and so on fluctuate in one of the master oscillator MO and the power oscillator PO. Accordingly, the gas control in the master oscillator MO and the gas control in the power oscillator PO may be carried out independently in accordance with the states of the gases in the respective oscillators.

Figure 25:
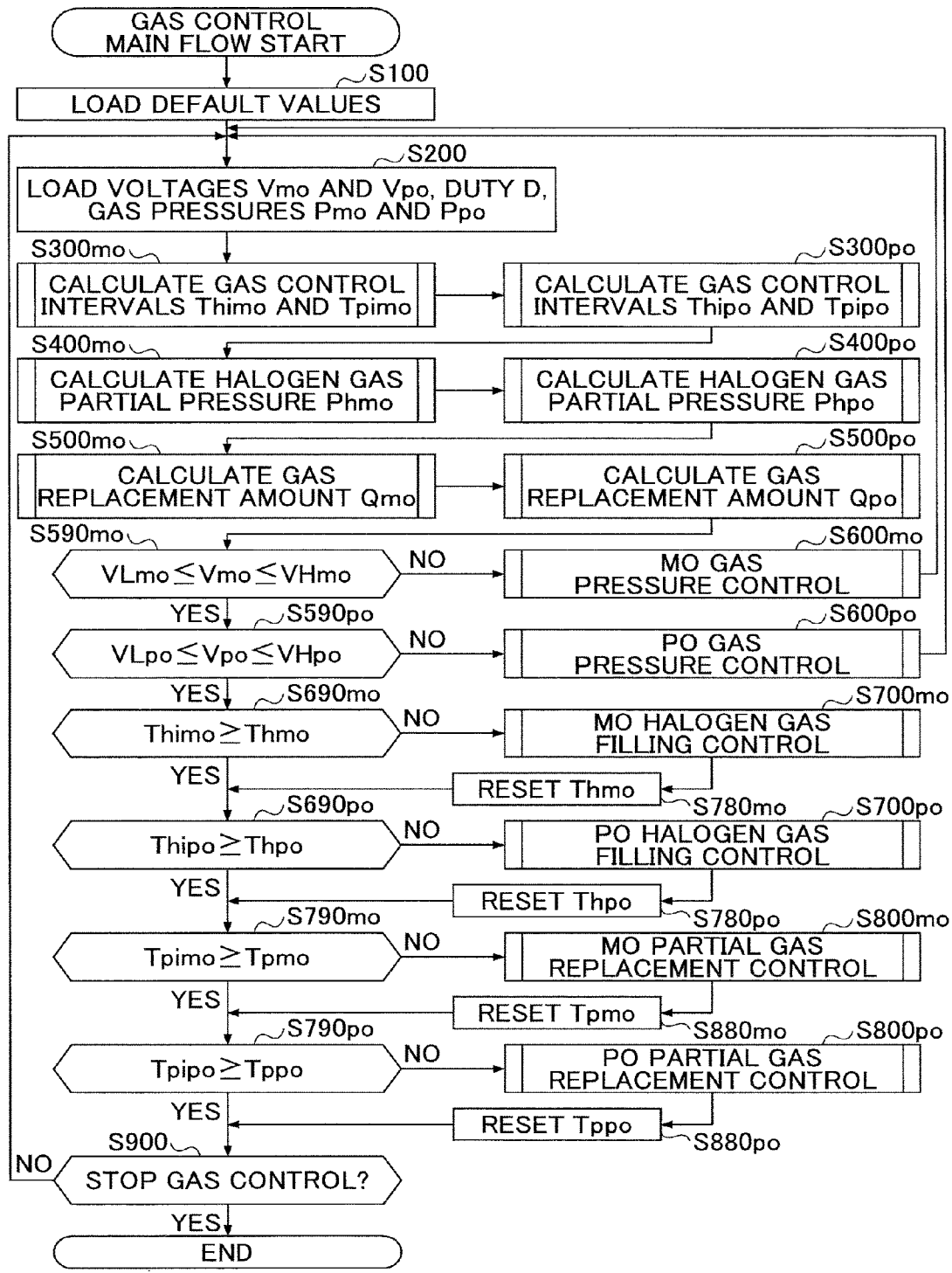
FIG. 25 is a flowchart illustrating gas control according to the third embodiment.

FIG. 25 is a flowchart illustrating the gas control according to the third embodiment. The processes shown in FIG. 25 may be carried out by the gas control unit 47 (FIG. 23). The processing shown in FIG. 25 can be different from that described in the first embodiment in that the processes in S300 to S880 in the first embodiment (FIG. 3) are carried out in both the master oscillator MO and the power oscillator PO. The processing may be the same as that described in the first embodiment in other respects.

7. Fourth Embodiment (Integration of Control in MOPO System)

Figure 26:
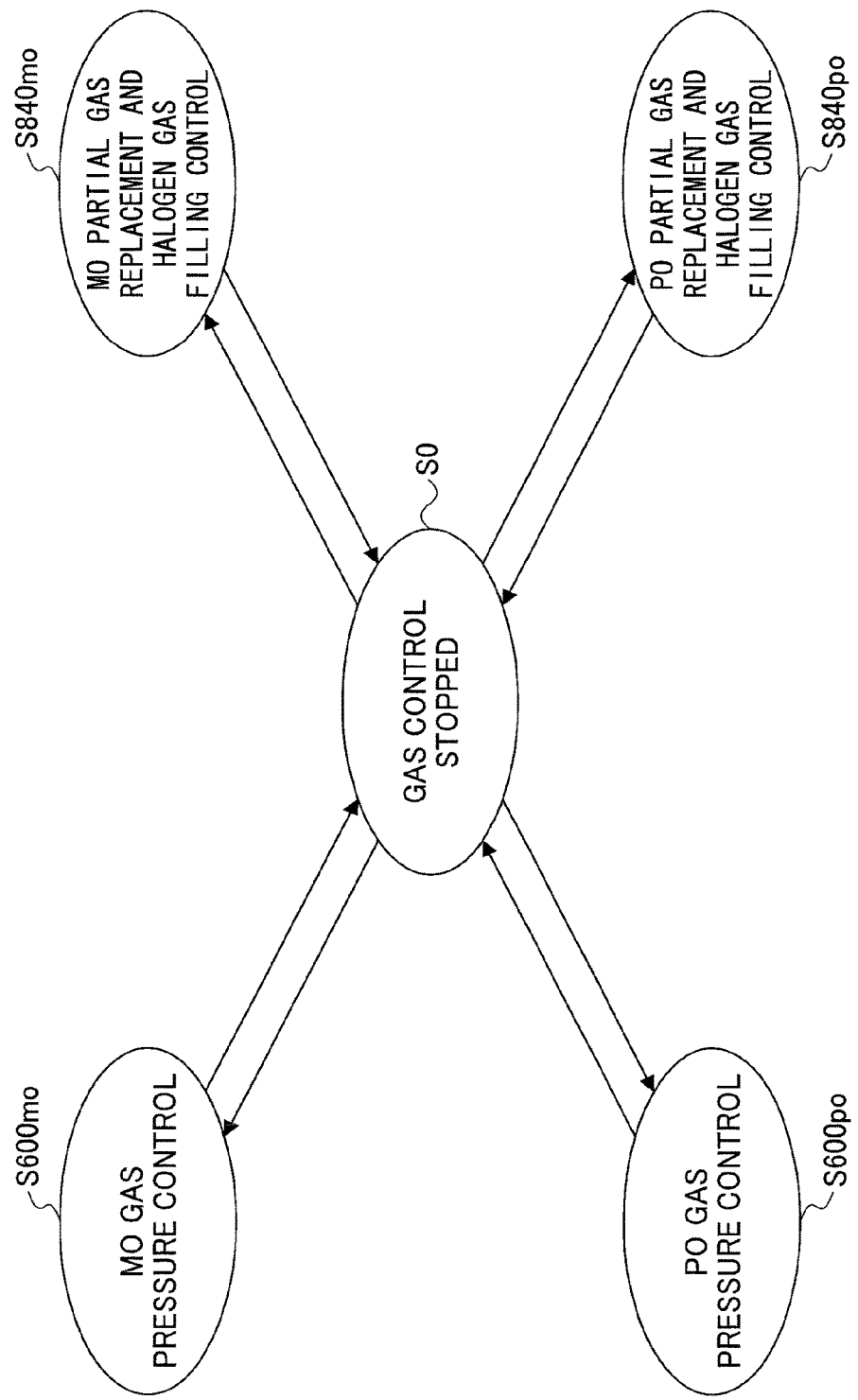
FIG. 26 is a state transition diagram illustrating gas control according to a fourth embodiment.
Figure 27:
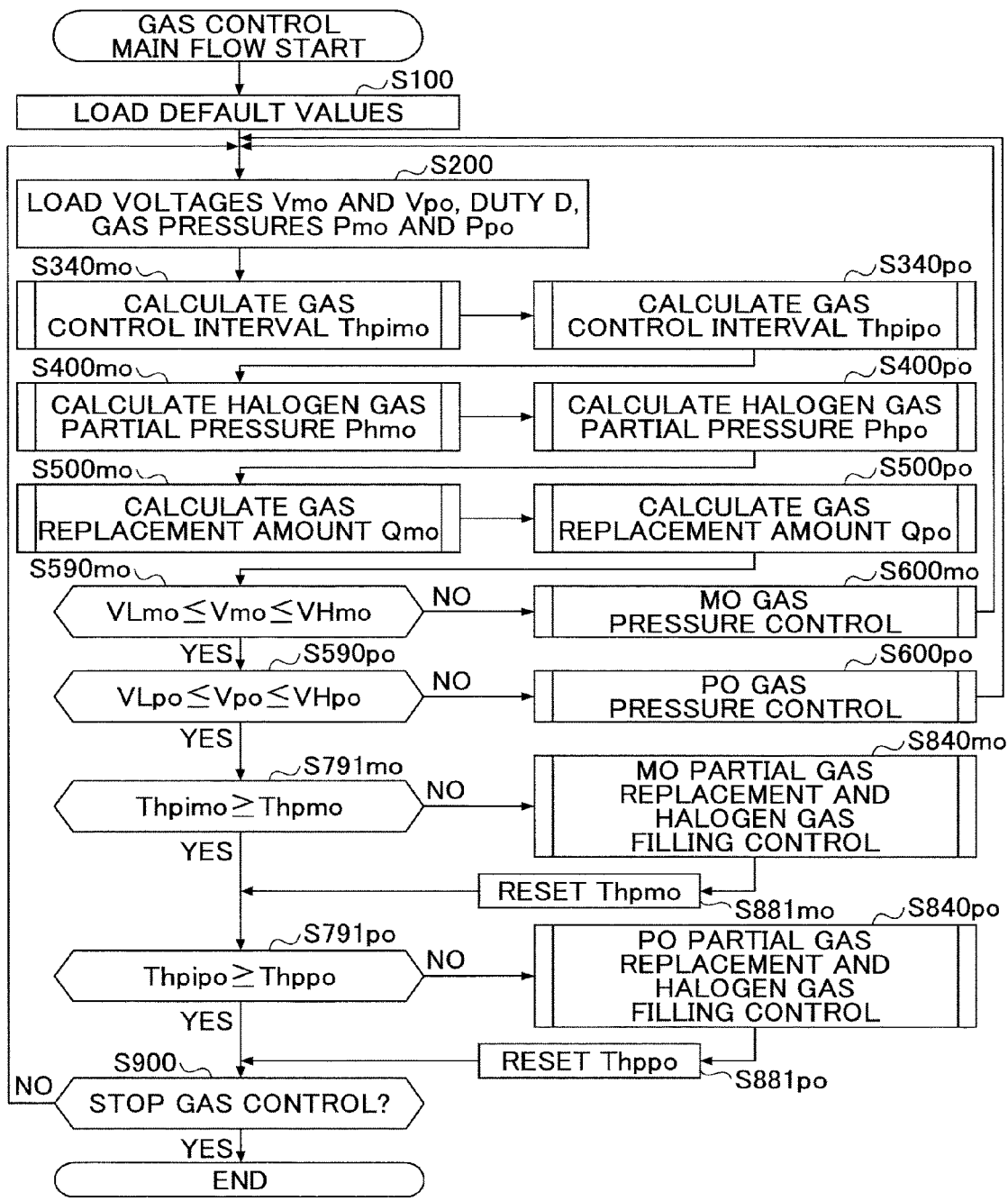
FIG. 27 is a flowchart illustrating gas control according to the fourth embodiment.

FIG. 26 is a state transition diagram illustrating gas control according to the fourth embodiment. FIG. 27 is a flowchart illustrating the gas control according to the fourth embodiment.

The gas control according to the fourth embodiment can differ from that in the third embodiment in that the partial gas replacement control and the halogen gas filling control performed in the master oscillator MO are integrated and the partial gas replacement control and the halogen gas filling control performed in the power oscillator PO are integrated. The processing may be the same as that described in the third embodiment in other respects. The details of a partial gas replacement and halogen gas filling control that integrates the partial gas replacement control and the halogen gas filling control may be the same as in the second embodiment.

8. Fifth Embodiment (Integration of Chargers in MOPO System)

Figure 28:
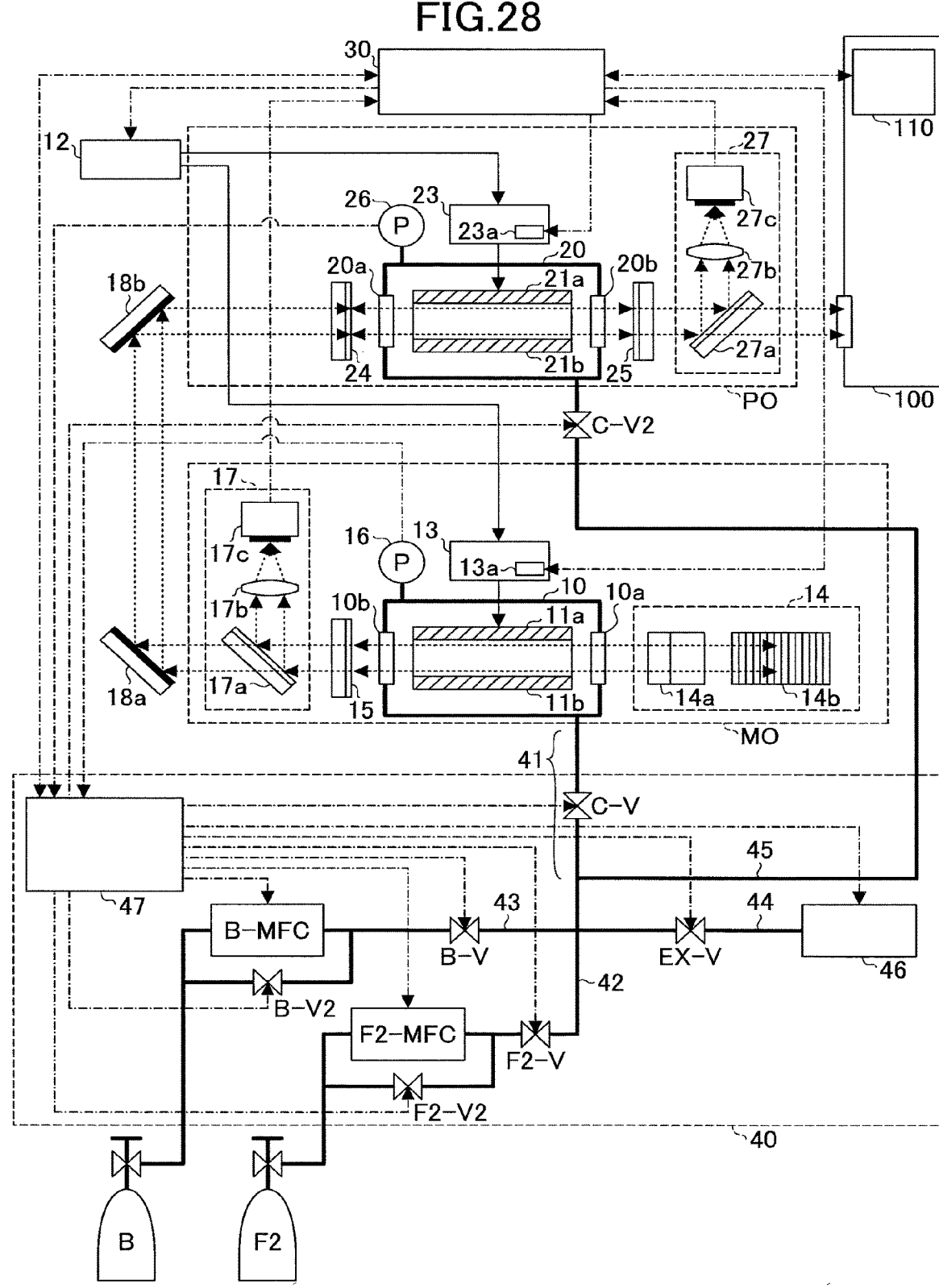
FIG. 28 schematically illustrates the configuration of an excimer laser system according to a fifth embodiment.

FIG. 28 schematically illustrates the configuration of an excimer laser system according to a fifth embodiment. As shown in FIG. 28, the pair of electrodes 11a and 11b included in the master oscillator MO and the pair of electrodes 21a and 21b included in the power oscillator PO may be connected to a shared charger 12. The configuration may be the same as that described in the fourth embodiment in other respects.

In the case where the charger 12 that is shared by the master oscillator MO and the power oscillator PO is used, voltage control can be carried out in common for the pair of electrodes 11a and 11b and the pair of electrodes 21a and 21b. In other words, even if the pulse energy of laser light has changed in one of the laser chambers due to an increase in the concentration of impurities or the like, the voltage control is carried out in common for both, and thus the output energy of the power oscillator PO can be stabilized. As a result, even if an attempt is made to carry out the gas pressure control based on the voltage applied to the electrodes, there are cases where which of the master oscillator MO and the power oscillator PO should carry out the gas pressure control cannot be determined precisely based only on the voltage. Accordingly, which of the master oscillator MO and the power oscillator PO should carry out the gas pressure control may be determined by detecting the output energy of the master oscillator MO.

Figure 29:
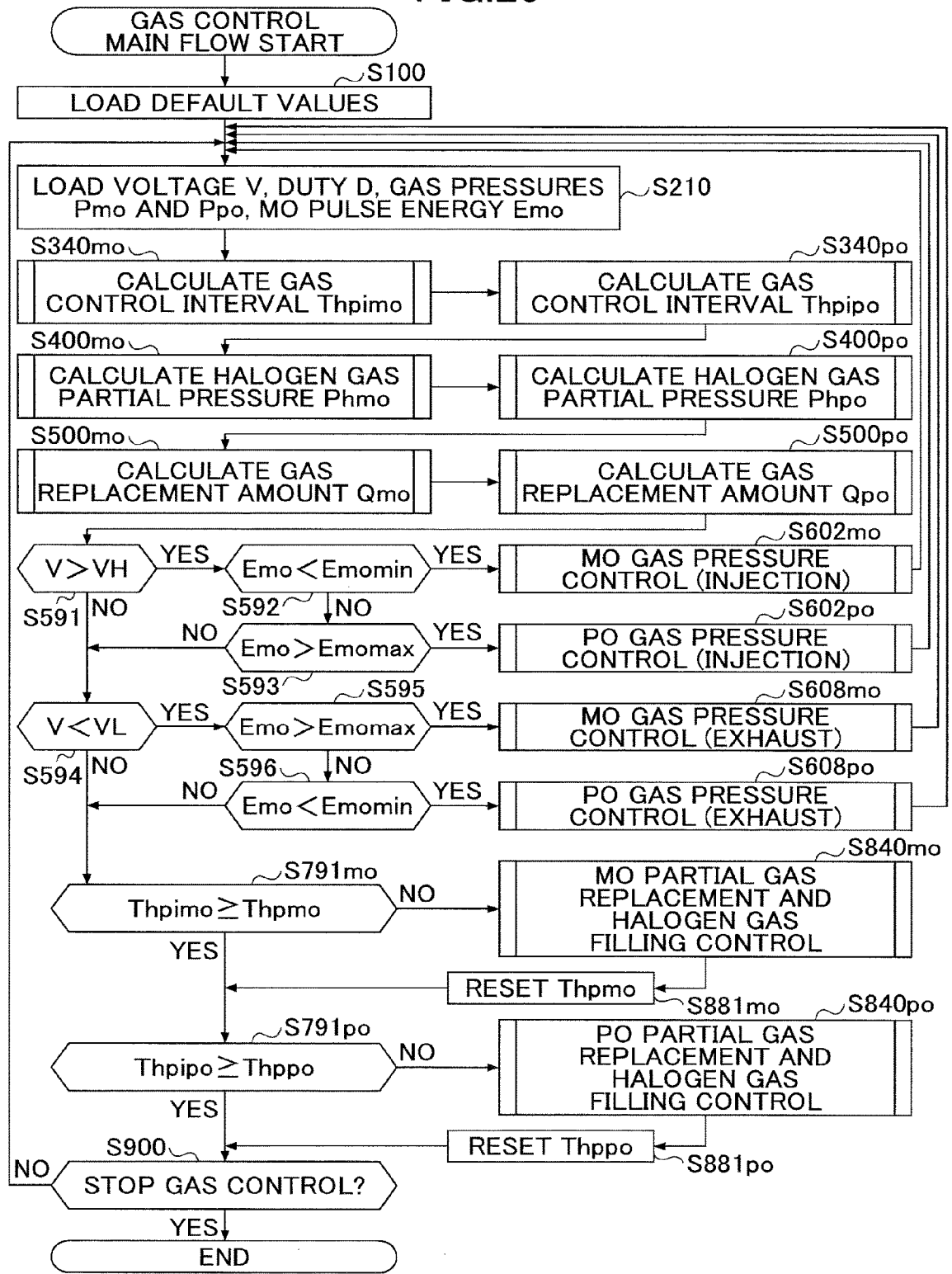
FIG. 29 is a flowchart illustrating gas control according to the fifth embodiment.

FIG. 29 is a flowchart illustrating the gas control according to the fifth embodiment. The gas control unit 47 may load the voltage V, the duty D, a gas pressure Pmo of the master oscillator MO, a gas pressure Ppo of the power oscillator PO, and a pulse energy Emo of the master oscillator MO (S210).

In addition, the gas control unit 47 may compare the voltage V with the first threshold VH and the second threshold VL (S591, S594). In the case where the voltage V is not within the range from the first threshold VH to the second threshold VL (S591: YES or S594: YES), it can be determined that gas pressure control should be carried out in the laser chamber of the master oscillator MO, the power oscillator PO, or both. Accordingly, the gas control unit 47 may compare the pulse energy Emo of the master oscillator MO with a first threshold Emomin and a second threshold Emomax (S592, S593, 5595, S596).

In the case where the comparison results in relationships where VL<VH<V and Emo<Emomin<Emomax (S592: YES), it can be understood that the output of the master oscillator MO is low and the output of the power oscillator PO cannot be ensured unless a high voltage is applied between the electrodes of the master oscillator MO and the power oscillator PO. Accordingly, in this case, the second laser gas may be injected into the laser chamber 10 of the master oscillator MO (S602mo).

Meanwhile, in the case where relationships where VL<VH<V and Emomin<Emomax<Emo are present (S593: YES), it can be understood that the amplification rate of the power oscillator PO is low and the output of the power oscillator PO cannot be ensured unless a high voltage is applied between the electrodes of the master oscillator MO and the power oscillator PO. Accordingly, in this case, the second laser gas may be injected into the laser chamber 20 of the power oscillator PO (S602po).

Meanwhile, in the case where relationships where V<VL<VH and Emomin<Emomax<Emo are present (S595: YES), it can be understood that the output of the master oscillator MO is excessive and the output of the power oscillator PO will be excessive unless the voltage between the electrodes of the master oscillator MO and the power oscillator PO is suppressed. Accordingly, in this case, the gas in the laser chamber 10 of the master oscillator MO may be partially exhausted (S608mo).

Meanwhile, in the case where relationships where V<VL<VH and Emo<Emomin<Emomax are present (S596: YES), it can be understood that the amplification rate of the power oscillator PO is excessive and the output of the power oscillator PO will be excessive unless the voltage between the electrodes of the master oscillator MO and the power oscillator PO is suppressed. Accordingly, in this case, the gas in the laser chamber 20 of the power oscillator PO may be partially exhausted (S608po).

In the case where the voltage V fulfils the relationship of VL<V<VH (S591: NO and S594: NO), the gas pressure control need not be carried out.

Note that in the case where relationships where VL<VH<V and Emomin<Emo<Emomax are present (S593: NO), the gas pressure control need not be carried out, and the second laser gas may be injected into the laser chambers of the master oscillator MO and the power oscillator PO, respectively.

Meanwhile, in the case where relationships where V<VL<VH and Emomin<Emo<Emomax are present (S596: NO), the gas pressure control need not be carried out, and the gases in the laser chambers of the master oscillator MO and the power oscillator PO, respectively, may be partially exhausted.

The control aside from that described above may be the same as that described in the fourth embodiment.

9. Sixth Embodiment

MOPO System Including Ring Resonator

Figure 30A:
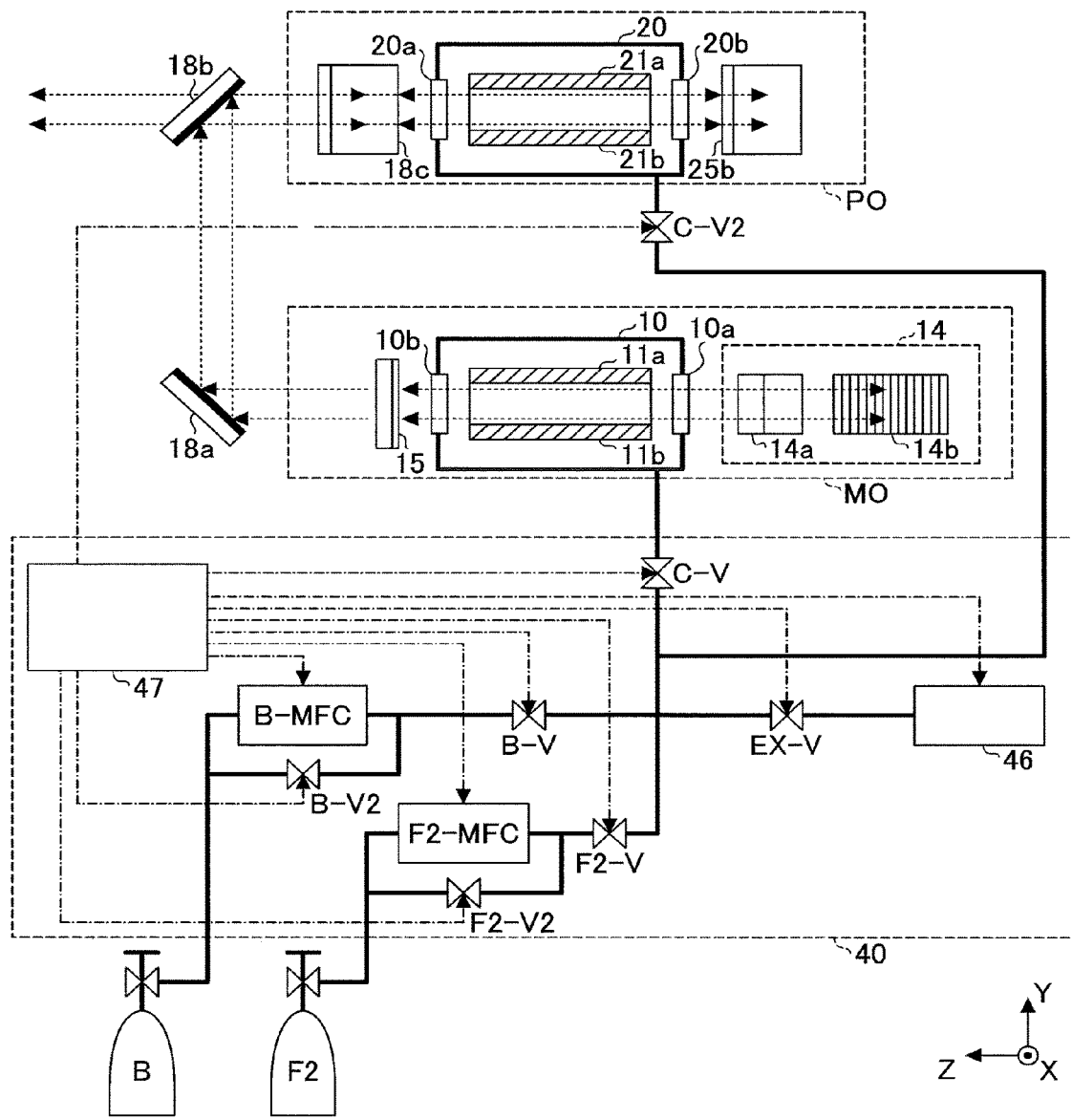
FIG. 30A schematically illustrates the configuration of an excimer laser system according to a sixth embodiment.
Figure 30B:
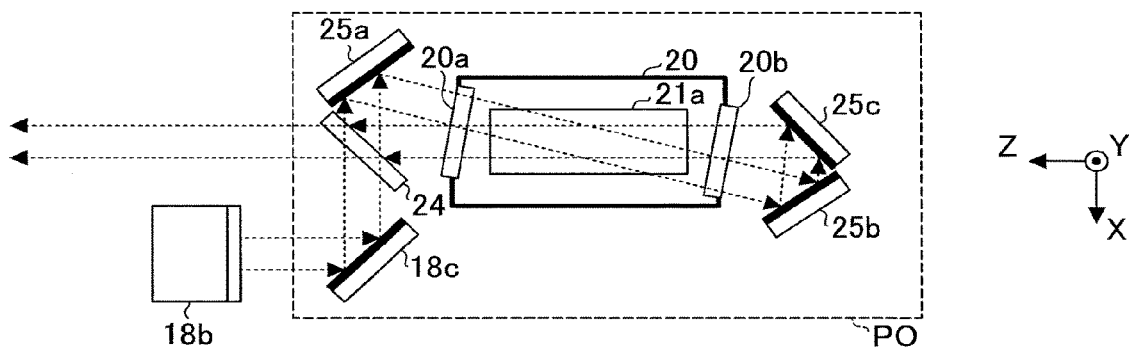
FIG. 30B schematically illustrates the configuration of a power oscillator indicated in FIG. 30A.

FIG. 30A schematically illustrates the configuration of an excimer laser system according to a sixth embodiment. FIG. 30B schematically illustrates the configuration of the power oscillator PO indicated in FIG. 30A. The sixth embodiment differs from the third embodiment in that the power oscillator PO can be configured using a ring resonator, as opposed to the third embodiment, in which the power oscillator PO is configured using a Fabry-Perot resonator.

The excimer laser system according to the sixth embodiment may include, in addition to the excimer laser apparatus according to the first embodiment: high-reflecting mirrors 18a through 18c; the laser chamber 20; the pair of electrodes 21a and 21b; a partially-reflecting mirror (output coupling mirror) 24; and high-reflecting mirrors 25a through 25c. Furthermore, a charger, a pulse power module (PPM), a pressure sensor, an optical sensor module, and so on, which are not illustrated, may also be included.

The laser light outputted from the master oscillator MO may be introduced into the partially-reflecting mirror (output coupling mirror) 24 of the power oscillator PO via the high-reflecting mirrors 18a through 18c.

The power oscillator PO may amplify the laser light by the laser light passing within the laser chamber 20 multiple times along a ring-shaped optical path configured by the high-reflecting mirrors 25a through 25c and the partially-reflecting mirror 24.

The laser light amplified by the power oscillator PO can then be outputted as output laser light via the partially-reflecting mirror (output coupling mirror) 24.

The configuration may be the same as that described in the third embodiment in other respects.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

What is claimed is:

1. An excimer laser system comprising:
   a first excimer laser apparatus that includes a first laser chamber containing a gas, at least a pair of first electrodes disposed within the first laser chamber, and a first resonator disposed sandwiching the first laser chamber;
   a second excimer laser apparatus that includes a second laser chamber containing a gas, at least a pair of second electrodes disposed within the second laser chamber, and a second resonator disposed sandwiching the second laser chamber, and that amplifies laser light outputted from the first excimer laser apparatus;
   at least one power source unit that supplies a voltage between the first electrodes and the second electrodes;

a gas supply unit, connected to a first receptacle that holds a first laser gas containing halogen gas and a second receptacle that holds a second laser gas having a lower halogen gas concentration than the first laser gas, the gas supply unit including:
  a first pipe connected to the first laser chamber;
  a first valve provided in the first pipe;
  a second pipe connected to the second laser chamber;
  a second valve provided in the second pipe; and
  a third pipe connected to both the first pipe and the second pipe, at least one of the first receptacle and the second receptacle being connected to the third pipe, so that the gas supply unit supplies the first laser gas and the second laser gas to the interiors of the first laser chamber and the second laser chamber;
a gas exhaust unit that partially exhausts gas from within the first laser chamber and the second laser chamber; and
a gas control unit that controls the gas supply unit and the gas exhaust unit,
wherein the gas control unit selectively performs:
a first gas pressure control in which the gas supply unit supplies the second laser gas to the interior of the first laser chamber or the gas exhaust unit partially exhausts gas from within the first laser chamber, where the gas control unit controls the first valve to open, while the second valve being closed;
a second gas pressure control in which the gas supply unit supplies the second laser gas to the interior of the second laser chamber or the gas exhaust unit partially exhausts gas from within the second laser chamber, where the gas control unit controls the second valve to open, while the first valve being closed;
a first partial gas replacement control in which the gas supply unit supplies the first laser gas and the second laser gas to the interior of the first laser chamber and the gas exhaust unit partially exhausts gas from within the first laser chamber sequentially, where the gas control unit controls the first valve to open, while the second valve being closed; and
a second partial gas replacement control in which the gas supply unit supplies the first laser gas and the second laser gas to the interior of the second laser chamber and the gas exhaust unit partially exhausts gas from within the second laser chamber sequentially, where the gas control unit controls the second valve to open, while the first valve being closed,
wherein the gas control unit is configured to:
measure a repetition rate of the laser light outputted from the first laser chamber or the second laser chamber;
calculate a first time interval based on the repetition rate, the first time interval having a first length when the repetition rate has a first value, the first time interval having a second length shorter than the first length when the repetition rate has a second value larger than the first value;
calculate a second time interval based on the repetition rate, the second time interval having a third length when the repetition rate has a third value, the second time interval having a fourth length shorter than the third length when the repetition rate has a fourth value larger than the third value;
perform a next first partial gas replacement control when the first time interval has passed since a former first partial gas replacement control was performed; and
perform a next second partial gas replacement control when the second time interval has passed since a former second partial gas replacement control was performed,
wherein, in the first partial gas replacement control, the gas supply unit supplies a first amount of laser gas including the first laser gas and the second laser gas to the interior of the first laser chamber and the gas exhaust unit partially exhausts the first amount of laser gas from within the first laser chamber when the repetition rate has the first value, and the gas supply unit supplies a second amount of laser gas including the first laser gas and the second laser gas to the interior of the first laser chamber, the second amount being smaller than the first amount, and the gas exhaust unit partially exhausts the second amount of laser gas from within the first laser chamber when the repetition rate has the second value, and
wherein, in the second partial gas replacement control, the gas supply unit supplies a third amount of laser gas including the first laser gas and the second laser gas to the interior of the second laser chamber and the gas exhaust unit partially exhausts the third amount of laser gas from within the second laser chamber when the repetition rate has the third value, and the gas supply unit supplies a fourth amount of laser gas including the first laser gas and the second laser gas to the interior of the second laser chamber, the fourth amount being smaller than the third amount, and the gas exhaust unit partially exhausts the fourth amount of laser gas from within the second laser chamber when the repetition rate has the fourth value.

2. The excimer laser system according to claim 1, wherein the gas control unit selectively performs:
  the first gas pressure control;
  the second gas pressure control;
  the first partial gas replacement control;
  the second partial gas replacement control;
  a first halogen gas filling control in which the gas supply unit supplies the first laser gas to the interior of the first laser chamber and the gas exhaust unit partially exhausts gas from within the first laser chamber sequentially; and
  a second halogen gas filling control in which the gas supply unit supplies the first laser gas to the interior of the second laser chamber and the gas exhaust unit partially exhausts gas from within the second laser chamber sequentially.

3. The excimer laser system according to claim 1, wherein the power source unit includes a single power storage unit that stores electrical energy, and the single power storage unit supplies a voltage both between the first electrodes and between the second electrodes.

4. An excimer laser system comprising:
  a master oscillator, including a first laser chamber containing a gas and a first pressure detection unit that detects a pressure within the first laser chamber, that outputs laser light;
  a power oscillator, including a second laser chamber containing a gas and a second pressure detection unit that detects a pressure within the second laser chamber, that amplifies and outputs the laser light outputted by the master oscillator;
  a gas supply unit, connected to a first receptacle that holds a first laser gas containing halogen gas and a second receptacle that holds a second laser gas having a lower halogen gas concentration than the first laser gas, the gas supply unit including:
  a first pipe connected to the first laser chamber;
  a first valve provided in the first pipe;
  a second pipe connected to the second laser chamber;
  a second valve provided in the second pipe; and
  a third pipe connected to both the first pipe and the second pipe, at least one of the first receptacle and the second receptacle being connected to the third pipe, so that the gas supply unit supplies the first laser gas and the second laser gas to the interiors of the first laser chamber and the second laser chamber;
a gas exhaust unit that exhausts gas from within the first laser chamber and the second laser chamber; and
a gas control unit, connected to the first and second pressure detection units, that controls the gas supply unit and the gas exhaust unit, wherein
the gas control unit calculates and holds halogen gas partial pressure values for the respective first and second laser chambers based on pressures and exhaust amounts from before and after the supply of the first and second laser gases, and calculates a first predetermined pressure, a second predetermined pressure, a third predetermined pressure, and a fourth predetermined pressure based on the latest halogen gas partial pressure value,
the gas control unit selectively performs:
a first gas replacement control in which the first laser gas is supplied to the interior of the first laser chamber up to the first predetermined pressure, the second laser gas is supplied up to the second predetermined pressure, and the gas within the first laser chamber is exhausted to the pressure present before the supply of the first laser gas, where the gas control unit controls the first valve to open, while the second valve being closed; and
a second gas replacement control in which the first laser gas is supplied to the interior of the second laser chamber up to the third predetermined pressure, the second laser gas is supplied up to the fourth predetermined pressure, and the gas within the second laser chamber is exhausted to the pressure present before the supply of the first laser gas, where the gas control unit controls the second valve to open, while the first valve being closed,
the gas control unit is configured to:
measure a repetition rate of the laser light outputted from the first laser chamber or the second laser chamber;
calculate a first time interval based on the repetition rate, the first time interval having a first length when the repetition rate has a first value, the first time interval having a second length shorter than the first length when the repetition rate has a second value larger than the first value;
calculate a second time interval based on the repetition rate, the second time interval having a third length when the repetition rate has a third value, the second time interval having a fourth length shorter than the third length when the repetition rate has a fourth value larger than the third value;
perform a next first gas replacement control when the first time interval has passed since a former first gas replacement control was performed; and
perform a next second gas replacement control when the second time interval has passed since a former second gas replacement control was performed,
in the first gas replacement control, the gas supply unit supplies a first amount of laser gas including the first laser gas and the second laser gas to the interior of the first laser chamber and the gas exhaust unit partially exhausts the first amount of laser gas from within the first laser chamber when the repetition rate has the first value, and the gas supply unit supplies a second amount of laser gas including the first laser gas and the second laser gas to the interior of the first laser chamber, the second amount being smaller than the first amount, and the gas exhaust unit partially exhausts the second amount of laser gas from within the first laser chamber when the repetition rate has the second value, and
in the second gas replacement control, the gas supply unit supplies a third amount of laser gas including the first laser gas and the second laser gas to the interior of the second laser chamber and the gas exhaust unit partially exhausts the third amount of laser gas from within the second laser chamber when the repetition rate has the third value, and the gas supply unit supplies a fourth amount of laser gas including the first laser gas and the second laser gas to the interior of the second laser chamber, the fourth amount being smaller than the third amount, and the gas exhaust unit partially exhausts the fourth amount of laser gas from within the second laser chamber when the repetition rate has the fourth value.

5. The excimer laser system according to claim 1, wherein the gas control unit determines as to whether it performs the first gas pressure control for the first laser chamber, then determines as to whether it performs the second gas pressure control for the second laser chamber after determining as to whether it performs the first gas pressure control.

6. The excimer laser system according to claim 1, wherein the gas control unit determines as to whether it performs the first partial gas replacement control for the first laser chamber, then determines as to whether it performs the second partial gas replacement control for the second laser chamber after determining as to whether it performs the first partial gas replacement control.

7. The excimer laser system according to claim 1, wherein the at least one power source unit includes [i] a first charger for supplying a voltage between the pair of first electrodes and [ii] a second charger for supplying a voltage between the pair of second electrodes, and
the gas control unit performs [i] the first gas pressure control based on the voltage supplied by the first charger and [ii] the second gas pressure control based on the voltage supplied by the second charger.

8. The excimer laser system according to claim 1, wherein the gas control unit includes a timer for measuring a time, and performs the first partial gas replacement control and the second partial gas replacement control based on the time measured by the timer.

9. The excimer laser system according to claim 2, wherein the gas control unit includes a timer for measuring a time and performs the first halogen gas filling control and the second halogen gas filling control based on the time measured by the timer.

10. The excimer laser system according to claim 4, wherein the gas control unit determines as to whether it performs the first gas replacement control for the first laser chamber, then determines as to whether it performs the second gas replacement control for the second laser chamber after determining as to whether it performs the first gas replacement control.

11. The excimer laser system according to claim 4, wherein the gas control unit includes a timer for measuring a time, and performs the first gas replacement control and the second gas replacement control based on the time measured by the timer.

12. The excimer laser system according to claim 1, wherein the gas exhaust unit includes an exhaust valve, and the exhaust valve is positioned to receive gas exhausted from the first laser chamber through the first valve and to receive gas exhausted from the second laser chamber through the second valve.

13. The excimer laser system according to claim 12, wherein while either the first laser gas or the second laser gas are supplied to the first laser chamber or the second laser chamber, the exhaust valve is closed.

14. The excimer laser system according to claim 12, wherein the gas exhaust unit includes an exhaust pump, and when the exhaust valve is open, the exhaust pump is operated.

15. The excimer laser system according to claim 1, wherein the gas exhaust unit is operated to decrease pressure in one of the first laser chamber and the second laser chamber until a gas pressure in one of the first laser chamber and the second laser chamber reaches a predetermined pressure.

16. The excimer laser system according to claim 4, wherein the gas exhaust unit includes an exhaust valve, and the exhaust valve is positioned to receive gas exhausted from the first laser chamber through the first valve and to receive gas exhausted from the second laser chamber through the second valve.

17. The excimer laser system according to claim 16, wherein while either the first laser gas or the second laser gas are supplied to the first laser chamber or the second laser chamber, the exhaust valve is closed.

18. The excimer laser system according to claim 17, wherein the gas exhaust unit includes an exhaust pump, and when the exhaust valve is open, the exhaust pump is operated.

19. The excimer laser system according to claim 1, wherein the gas control unit holds:
- a maximum value for an amount of laser gas supplied to the interior of the first laser chamber in the first partial gas replacement control, the maximum value being equal to or larger than a value of the first amount; and
- a minimum value for an amount of laser gas supplied to the interior of the first laser chamber in the first partial gas replacement control, the minimum value being equal to or smaller than a value of the second amount.

20. The excimer laser system according to claim 1, wherein the gas control unit holds an upper limit for the first time interval, the upper limit being equal to or longer than the first length.

21. The excimer laser system according to claim 2, wherein the gas control unit is configured to:
- calculate a third time interval based on the repetition rate, the third time interval having a fifth length when the repetition rate has a fifth value, the third time interval having a sixth length shorter than the fifth length when the repetition rate has a sixth value larger than the fifth value; and
- perform a next first halogen gas filling control when the third time interval has passed since a former first halogen gas filling control was performed.

22. The excimer laser system according to claim 21, wherein the gas control unit holds an upper limit for the third time interval, the upper limit being equal to or longer than the fifth length.

* * * * *